US011890603B2

(12) United States Patent
Wang et al.

(10) Patent No.: US 11,890,603 B2
(45) Date of Patent: Feb. 6, 2024

(54) NANOCOMPOSITE MATERIALS AND METHODS OF MANUFACTURE THEREOF

(71) Applicants: Tiesheng Wang, Dalian (CN); Stoyan K. Smoukov, Cambridgeshire (GB); Qiang Fu, Dalian (CN); Lijun Gao, Dalian (CN)

(72) Inventors: Tiesheng Wang, Dalian (CN); Stoyan K. Smoukov, Cambridgeshire (GB); Qiang Fu, Dalian (CN); Lijun Gao, Dalian (CN)

(73) Assignee: Tiesheng WANG et al., Dalian (CN)

( * ) Notice: Subject to any disclaimer, the term of this patent is extended or adjusted under 35 U.S.C. 154(b) by 209 days.

(21) Appl. No.: 17/258,697

(22) PCT Filed: Aug. 8, 2019

(86) PCT No.: PCT/EP2019/071309
§ 371 (c)(1),
(2) Date: Jan. 7, 2021

(87) PCT Pub. No.: WO2020/035386
PCT Pub. Date: Feb. 20, 2020

(65) Prior Publication Data
US 2021/0275999 A1    Sep. 9, 2021

(30) Foreign Application Priority Data

Aug. 15, 2018 (GB) .................... 1813334

(51) Int. Cl.
*B01J 37/16* (2006.01)
*B01J 31/28* (2006.01)
(Continued)

(52) U.S. Cl.
CPC ............... *B01J 31/28* (2013.01); *B01J 21/08* (2013.01); *B01J 23/462* (2013.01);
(Continued)

(58) Field of Classification Search
None
See application file for complete search history.

(56) References Cited

U.S. PATENT DOCUMENTS

2003/0152759 A1    8/2003 Chao et al.

FOREIGN PATENT DOCUMENTS

CN          102847557 A    1/2013
CN          106345524 A    1/2017
(Continued)

OTHER PUBLICATIONS

Houk et al., Silver cluster formation, dynamics and chemistry in metal-organic frameworks, Nano Letters, 2009, 9, 10, 3413-3418 (Year: 2009).*

(Continued)

*Primary Examiner* — Coris Fung
*Assistant Examiner* — Keling Zhang
(74) *Attorney, Agent, or Firm* — Quarles & Brady LLP

(57) ABSTRACT

The present invention discloses methods for producing a guest@nanoporous-host materials, and guest@nanoporous-host materials produced according to these methods. Methods according to the invention comprise steps of infiltrating a nanoporous host material with one or more reagents and a target guest precursor in a reaction environment such that a reaction occurs to form the target guest species within the pores of the nanoporous host material. The reagent comprise either a redox reagent and/or a pH modulator. By analysis of appropriate electrochemical potential-pH diagrams and careful selection of suitable reagents and control of process conditions to produce desired target guest particles from selected target guest precursors, the synthesis strategy to form the guests can be more flexible and versatile than known methods, because typically milder reaction conditions can be used than in such known methods.

13 Claims, 31 Drawing Sheets

(51) Int. Cl.
| | |
|---|---|
| B01J 21/08 | (2006.01) |
| B01J 23/46 | (2006.01) |
| B01J 31/16 | (2006.01) |
| B01J 35/00 | (2006.01) |
| B01J 35/10 | (2006.01) |
| B01J 37/02 | (2006.01) |
| B01J 37/08 | (2006.01) |
| B01J 37/12 | (2006.01) |

(52) U.S. Cl.
CPC ....... *B01J 31/1691* (2013.01); *B01J 35/0013* (2013.01); *B01J 35/1057* (2013.01); *B01J 35/1061* (2013.01); *B01J 37/0205* (2013.01); *B01J 37/08* (2013.01); *B01J 37/12* (2013.01); *B01J 37/16* (2013.01); *B01J 2531/005* (2013.01); *B01J 2531/0216* (2013.01)

(56) References Cited

FOREIGN PATENT DOCUMENTS

| | | |
|---|---|---|
| CN | 107185594 A | 9/2017 |
| CN | 107617447 A | 1/2018 |
| CN | 107837820 A | 3/2018 |
| CN | 108640906 A | 10/2018 |
| WO | WO-2013-057319 A2 | 4/2013 |
| WO | WO-2018-154166 A1 | 8/2018 |

OTHER PUBLICATIONS

Kostelanska et al., Pharmaceutics, 2022, 14, 818 (Year: 2022).*
Chemistry Stack Exchange, Is there a hydrophobic gas? https://chemistry.stackexchange.com/questions/7875/is-there-a-hydrophobic-gas, 2014 (Year: 2014).*
Woolley, Journal of Solution Chemistry, 3, 2, 1974 (Year: 1974).*
Sai et al., What is the difference between air oven and vacuum oven drying?, https://www.researchgate.net/post/What_is_the_difference_between_air_oven_drying_and_vacuum_oven_drying/57a8355e217e200b9a69287b/citation/download (Year: 2016).*
Zhuang et al., The effect of N-containing supports on catalytic CO oxidation activity over highly dispersed Pt/UiO-67, Eur. J. Inorg. Chem., 2017, 172-178 (Year: 2017).*
Wang et al., Functional conductive nanomaterials via polymerisation in nano-channels: PEDOT in a MOF, Mater. Horiz., 2017, 4, 64 (Year: 2017).*
Pourbaix, Atlas of Electrochemical Equilibria in Aqueous Solutions, NACE International Cebelcor, 1974, 648 pages (Year: 1974).*
International Search Report and Written Opinion, International Application No. PCT/EP2019/071309, International Searching Authority EPO, dated Dec. 10, 2019, 15 pages.
UK-IPO Search Report, GB Application No. 1813334.8, dated Mar. 28, 2019, 5 pages.
Railey, Prescott et al., "Metal organic frameworks with immobilized nanoparticles: Synthesis and applications in photocatalytic hydrogen generation and energy storage", Materials Research Bulletin, vol. 96, Apr. 2017, 10 pages.
Furukawa et al., "The Chemistry and Applications of Metal-Organic Frameworks", Science Magazine, vol. 241, Aug. 2013, 14 pages.
Moghadam et al., "Development of a Cambridge Structural Database Subset: A Collection of Metal Organic Frameworks for Past, Present, and Future", Chemistry of Materials, Mar. 2017, 8 pages.
Howarth et al., "Chemical, thermal and mechanical stabilities of metal organic frameworks", Nature Reviews/Materials, vol. 1, Mar. 2016, 15 pages.
Loeri et al., "Systems Based on Nanopourous Crystals", Wiley-VCH GmbH & Co KGaA, 2003, 680 pages. (Uploaded as Part 1-Part 6).
Moller et al., "Inclusion Chemistry in Periodic Mesopourous Hosts", Chemical Materials, Jul. 1998, vol. 10, 14 pages.
Fujita et al., "Self-assembly of ten molecules into nanometre-sized organic hosts frameworks", Nature, vol. 378, Nov. 1995, 3 pages.
Yang et al., "Photophysical Properties of a Post-Self-Assembly Host/Guest Coordination Cage: Visible Light Driven Core-to-Cage Charge Transfer", Journal of Physical Chemistry Letters, ACS Publications, 2015, 6 pages.
Meilikhov et al., "Metals@MOFs—Loading MOFs with Metal Nanoparticles for Hybrid Functions", MicroReview, Wiley InterScience, 2010, 14 pages.
Juan-Alcaniz et al., "Metal-organic frameworks as scaffolds for the encapsulation of active species: state of the art and future perspectives", Journal of Materials Chemistry, vol. 22, 2012, 17 pages.
Dhakshinamoorthy et al., "Catalysis by metal nanoparticles embedded on metal-organic frameworks", Chem. Soc. Rev., 2012, vol. 41, 23 pages.
Gascon et al., "Metal Organic Framework Catalysis: Quo vadis?", ACS Catalysis, ACS Publications, 2013, 18 pages.
Allendorf, M. D. et al., "Guest-Induced Emergent Properties in Metal-Organic Frameworks", J. Phys. Chem. Lett. 6, 1182-1195 (2015).
Chen et al., "Controllable design of tunable nanostructures inside metal-organic frameworks", Chem. Soc. Rev. 46, 4614-4630 (2017).
Huang et al., "Multifunctional metal-organic framework catalysts: synergistic catalysis and tandem reaction", Chem. Soc. Rev., vol. 46, 2017, 32 pages.
Landmesser et al., "Interaction of CO with Ruthenium Supported on Dealuminated Y Zeolite: Evidence for the formation of Ruthenlum Tricarbonyl", Journal Phys. Chem., 1991, vol. 95, 3 pages.
Li et al., "Sub-nm ruthenium cluster as an efficient and robust catalyst for decomposition and synthesis of ammonia: Break the size shackles", Nano Research, 2018, 12 pages.
Bleloch, et al., "Modified mesoporous silicate MCM-41 materials: immobilized perruthenate—a new highly active heterogeneous oxidation catalyst for clean organic synthesis using molecular oxygen", Chem. Community, 1999, 2 pages.
Zhan, B. Z. et al., "Zeolite-confined nano-$RuO_2$: A green, selective, and efficient catalyst for aerobic alcohol oxidation", J. Am. Chem. Soc. 125, 2195-2199 (2003).
Schroder et al., "Ruthenium Nanoparticles inside Porous [$Zn_4O(bdc)_3$] by Hydrogenolysis of Adsorbed [Ru(cod)(cot)]: A Solid-State Reference System for Surfactant-Stabilized Ruthenium Colloids", JACS Articles, 2008, 12 pages.
Maza et al., "Concentration Dependent Dimensionality of Resonance Energy Transfer in a Post-synthetically Doped Morphologically Homologous Analogue of UiO-67 MOF with a Ruthenium(II) Polypyridyl Complex", JACS, vol. 137, 2015, 8 pages.
Maza et al., "Ruthenium(II)-polypyridyl zirconium(IV) metal-organic frameworks as a new class of sensitized solar cells", Chemical Science, vol. 7, 2016, 9 pages.
Jiang et al., "Au@ZIF-8: CO Oxidation over Gold Nanoparticles Deposited to Metal-Organic Framework". JACS, Journal Am. Chem. Soc., vol. 131, 2009, 2 pages.
Wang et al., "Metal-organic framework as a host for synthesis of Nanoscale $Co_3O_4$ as an active catalyst for CO oxidation" Elsevier, Catalysis Communications, 2011, 5 pages.
Lin et al., "Palladium Nanoparticles Supported on Ce-Metal-Organic Framework for Efficient CO Oxidation and Low-Temperature $CO_2$ Capture", Applied Materials & Interfaces, 2017, 8 pages.
Campbell et al., "A periodic table based on potential-pH diagrams", J. Chem. Educ. 46, 90 (1969).
Hwang et al., "Amine grafting on coordinatively unsaturated metal centers of MOFs Consequences for catalysis and metal encapsulation" Zuschriften, InterScience, 2008, 5 pages.
Wei et al., "Nanoparticle Core/Shell Architectures within MOF Crystals Synthesized by Reaction Diffusion", Angewandte Chem. Int. Ed., 2012, 5 pages.
Jiang et al., "Superacidity in Sulfated Metal-Organic Framework-808", JACS, Journal Am. Chem. Soc., vol. 16, 2014, 4 pages.
Furukawa et al., "Water Adsorption in Porous Metal-Organic Frameworks and Related Materials", JACS, Journal Am. Chem. Soc., vol. 136, 2014, 13 pages.

(56) References Cited

OTHER PUBLICATIONS

Povar et al., "Ruthenium redox equilibria 3. Pourbaix diagrams for the systems Ru-H2O and Ru-Cl--H2O", JESE, 2016, 9 pages.
Yohe et al., "The Oxidation of 2,6-Di-tert-butyI-4-methylphenol", Illinois State Geological Survey, May 1956, 4 pages.
Richards et al., "Electrochemical Oxidation of 2,6D1-tert-BUTYL-4-Isopropylphenol", Elsevier, J. Electroanal. Chem., vol. 81, 1977, 17 pages.
Ouay et al., "Nanostructuration of PEDOT in Porous Coordination Polymers for Tunable Porosity and Conductivity", JACS, Journal Am. Chem. Soc., vol. 138, 2016, 4 pages.
Velazquez-Palenzuela et al., "Structural Properties of Unsupported Pt—Ru Nanoparticles as Anodic Catalyst for Proton Exchange Membrane Fuel Cells", J. Phys. Chem., 2010, vol. 114, 9 pages.
Zhang et al., "Water-in-Oil Microemulsion Synthesis of Platinum-Ruthenium Nanoparticles, Their Characterization and Electrocatalytic Properties", Chemical Materials, vol. 15, 2003, 9 pages.
Rolison et al., "Role of Hydrous Ruthenium Oxide in Pt—Ru Direct Methanol Fuel Cell Anode Electrocatalysts: The Importance of Mixed Electron/Proton Conductivity", Langmuir, vol. 15, 1999, 6 pages.
Wang et al., "Uncoordinated Amine Groups of Metal-Organic Frameworks to Anchor Single Ru Sites as Chemoselective Catalysts toward the Hydrogenation of Quinoline", JACS, J. Am. Chem. Soc., vol. 139, 2017, 4 pages.
Ravikovitch et al., "Density Functional Theory Model of Adsorption on Amorphous and Microporous Silica Materials", Langmuir, vol. 22, 2006, 9 pages.
Over, Herbert, "Surface Chemistry of Ruthenium Dioxide in Heterogeneous Catalysis and Electrocatalysis: From Fundamental to Applied Research", Chemical Reviews, vol. 112, 2012, 71 pages.
Over et al., "Atomic-Scale Structure and Catalytic Reactivity of the RuO2 (110) Surface", Science Magazine, vol. 287, Feb. 2000, 4 pages.
Assmann et al., "Heterogeneous oxidation catalysis on ruthenium: bridging the pressure and materials gaps and beyond", J. Phys: Condens. Matter 20, 2008, 24 pages.
Farkas et al., "Novel Insight in the CO Oxidation on RuO2(110) by in Situ Reflection-Absorption Infrared Spectroscopy", J. Phys. Chem. vol. 113, 2009, 15 pages.
Spinace et al. "Liquid-phase hydrogenation of benzene to cyclohexene catalyzed by Ru/SiO2 in the presence of water-organic mixtures", Elsevier, Catalysis Communications, 2003, 6 pages.
Cui et al., "Synergetic Catalytic Effects in Tri-Component Mesostructured Ru—Cu—Ce Oxide Nanocomposite in CO Oxidation", Chem. Cat. Chem., vol. 6, 2014, 12 pages.
Kim et al., "CO oxidation catalyzed by RuO2 nanoparticles supported on mesoporous Al2O3 prepared via atomic layer deposition", Elsevier, Dept. Chem., 2016, 6 pages.
Lu et al., "Imparting functionality to a metal-organic framework material by controlled nanoparticle encapsulation", Nature Chemistry, vol. 4, Apr. 2012, 7 pages.
Shen et al., "Synthesis and CO Oxidation Catalytic Character of High Surface Area Ruthenium Dioxide Replicated by Cubic Mesoporous Silica", Chemistry Letters, vol. 34, 2005, 2 pages.
Sreedhala et al., "Surfactant assisted formation of ruthenium nanochains under mild conditions and their catalytic CO oxidation activity", ChemComm., vol. 51, 2015, 4 pages.
Yu et al., "Study on RuO2/SnO2: Novel and Active Catalysts for CO and CH4 Oxidation", Chem Cat Chem, vol. 4, 2012, 11 pages.
Huang et al., "Solid-Solution Alloying of Immiscible Ru and Cu with Enhanced CO Oxidation Activity", Jacs, J. Am. Chem. Soc., vol. 139, 2017, 4 pages.
Kusada et al., "Discovery of Face-Centered-Cubic Ruthenium Nanoparticles: Facile Size-Controlled Synthesis Using the Chemical Reduction Method", JACS, J. Am. Chem. Soc., vol. 135, 2013, 4 pages.
Liang et al., "Controlled synthesis of supported ruthenium catalysts for CO oxidation by organometallic chemical vapor deposition", Elsevier, Ruhr-Univ Bochum, Germany, 2006, 8 pages.
Hoon-Joo et al., "Size Effect of Ruthenium Nanoparticles in Catalytic Carbon Monoxide Oxidation", NANO Letters, vol. 10, 2010, 5 pages.
Park et al., "Room-temperature CO oxidation over a highly ordered mesoporous RuO2 catalyst", Springer, 2011, 13 pages.
Bon et al., "Zr- and Hf-Based Metal-Organic Frameworks: Tracking Down the Polymorphism", Crystal Growth & Design, American Chemical Society, vol. 13, 2013, 7 pages.
Singh et al., "Electrochemical Stability of Metastable Materials", Chemistry of Materials, American Chemical Society, vol. 29, 2017, 9 pages.
Jain et al., "Commentary: The Materials Project: A materials genome approach to accelerating materials innovation", APL Materials, 2013, 12 pages.
Persson et al., "Prediction of solid-aqueous equilibria: Scheme to combine first-principles calculations of solids with experimental aqueous states", Physical Review, American Physical Society, 2012, 12 pages.
Pascanu et al., "Sustainable Catalysis: Rational Pd Loading on MIL-101Cr-NH2 for More Efficient and Recyclable Suzuki-Miyaura Reactions", Chemistry European Journal, vol. 19, 2013, 11 pages.
Chinese Office Action, Chinese Application No. 201980052888.4, Notification of First Office Action, dated Jan. 5, 2023, provided with Machine/English Translation, 21 pages.

* cited by examiner

Fig. 1a (ii)
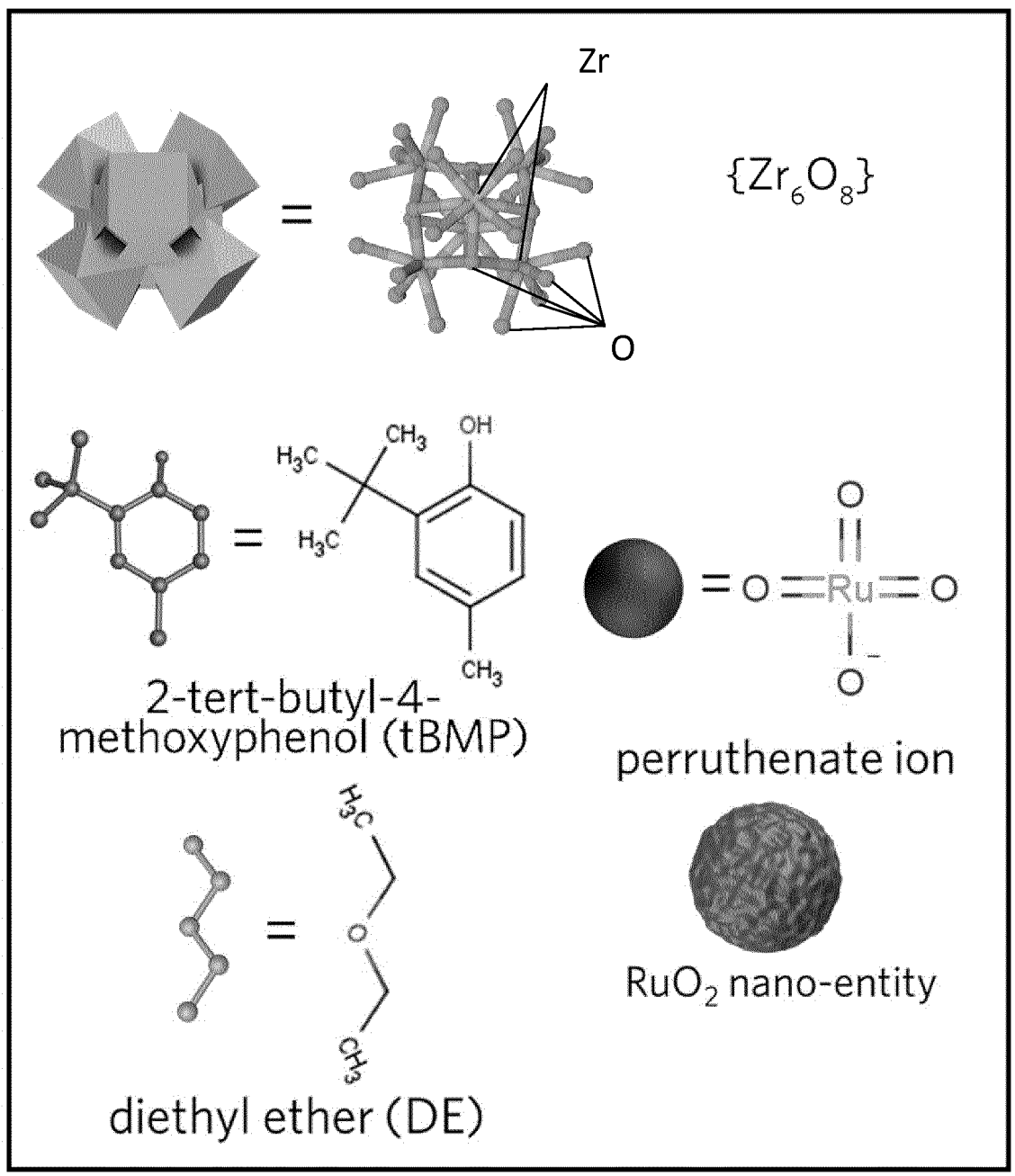

a b

Marked (a)

(b)

O adsorbed on coordinately unsaturated Ru
CO adsorbed on coordinately unsaturated Ru
Bridged CO
Bridged O

… (1)

NANOCOMPOSITE MATERIALS AND METHODS OF MANUFACTURE THEREOF

RELATED APPLICATIONS

This application is a 35 U.S.C. § 371 national phase application of PCT/EP2019/071309 (WO-2020-035386-A1), filed on Aug. 8, 2019, entitled "NANOCOMPOSITE MATERIALS AND METHODS OF MANUFACTURE THEREOF", which claims the benefit of GB Patent Application No. 1813334.8, filed Aug. 15, 2018, each of which are incorporated herein by reference in their entirety.

This work was funded in part by the European Research Council (ERC) grant to Dr Stoyan K. Smoukov, EMATTER (#280078).

FIELD OF THE INVENTION

The present invention relates to nanocomposite materials and methods of manufacture thereof. In particular, although not exclusively, it relates to guest@nanoporous-host materials and methods of manufacture thereof.

BACKGROUND

Loading guests (e.g. molecules, clusters or particles) inside the pores of nanoporous hosts [1-4] (e.g. inorganic porous materials [4,5], metal-organic polyhedral (MOPs)[6,7], metal organic frameworks (MOFs)[1-4], Zeolite, porous silica ($SiO_2$), organosilicate, activated carbon etc.) to form composite materials generally referred to using the terminology 'guest@nanoporous-host' is a known strategy for creating functional nanocomposites. It can yield highly active and stable heterogeneous catalysts, as well as robust photo/electro-luminescence materials with tunable band structure in quantum confinement. It is theorised that this is achieved due to the restriction of growth of the guest entities, and prevention of coalescence. [8-14]

The terminology 'X@Y' is generally used within this field, and in the present disclosure, to express the concept of X being inside Y. Accordingly, the term 'guest@nanoporous-host' refers to a nanoporous-host material comprising a guest compound inside (within the pores of) the nanoporous host material. Alternative notation/terminology used to indicate the same concept includes use of "nanoporous-host ⊃ guest".

A fair amount of work has been performed in this general area. Taking Ru-based guest@nanoporous as an example, since early 1990s, numerous combinations have been achieved, such as:
Ru@Zeolite-Y [15]
Ru@MIL-101 [16]
perruthenate@MCM-41 (a mesoporous silica) [17]
RuO2@faujasite zeolite [18]
Ru-organic complex@MOF [19-21]

Meanwhile, several metal@MOF systems have been investigated, in particular for use in CO oxidation, such as:
Au@ZIF-8 [22]
Pt@UiO-66 [23]
Co3O4@ ZIF-8 [24]
Pd@[Ce(BTC)(H2O)]-DMF [25] (where BTC is benzene-1,3,5-tricarboxylate and DMF is dimethylformamide).

Metal-organic frameworks (MOFs) are host matrices with extremely diversified chemistry, topology and pore architecture, but suffer from poor chemical and thermal stability. It is generally recognized as a challenging, or sometimes impossible, mission in MOF hosts (and some other nanoporous hosts) to form guests (and in particular guests including e.g. oxides, hydroxides, sulfides, nitrides and phosphides) that are significantly larger than the pore apertures (also commonly referred to as windows). Where guests are required to be formed which are larger than the pore windows, this is generally referred to in the art as "ship-in-bottle" assembly. The general 'ship-in-bottle' approach is to load metal salts and organometallic precursors into pre-formed open-porous framework of the host material via solution-based, gas-phase or mechanical-mixing impregnation, followed by either thermal/irradiation decomposition or redox reaction with strong reducing reagents such as hydrazine ($N_2H_4$), $NaBH_4$ or $H_2$. [8-14]

SUMMARY OF THE INVENTION

Part of the insight of the present inventors is to see that an issue in present ship-in-bottle systems is the poor control when growing the nano-entities (guests) within the nanoporous hosts. In most cases along the post-assembly incorporation route, metal-based guest moieties are significantly deposited on the outer surface of the host material [13]. Since guests can behave very differently when they are confined in a nano-cavity[12] depositing the guests both outside and inside the nanoporous hosts adds a significant bias and uncertainty to the characterization and discovery of confinement-induced behaviour changes. Furthermore, significant loading on the outside of the host material can be detrimental to performance of such materials as e.g. catalysts.

Additionally, the use of strong reducing agents and the reaction conditions required to form these guests in present known processes are such that there is a risk of damaging or destroying the nanoporous host structure. This is particularly a problem for metastable MOF host materials.

The present invention has been devised in light of the above considerations.

By revisiting Pourbaix diagrams (electrochemical potential-pH diagrams) of various systems (e.g. metal-$H_2O$ and metal-$H_2S$) [26,27], the present inventors have realized that insoluble guests can be made from suitable precursors, e.g. oxyanions ($M_xO_y^{z-}$) in metal-$H_2O$ system and thiometallate anions ($M_xS_y^{z-}$) in metal-$H_2S$ systems, when the electrochemical potential and/or pH of the reaction environment are selected to match the reaction requirements. In this disclosure, "reaction environment" is used to refer generally to the environment in which the reaction takes place. The reaction environment may most commonly be a liquid environment e.g. in aqueous or other solution, however other reaction environments e.g. in a gaseous environment are also contemplated.

Pourbaix diagrams represent the stability of particular available oxidation states of a component, such as a metal, as a function of electrochemical potential and pH. At a particular combination of pH and electrochemical potential, a stable phase can be determined from the Pourbaix diagram. Pourbaix diagrams are constructed from calculations based on the Nernst equation, as discussed below in relation to FIG. 33.

The present inventors have realised that by analysis of appropriate electrochemical potential-pH diagrams and careful selection of suitable reagents and control of process conditions to produce desired target guest particles from selected target guest precursors, the synthesis strategy to form the guests can be more flexible and versatile than known methods, because typically milder reaction conditions can be used than in such known methods.

Furthermore, the present inventors have also realised that it is possible to incorporate guest compounds in the cavity of nanoporous hosts in a more controlled manner than in known processes by performing an additional temperature control step during the method of manufacture.

Accordingly, in a first aspect, there is provided a method for producing a guest@nanoporous-host material comprising the steps of:
- providing a nanoporous host material comprising a plurality of pores interconnected via pore windows;
- selecting a target guest species on a relevant electrochemical potential versus pH diagram diagram;
- identifying a suitable target guest precursor by identifying a phase on said electrochemical potential versus pH diagram;
- selecting one or more suitable reagents;
- infiltrating the nanoporous host material with the said reagent(s) to form a reagent@nanoporous-host material, or infiltrating the nanoporous host material with the target guest precursor to form a precursor@nanoporous-host material; and infiltrating the reagent@nanoporous-host material with the target guest precursor or infiltrating the precursor@nanoporous-host material with the one or more suitable reagents, in a reaction environment such that a reaction occurs to form the target guest species within the pores of the nanoporous host material;
- wherein the one or more said reagents comprises:
  - (i) a redox reagent selected to adjust the electrochemical potential of the reaction environment by $\Delta E$, where $\Delta E$ is determined as a difference in electrochemical potential operable to change the electrochemical potential of the reaction environment from a stable region of the target guest precursor on said electrochemical potential versus pH diagram to a stable region of the target guest species on said electrochemical potential versus pH diagram; and/or
  - (ii) a pH modulator selected to adjust the pH of the reaction environment by $\Delta pH$, where $\Delta pH$ is determined as a difference in pH operable to move the pH of the reaction environment from a stable region of the target guest precursor on said electrochemical potential versus pH diagram to a stable region of the target guest species on said electrochemical potential versus pH diagram.

The nanoporous host material may first be infiltrated with the one or more suitable reagents to form a reagent@nanoporous-host material before the reagent@nanoporous-host material is infiltrated with the target guest precursor. Alternatively, the nanoporous host material may first be infiltrated with the target guest precursor to form a precursor@nanoporous-host material before the precursor@nanoporous-host material is infiltrated with the one or more reagents. The order in which the infiltration of target guest precursor and reagent(s) takes place may affect the final characteristics, such as morphology, of the guest@nanoporous-host material.

In a second aspect, there is provided a method for producing a guest@nanoporous-host material comprising the steps of:
- providing a nanoporous host material comprising a plurality of pores interconnected via pore windows and selecting a target guest species for said nanoporous host material, the target guest species being capable of being plotted on a relevant electrochemical potential versus pH diagram;
- providing a suitable target guest precursor, the target guest precursor being a phase being capable of being plotted on said electrochemical potential versus pH diagram;
- providing one or more suitable reagents;
- infiltrating the nanoporous host material with the said reagent(s) to form a reagent@nanoporous-host material, or infiltrating the nanoporous host material with the target guest precursor to form a precursor@nanoporous-host material; and
- infiltrating the reagent@nanoporous-host material with the target guest precursor, or infiltrating the precursor@nanoporous-host material with the one or more suitable reagents in a reaction environment such that a reaction occurs to form the target guest species within the pores of the nanoporous host material;
- wherein the one or more said reagents comprises:
  - (i) a redox reagent which adjusts the electrochemical potential of the reaction environment by $\Delta E$, where $\Delta E$ is determined as a difference in electrochemical potential operable to change the electrochemical potential of the reaction environment from a stable region of the target guest precursor on said electrochemical potential versus pH diagram to a stable region of the target guest species on said electrochemical potential versus pH diagram; and/or
  - (ii) a pH modulator which adjusts the pH of the reaction environment by $\Delta pH$, where $\Delta pH$ is determined as a difference in pH operable to move the pH of the reaction environment from a stable region of the target guest precursor on said electrochemical potential versus pH diagram to a stable region of the target guest species on said electrochemical potential versus pH diagram.

As described above in relation to the first aspect, the nanoporous host material may first be infiltrated with the one or more suitable reagents to form a reagent@nanoporous-host material before the reagent@nanoporous-host material is infiltrated with the target guest precursor. Alternatively, the nanoporous host material may first be infiltrated with the target guest precursor to form a precursor@nanoporous-host material before the precursor@nanoporous-host material is infiltrated with the one or more reagents.

In a third aspect, there is provided a guest@nanoporous-host material produced by infiltrating a nanoporous host material with one or more reagents and a target guest precursor in a reaction environment such that a reaction occurs to form the target guest species within the pores of the nanoporous host material;
- wherein the one or more said reagents comprises:
  - (i) a redox reagent which adjusts the electrochemical potential of the reaction environment by $\Delta E$, where $\Delta E$ is determined as a difference in electrochemical potential operable to change the electrochemical potential of the reaction environment from a stable region of the target guest precursor to a stable region of the target guest species; and/or
  - (ii) a pH modulator which adjusts the pH of the reaction environment by $\Delta pH$, where $\Delta pH$ is determined as a difference in pH operable to move the pH of the reaction environment from a stable region of the target guest precursor to a stable region of the target guest species.

As described above in relation to the first and second aspects, the nanoporous host material may first be infiltrated with the one or more suitable reagents to form a reagent@nanoporous-host material before the reagent@nanoporous-host material is infiltrated with the target guest precursor. Alternatively, the nanoporous host material may first be infiltrated with the target guest precursor to form a precursor@nanoporous-host material before the precursor@nanoporous-host material is infiltrated with the one or more reagents. The above strategy has the particular advantages that it is possible to form a range of guests inside pre-formed nanoporous hosts, e.g. MOFs and zeolites, under relatively mild conditions without requiring the host to possess particular chemical functionality/special material chemistry (such as chemical functionalizability/use of ionic host materials) [28,29]. In other words, these reactions can be performed without grafting, where a chemical precursor is chemically bonded to a functionalizable part of the host material. This is because selection of redox reagents and/or pH modulators according to the required $\Delta E$ and/or $\Delta pH$ means that it is possible to produce the target guest species without the need to use harsh redox reagents such as e.g. hydrazine or $NaBH_4$.

A relevant electrochemical potential versus pH diagram is a diagram of electrochemical potential versus pH for an appropriate system, taking into account the identity of the target guest species and the proposed reaction environment. The electrochemical potential versus pH diagram may be a Pourbaix diagram. For example, where the target guest species is a metal oxide (e.g. $RuO_2$), and the proposed reaction environment is an aqueous solution, the relevant electrochemical potential versus pH diagram will be a Pourbaix diagram for a metal-$H_2O$ system. However, the invention is not necessarily limited to any specific systems. It is theorised that the principles proposed herein are generally applicable any target guest species/reaction environment combination for which it is possible to provide an electrochemical potential versus pH diagram. Some examples of electrochemical potential versus pH diagrams for a range of different systems are described in Campbell, J. A. & Whiteker, R. A. "A periodic table based on potential-pH diagrams". J. Chem. Educ. 46, 90 (1969)[27].

The term 'stable region' is here used to describe a bounded region of the relevant electrochemical potential versus pH diagram, in which region the indicated species is stable. With reference to FIG. 33, which shows a Pourbaix diagram for the Ru—$H_2O$ system, where the target guest species is $RuO_2$ and the target guest precursor is $RuO4^-$, the stable region for the target guest species is the region indicated with the label 'RuO2-$2H_2O$'. The stable region for the target guest precursor is the region indicated with the label 'RuO4$^-$'. RuO2 can then be achieved from RuO2-$2H_2O$ via a dehydration process. Accordingly, because any species is stable in a range of electrochemical potential and pH in any specified system, $\Delta E$ and $\Delta pH$ may each take a range of values, as the skilled person understands.

In a fourth aspect, there is provided a method for producing a guest@nanoporous-host material comprising the steps of:

providing a nanoporous host material comprising a plurality of pores interconnected via pore windows;

selecting a target guest species and identifying a suitable target guest precursor;

selecting one or more suitable reagents, said reagent(s) comprising a redox reagent and/or a pH modulator;

infiltrating the nanoporous host material with said reagent(s) to form a reagent@nanoporous-host material, or infiltrating the nanoporous host material with the target guest precursor to form a precursor@nanoporous-host material;

performing a temperature-controlled desorption step to cause at least partial desorption of reagent molecules from the outer surface of the reagent@nanoporous-host material or the precursor@nanoporous-host material; and subsequently infiltrating the reagent@nanoporous-host material with the target guest precursor, or infiltrating the precursor@nanoporous-host material with the one or more suitable reagents, such that a reaction occurs between the target guest precursor and said reagent(s) to form the target guest species within the pores of the nanoporous host material.

As above, the nanoporous host material may first be infiltrated with the one or more suitable reagents to form a reagent@nanoporous-host material before the reagent@nanoporous-host material is infiltrated with the target guest precursor. Alternatively, the nanoporous host material may first be infiltrated with the target guest precursor to form a precursor@nanoporous-host material before the precursor@nanoporous-host material is infiltrated with the one or more reagents.

By causing desorption of reagent or precursor molecules from the outer surface of the reagent@nanoporous-host material or precursor@nanoporous-host material, it is possible to reduce the amount of surface loading of the target guest species on the host material. Furthermore, this method may also provide for greater control on guest inclusion in the host material, allowing for tunable loading of guest within the host in comparison to present methods. Desorption may be desorption of some or all of the reagent or precursor molecules from the outer surface of the reagent@nanoporous-host or precursor@nanoporous-host material. Preferably 10%, 20%, 30%, 40%, 50%, 60%, 70%, 80%, 90%, or 95% or more of the reagent or precursor molecules may be desorbed from the outer surface of the host material. In some cases, up to and including 100% of the reagent or precursor molecules may be desorbed from the outer surface of the nanoporous host material. The extent of desorption may be measured using any appropriate technique, for example, by thermogravimetric analysis (TGA). The extent of desorption can be determined from (i) mass loss of weight vs temperature plot directly or (ii) the area under the curve of deriv. weight vs temperature plot.

The term 'nanoporous material' is generally used herein to refer to materials having a pore cavity diameter of 100 nm or less. Preferably the nanoporous material is a mesoporous or microporous material. As defined by IUPAC, a mesoporous material is a material containing pores with a cavity diameter of between 2 and 50 nm. Typical mesoporous materials include e.g. porous silica, organosilica, and activated carbon. A microporous material is a material containing pores with a cavity diameter of less than 2 nm. Examples of microporous materials include e.g. zeolites, metal-organic framework materials and covalent organic framework materials. The identity of the nanoporous material is not particularly limited, however preferably it is selected to be stable with respect to the metal precursor, and throughout the proposed synthesis method. Different nanoporous host materials may be selected according to the specific application in which the guest@nanoporous-host material is intended to be used. Preferably, the nanoporous host material is selected from: a MOF (a.k.a. a porous coordination polymer (PCP)) material, a COF material, zeolite, porous silica, organosilica, activated carbon, carbon nanotubes or a microporous polymeric material (e.g. a polymer of intrinsic microporosity (PIM), a conjugated microporous polymer (CMP)). Preferably the pore cavity diameter of the nanoporous material is from 0.5 nm to 10 nm. Most preferably, the nanoporous host material is a MOF material or a zeolite.

'Infiltrating' or 'infiltrates' is used herein to mean that the species passes into or enters into the pores of the nanoporous host material. Some or all of the pores of the nanoporous host material may be infiltrated by the infiltrating species. According, a species infiltrating the nanoporous host material (e.g. the target guest precursor, and any other reagents required for formation of the target guest species within the pore) should have a diameter not substantially greater than a diameter of the pore apertures (sometimes referred to as "windows") of the nanoporous material. It is not necessary that the target guest species itself has a diameter which allows for infiltration, because the target guest species is formed in-situ within the pores. Indeed, it may be preferable for the target guest species to have a dimeter greater than a diameter of the pore apertures. This may prevent the target guest species from leaving the pores of the host material once it is formed in-situ.

Furthermore, a species infiltrating the nanoporous host material (e.g. the target guest precursor, and any other reagents required for formation of the target guest species within the pore) should be in a mobile state, i.e. should be a gas, a liquid, or in solution. The species may naturally exist in a mobile state under process conditions (i.e. be a gas or a liquid under the process conditions), or may be placed into a mobile state by e.g. solvation of the species in an appropriate solvent prior to the infiltration step. Appropriate solvents will depend on the precise nature of the infiltrating species. For example, appropriate solvents may include: water or other aqueous solutions; organic solvents (aromatic compounds (e.g. benzene and toluene), alcohols (e.g. methanol, ethanol), esters, ethers, ketones (e.g. acetone), amines, nitrated halogenated hydrocarbons, dimethylformamide, dimethyl sulfoxide); or ionic liquids (ammonium, imidazolium-, phosphonium-, pyridinium-, pyrrolidinium-, sulfonium-based ionic liquids).

For some nanoporous materials (e.g. MOFs), at least some of the pore apertures may have different diameters in different directions. In this case, the guest species preferably have a diameter not substantially greater than a diameter of the pore apertures in at least one direction. Furthermore, it is noted here that some nanoporous materials (e.g. MOFs) may have structural flexibility, and so species that are slightly larger than the aperture can still be received into the pore via the aperture. Preferably the pore aperture diameter is from 0.5 nm to 10 nm.

The dimensions of the pore apertures of the nanoporous host material can be determined from the crystal structure, e.g. using single-crystal x-ray diffraction by a process well understood by those skilled in the art. Some examples are shown in FIG. 2 of Jiao et al (2016) and in FIG. 2 of Ma and Balbuena (2012). Alternatively it can be measured by e.g. SEM, or micro-computed tomography (micro-CT), in a manner well known to the skilled person.

The diameter of the infiltrating species (e.g. target guest precursor or reagent), where the infiltrating species is an ion, may be determined with reference to the effective ionic radius considering both the ion centre and the solvation shell. This depends in part on the solvent. The effective ionic radius may be determined as disclosed in Michov (2013), where it is referred to as the electro-kinetic radius. Where the infiltrating species is non-ionic, the diameter may be defined as the "critical molecular diameter i.e. the diameter of the cylinder which can circumscribe the molecule in its most favourable equilibrium configuration, as described in N. Y. Chen et al. (1994). "Molecular Transport and Reaction in Zeolites: Design and Application of Shape Selective Catalysis". John Wiley & Sons, Inc., chapter 5.1.2, page 133.

The target guest species is not particularly limited. Preferable the target guest species is a metal-containing species. The target guest species may be based on a target element selected from the periodic table except elements from the noble gas group (group 0). Preferably, the target guest species is based on a target element selected from: Be, B, Mg, Al, Si, P, S, Ca, Ga, Ge, As, Se, Sr, In, Sn, Sb, Te, Ba, TI, Pb, Bi, Sc, Ti, V, Cr, Mn, Fe, Co, Ni, Cu, Zn, Y, Zr, Nb, Mo, Tc, Ru, Rh, Pd, Ag, Cd, La, Hf, W, Re, Os, Ir, Pt, Au, Hg, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr, Ac, Ra, Rf, db, Sg, Bh, Hs, Mt, Ds, Rg, Cn, Fl and Lv. These target elements may be grouped into a category selected from the following: a transition metal, a rare earth element, an alkaline earth metal, a post-transition metal, a metalloid or a non-metal element (see, e.g. https://www.livescience.com/28507-element-groups.html).

More preferably, the target guest species is based on a target element selected from a transition metal or a rare earth element. Rare earth elements may be particularly preferable due to their optoelectronic (e.g. phosphorescence) and magnetic properties. The target guest species may be e.g. a metal, a metal alloy, an oxide (including hydrous oxide), hydroxide, sulphide, nitride or phosphide species. Preferably, the target guest species is a metal or a metal alloy, or an oxide, hydroxide, or sulphide species.

The target guest precursor is also not particularly limited, other than it must be a suitable precursor for the target guest species. Accordingly, the target guest precursor may also be based on a target element selected from the periodic table except elements from the noble gas group (group 0). Preferably, the target guest species is based on a target element selected from: Be, B, Mg, Al, Si, P, S, Ca, Ga, Ge, As, Se, Sr, In, Sn, Sb, Te, Ba, TI, Pb, Bi, Sc, Ti, V, Cr, Mn, Fe, Co, Ni, Cu, Zn, Y, Zr, Nb, Mo, Tc, Ru, Rh, Pd, Ag, Cd, La, Hf, W, Re, Os, Ir, Pt, Au, Hg, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr, Ac, Ra, Rf, db, Sg, Bh, Hs, Mt, Ds, Rg, Cn, Fl and Lv. More preferably, the target guest species is based on a target element selected from a transition metal or a rare earth element. Rare earth elements may be particularly preferable due to their optoelectronic (e.g. phosphorescence) and magnetic properties. The target guest precursor is preferably an ionic species. Preferably, the target guest precursors is e.g. an oxyanion ($A_xO_y^{z-}$), a cation ($A^{x+}$) (e.g. halides, sulphates, etc.), $H_xA_yO_z^{n-}$, $A_x(OH)_y^{z-}$, $A_xS_y^{z-}$, $H_xA_yS_z^{n-}$, $A_x(SH)_y^{z-}$ and $H_xA_yO_zS_m^{n-}$, where A is the target element, x, y, z, m and n are numbers including 0. Preferably, the target guest precursor is soluble in aqueous solution. The target guest precursor may be soluble in other solvents. For example, the target guest precursor may be soluble in organic solvents including but not limited to: aromatic compounds (e.g. benzene and toluene); alcohols (e.g. methanol, ethanol); esters; ethers; ketones (e.g. acetone); amines; nitrated halogenated hydrocarbons; dimethylformamide; dimethyl sulfoxide. The target guest precursor may be soluble in ionic liquids including but not limited to: ammonium; imidazolium-; phosphonium-; pyridinium-; pyrrolidinium-; sulfonium-based ionic liquids.

The one or more suitable reagents may comprise both a redox reagent and a pH modulator. In some cases, a single reagent may act as both a redox reagent and a pH modulator.

A pH modulator may be generally defined as any species that is a proton (H+) acceptor or donor, and may be e.g. an acid or a base. A pH modulator may be selected to control the pH of the reaction environment to be in the stable region of the target guest species on the relevant electrochemical potential vs pH diagram, taking the electrochemical potential of the reaction environment into consideration. In other words, the pH modulator may be selected to adjust the pH of the reaction environment by $\Delta$pH, where $\Delta$pH is determined as the difference in pH between a stable region of the target guest species and a stable region of the target guest precursor. The pH modulator may be an organic acid or base. Examples of organic bases include: pyridine, alkanamines, imidazole, benzimidazole, histidine, guanidine, phosphazene bases, and hydroxides. Examples of organic acids include: formic acid, acetic acid, propionic acid, butyric acid, valeric acid, caprilic acid, oxalic acid, lactic acid, malic acid, citric acid, banzioc acid, carbonic acid, phenol, uric acid, and taurine.

A redox reagent may be selected to control the electrochemical potential of the reaction environment to be in the stable region of the target guest species on the relevant electrochemical potential vs pH diagram, taking the pH of the reaction environment into consideration. In other words, the redox reagent may be selected to adjust the electrochemical potential of the reaction environment by $\Delta$E, where $\Delta$E is determined as a difference in electrochemical potential operable to change the electrochemical potential of the reaction environment from a stable region of the target guest precursor to a stable region of the target guest species. The redox reagent may be an oxidising reagent, or it may be a reducing agent. The $\Delta$E of the redox reagent may be determined using e.g. standard electrochemical cyclic voltammetry testing, where the redox potential of specific half-cell reactions are measured.

Preferably one or more of said reagents are hydrophobic. This may be particularly advantageous where the nanoporous host material is infiltrated with said reagent(s) to form a reagent@nanoporous-host material, and wherein the step of infiltrating the reagent@nanoporous-host material with the target guest precursor is performed in aqueous solution, because the reagent(s) will tend to remain in the pores of the nanoporous host, rather than leaching out. This can help to control loading of the target guest in the nanoporous-host material. However it is not essential for one or more of the reagents to be hydrophobic. In some instances, none of the reagents will be hydrophobic. In some instances one or more of the reagents may alternatively or additionally by hydrophilic.

The temperature-controlled desorption step may comprise heating the reagent@nanoporous-host material or the precursor@nanoporous-host material at a temperature from e.g. 20° C. or more, up to temperatures of e.g. 500° C. or less. The upper limit of the temperature-controlled desorption step is primarily controlled by the thermal stability and decomposition temperature of the host material. E.g. for MOF host materials, the upper temperature limit may be around 250° C. to 300° C. However, for zeolite host materials, it may be higher than this. Preferably the temperature-controlled desorption step is performed at temperatures from 20° C. to 300° C. More preferably, the temperature-controlled desorption step is performed at temperatures from 50° C. to 250° C. Most preferably, the temperature-controlled desorption step is performed at temperatures from 100 to 150° C. Use of higher temperatures may provide for greater desorption of reagent from the outer surface of the nanoporous host material. However, it may also encourage some desorption of reagent from inside the pore of the nanoporous host material, particularly at peripheral regions of the host material. Accordingly, the temperature should be selected as appropriate the balance these two factors.

The temperature-controlled desorption step may comprise heating the reagent@nanoporous-host or the precursor@nanoporous-host material for a time between e.g. 1 second and 48 hours, for example between 10 minutes and 2 hours. The temperature-controlled desorption step may comprise heating the reagent@nanoporous-host or the precursor@nanoporous-host material for a time of 1 second or more, 10 seconds or more, 1 minute or more, 10 minutes or more, or 1 hour or more, up to and including 48 hours or less, 36 hours or less, 24 hours or less, 12 hours or less, 4 hours or less or 2 hours or less. The precise amount of time needed for the temperature-controlled desorption step is not particularly limited. Preferably, the time should be selected so that it is long enough to allow satisfactory desorption of molecules outside the host, but short enough to prevent significant loss of molecules inside the host. It should be noted that: generally, (i) for the same molecule the higher the temperature, the shorter the duration; (ii) at the same temperature, the smaller the molecule, the shorter the duration; (iii) at the same temperature, the weaker the molecule-host attractive interaction, the shorter the duration.

The pressure at which the temperature-controlled desorption step is undertaken may also affect the extent of desorption. Whilst it is preferable to perform this step at ambient pressure, in some cases it may be advantageous to perform the temperature-controlled desorption step under low pressure, to aid desorption. Low pressure is herein defined as any pressure below atmospheric pressure (101325 Pa).

Performing the temperature-controlled desorption step may provide for greater desorption of reagent or precursor from the outer surface of the nanoporous host material. However, it may also encourage some desorption of reagent or precursor from inside the pore of the nanoporous host material, particularly at peripheral regions of the host material. Accordingly, the time for which this step is carried out should be selected as appropriate the balance these two factors.

The temperature-controlled desorption step may be performed in an inert atmosphere, for example, in a $N_2$ atmosphere, or in an Ar atmosphere. This can help to ensure that reagent@nanoporous-host material or the precursor@nanoporous-host material does not undergo any unwanted chemical reaction during this step.

In a fifth aspect, there is provided a guest@nanoporous-host material manufactured according to the methods as described above in relation to the first, second or fourth aspects.

In a sixth aspect, there is provided use of a guest@nanoporous-host material of the fifth aspect as a catalyst.

The invention includes the combination of the aspects and preferred or optional features described except where such a combination is clearly impermissible or expressly avoided.

SUMMARY OF THE FIGURES

Embodiments and experiments illustrating the principles of the invention will now be discussed with reference to the accompanying figures in which.

Figure 3:
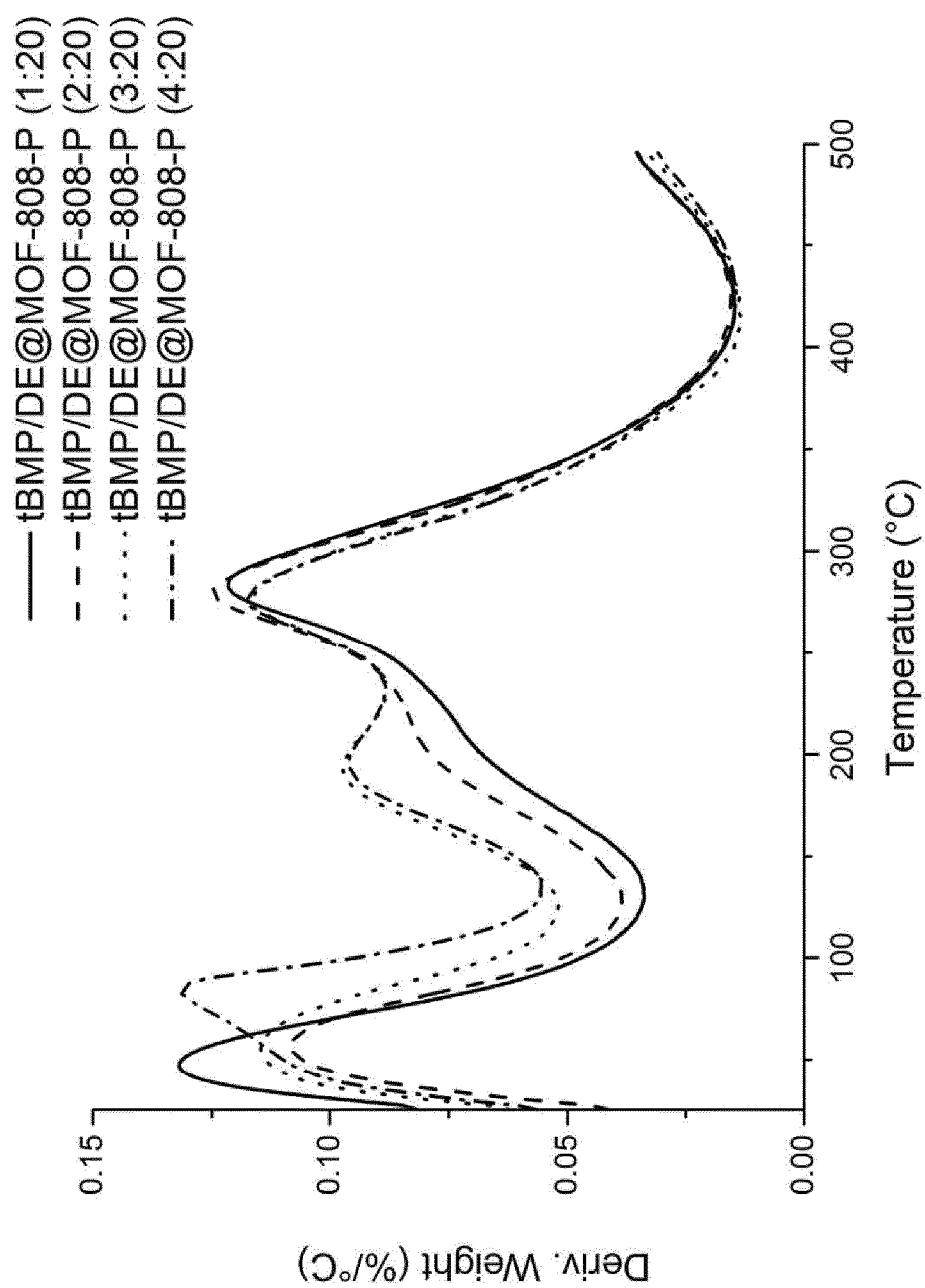
Figure 4:
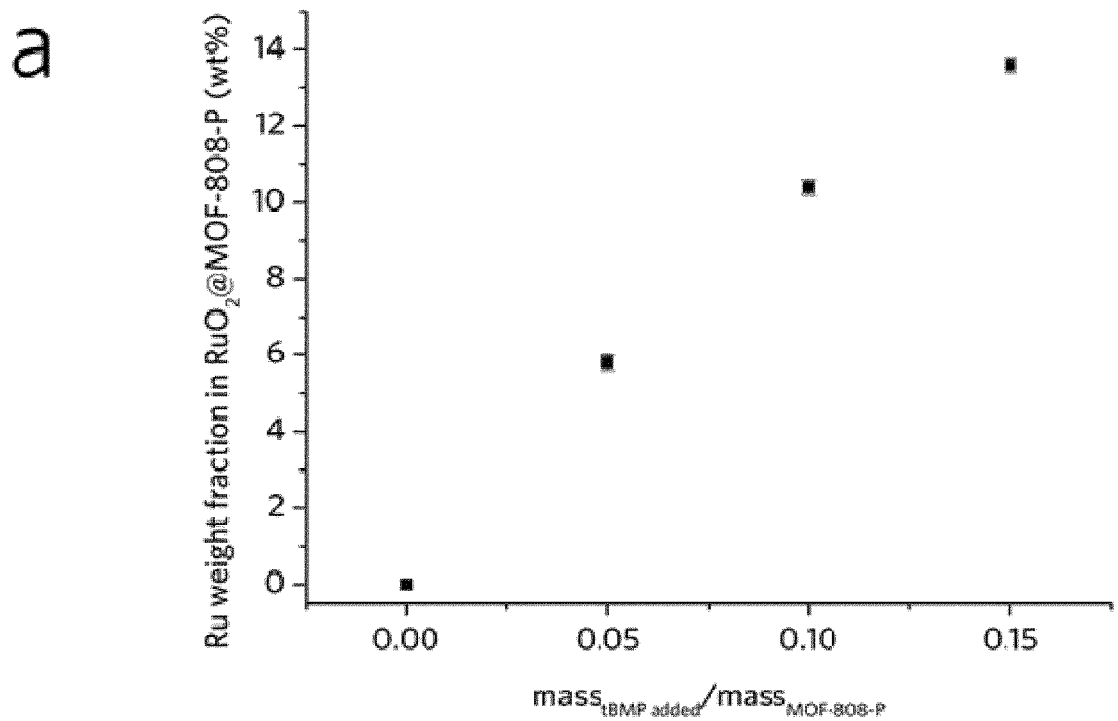
Figure 4:
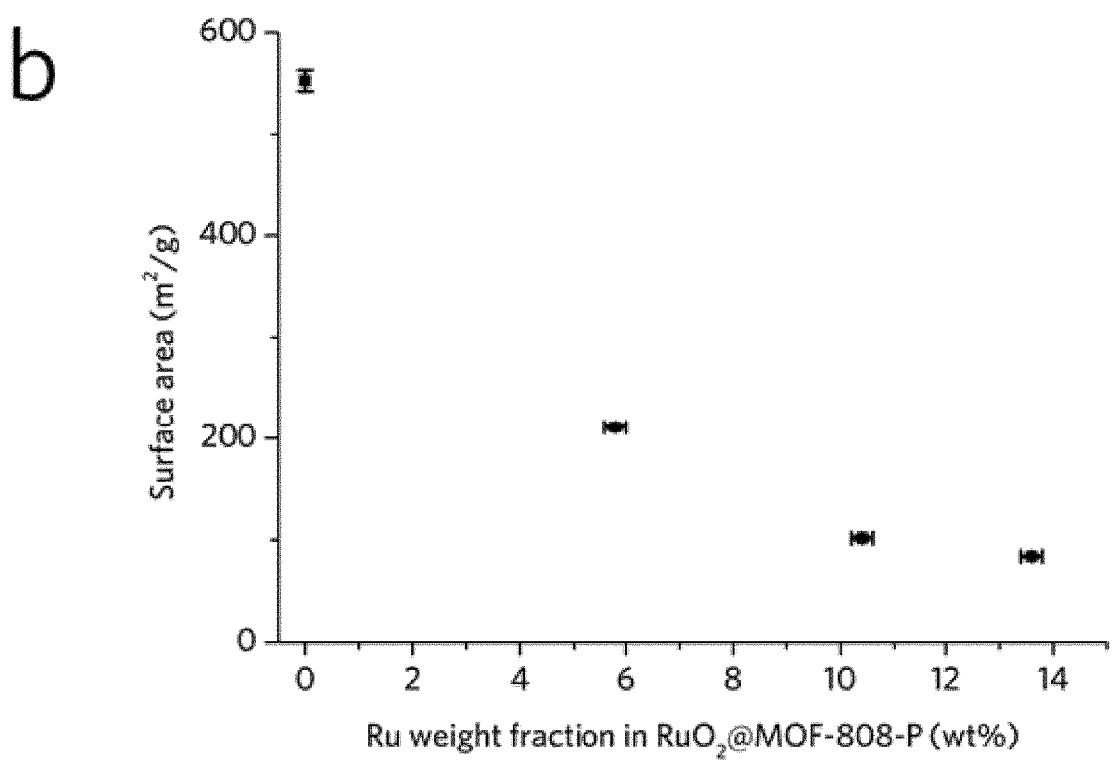
Figure 4:
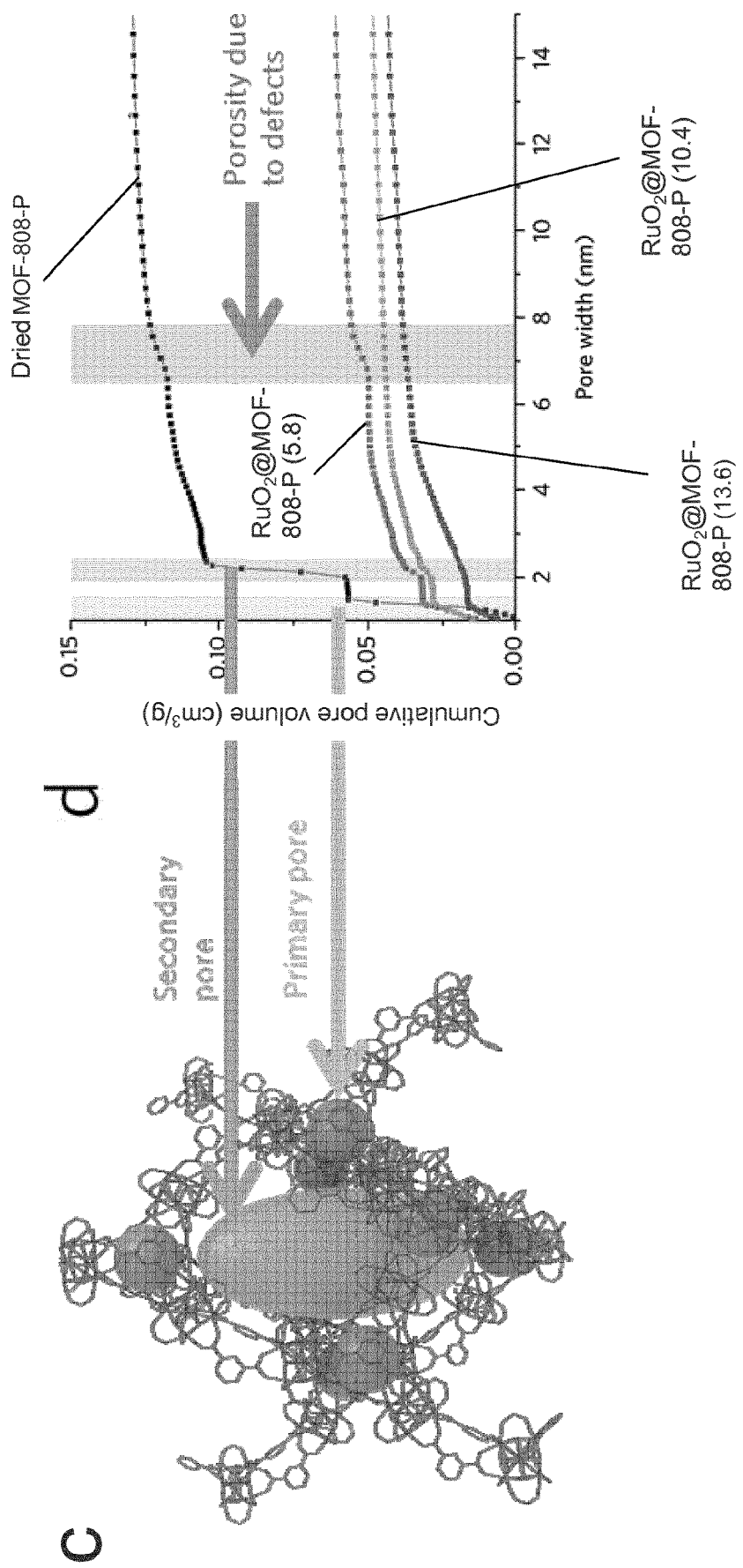
Figure 5:
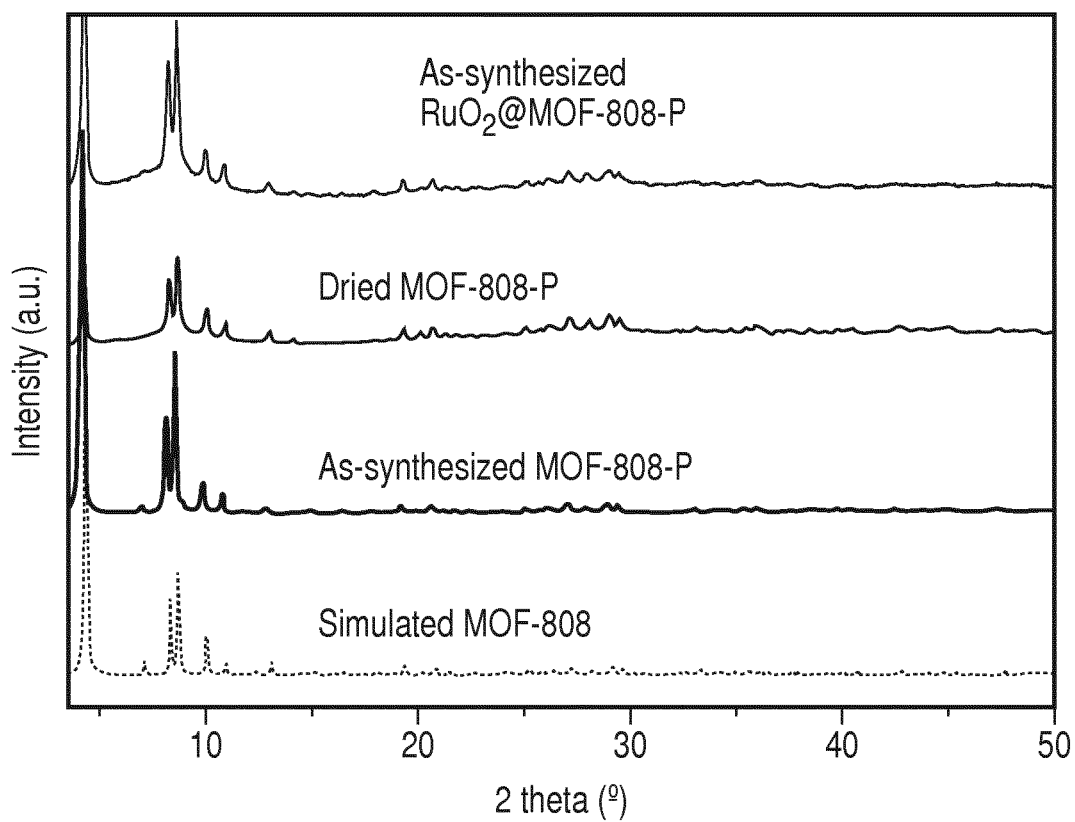
Figure 6:
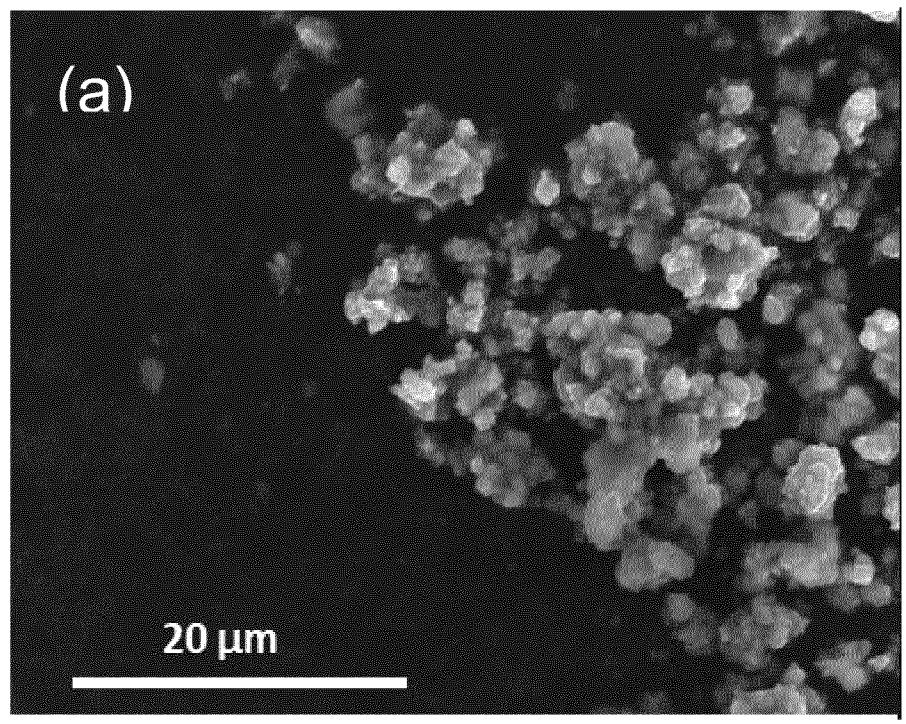
Figure 6:
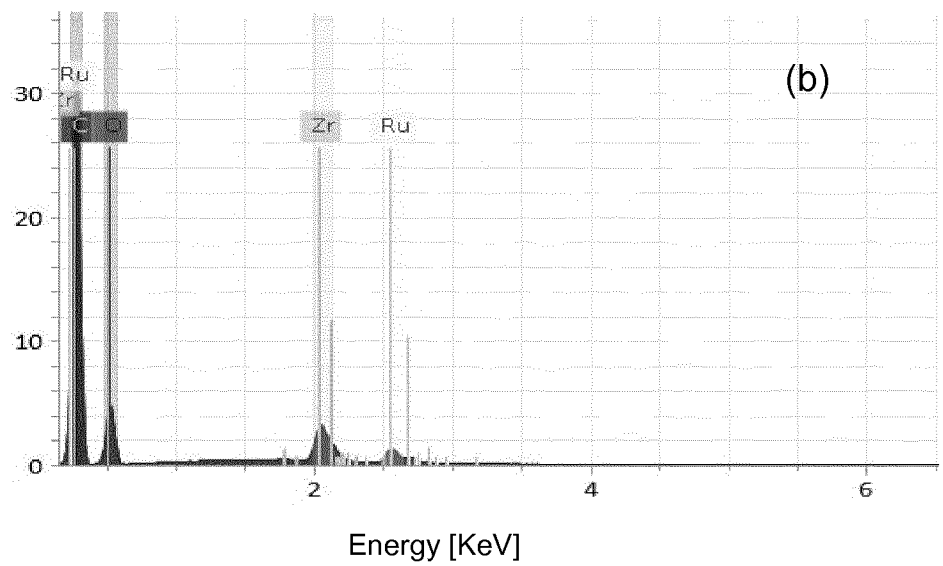
Figure 6:
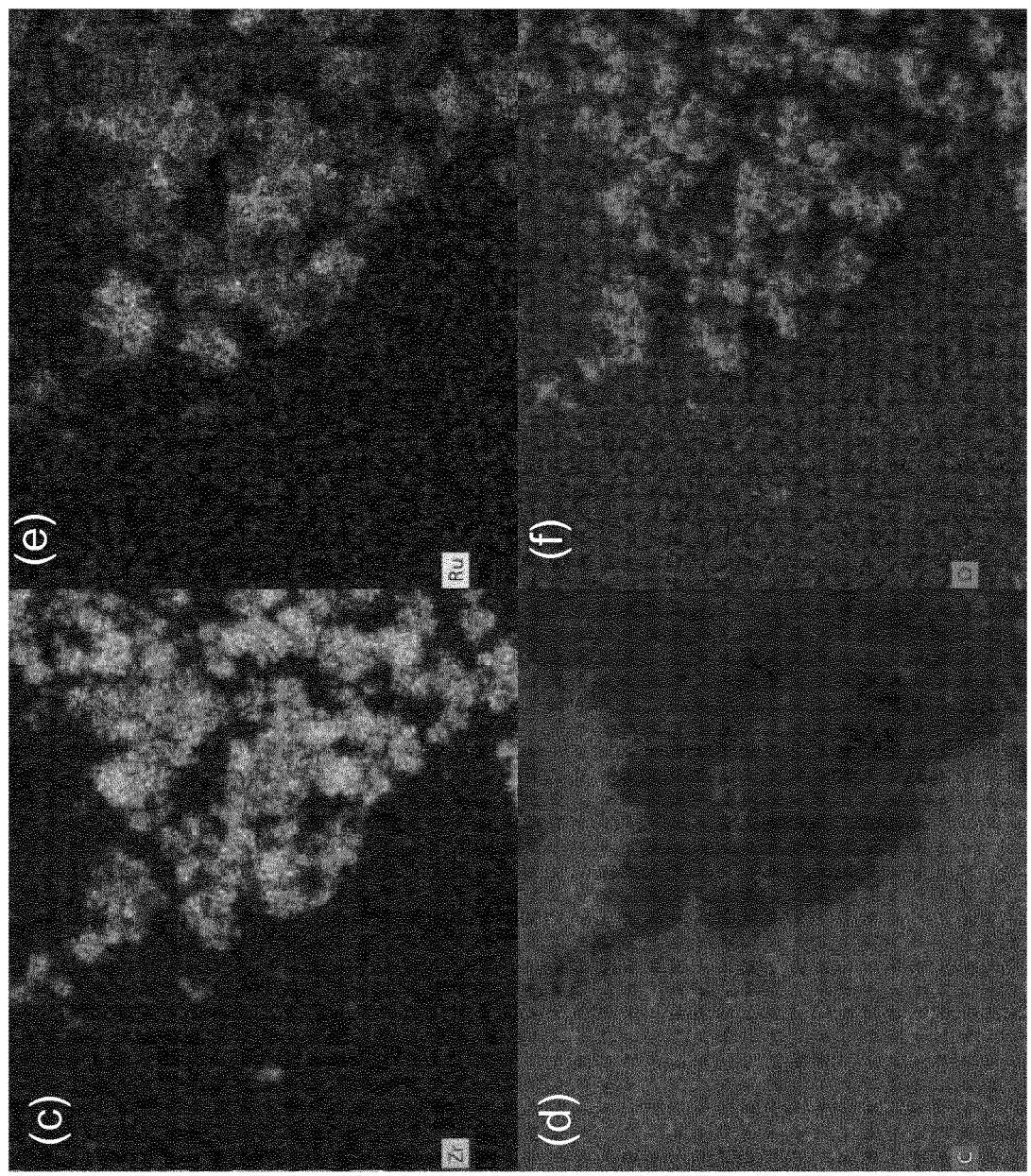
Figure 7:
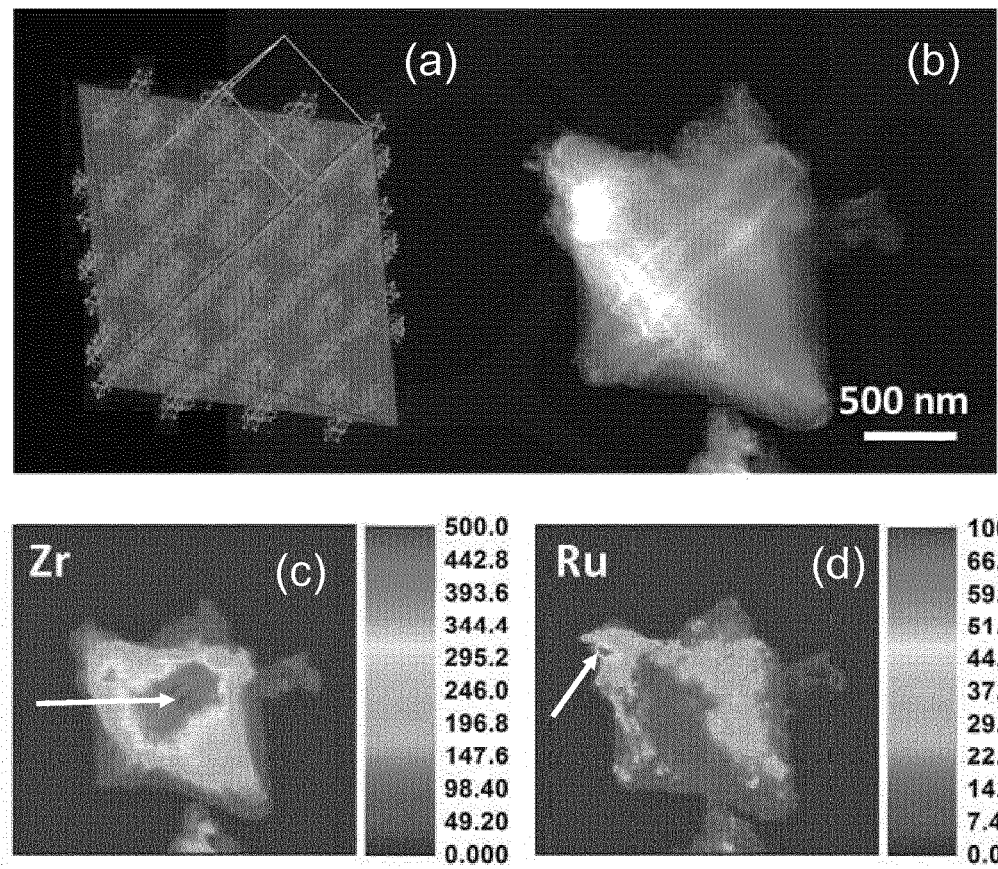
Figure 8:
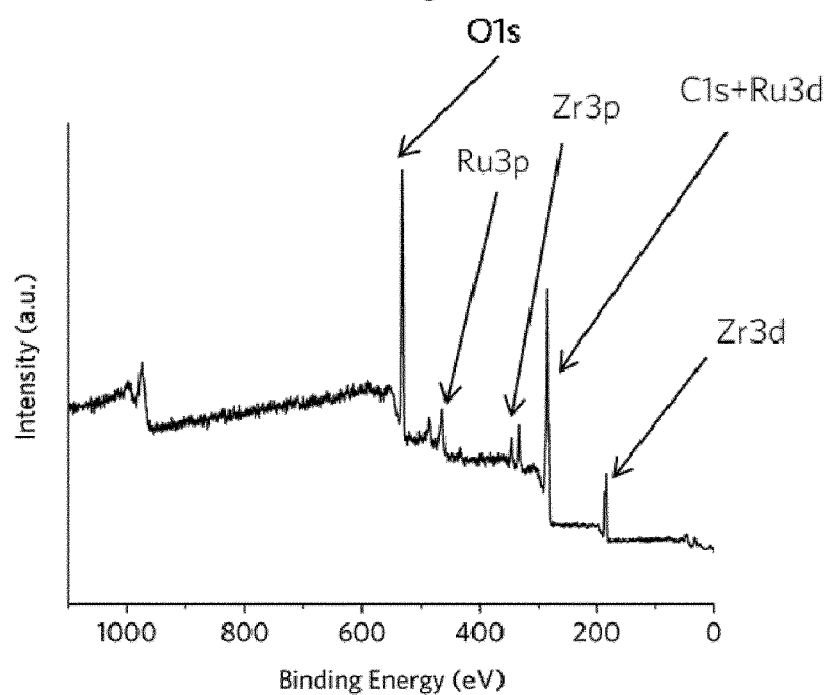
Figure 9:
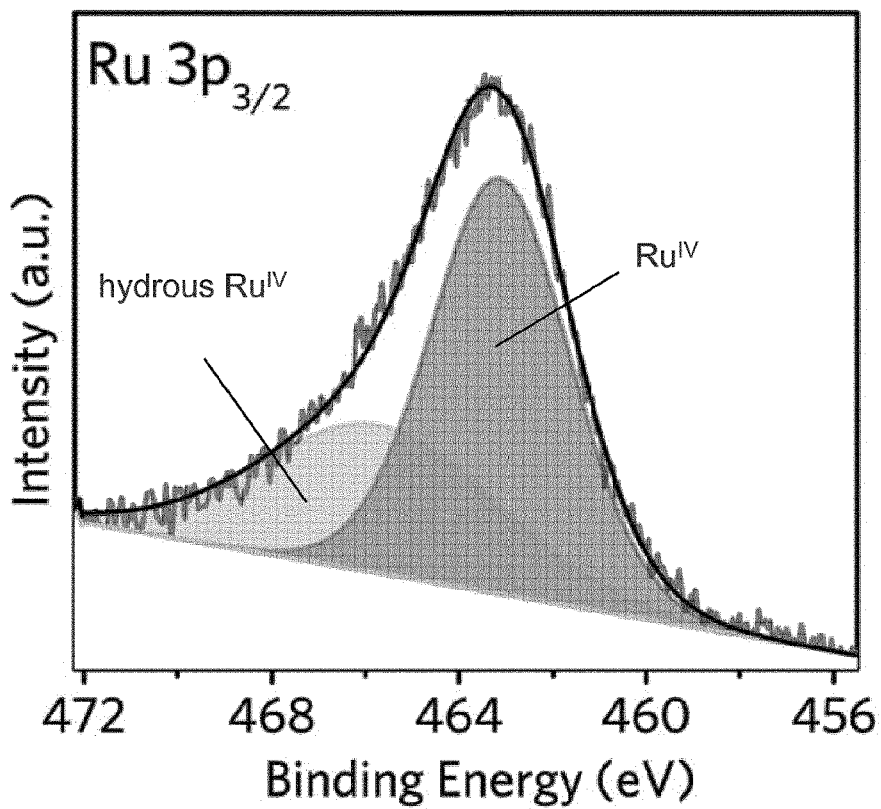
Figure 10:
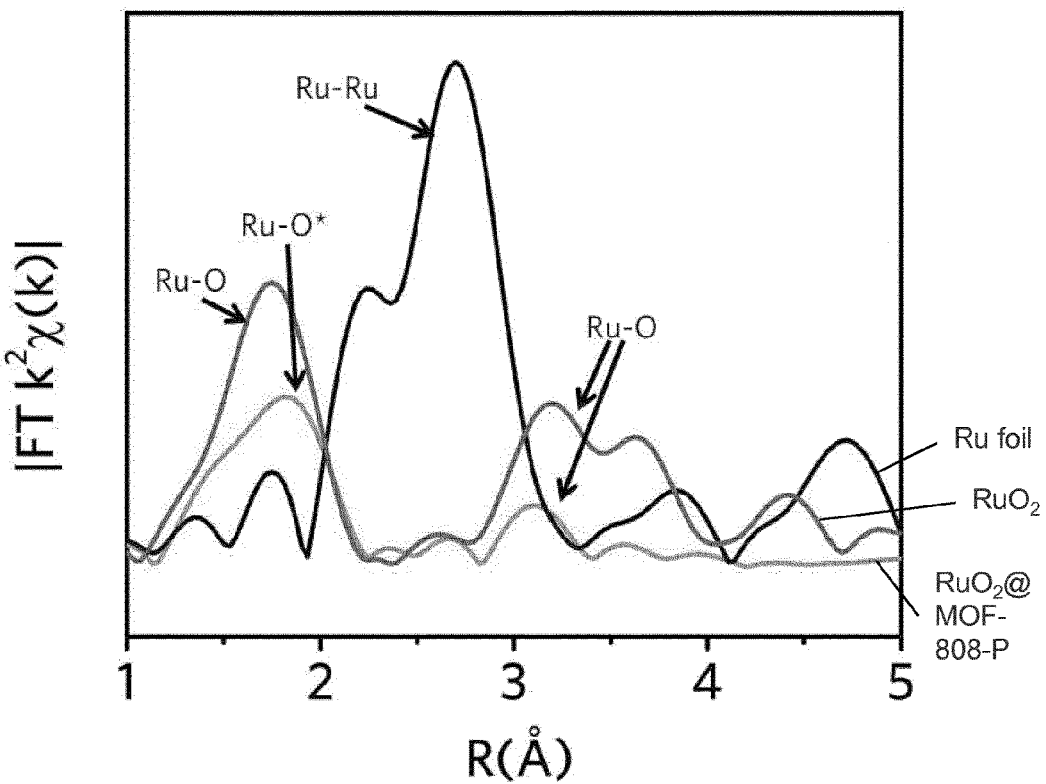
Figure 11:
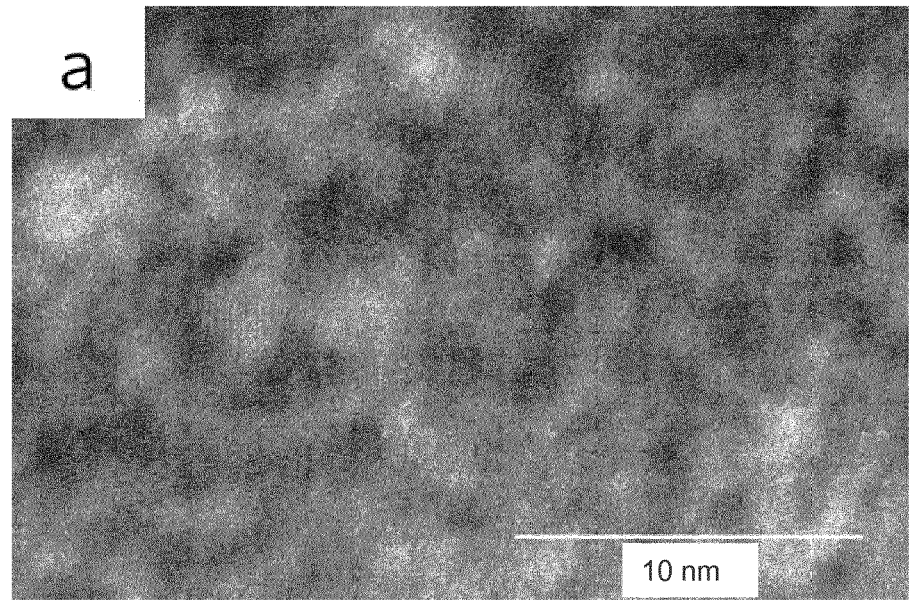
Figure 11:
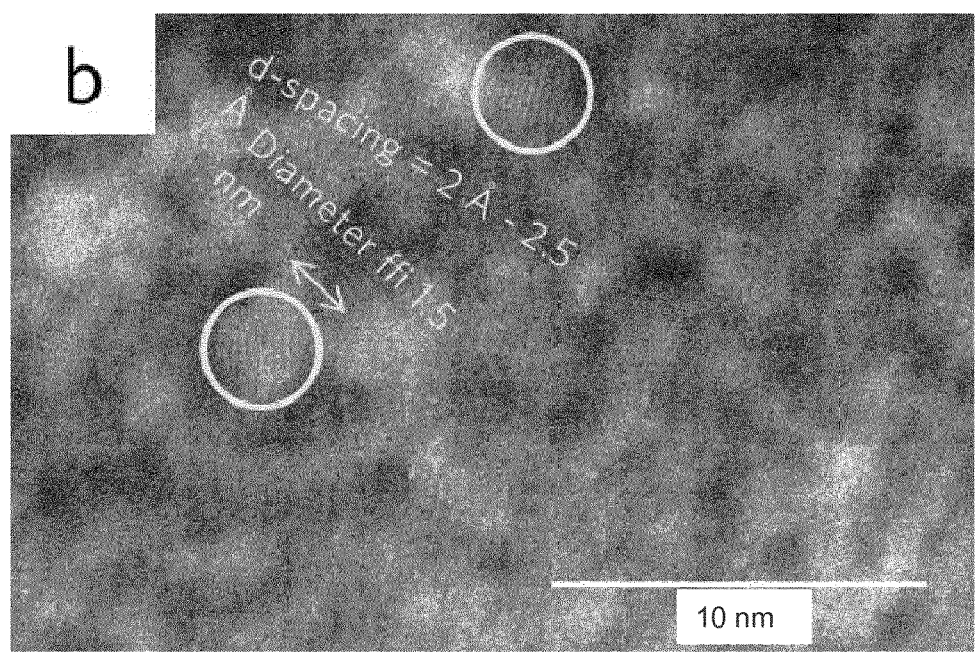
Figure 11:
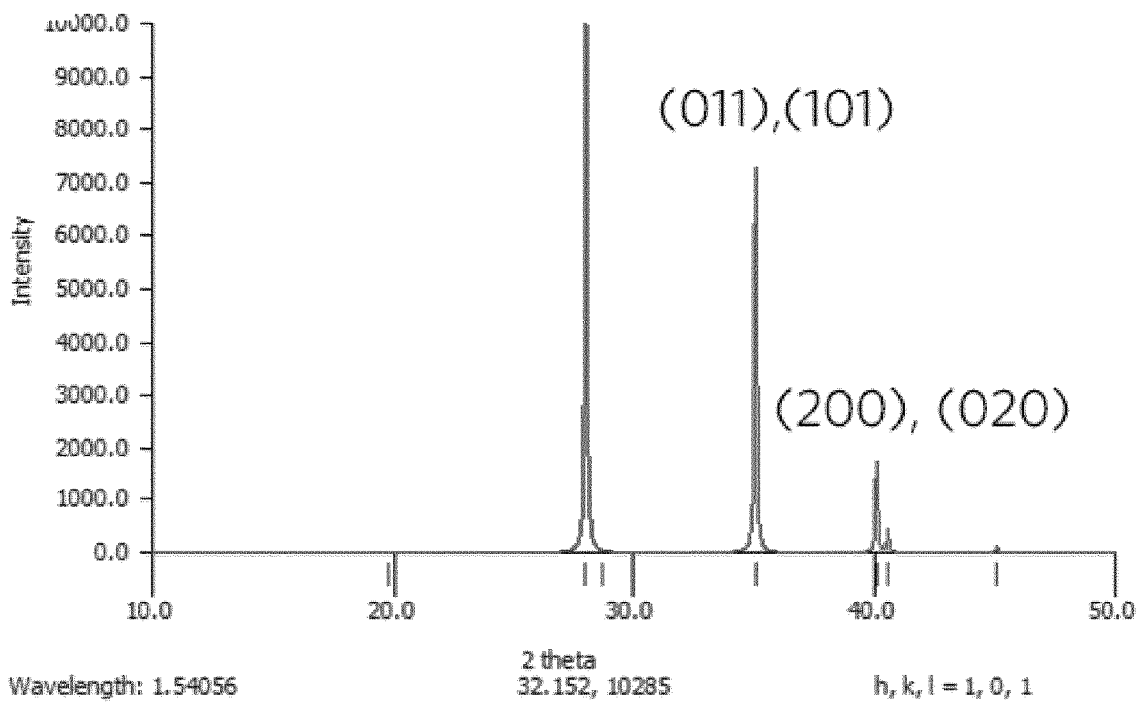
Figure 11:
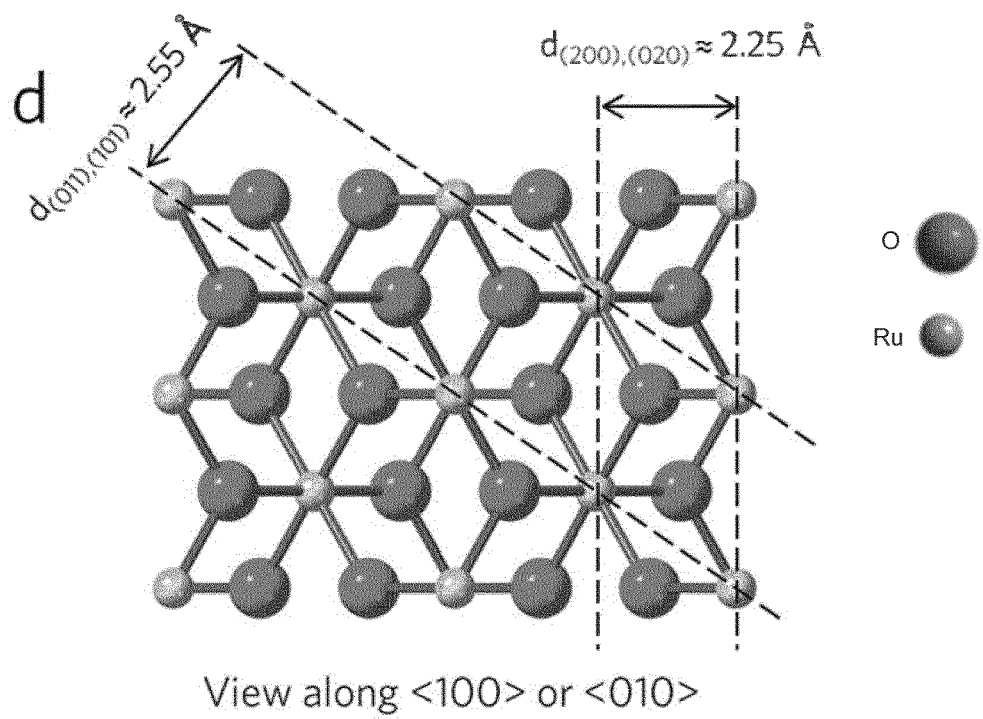
Figure 12:
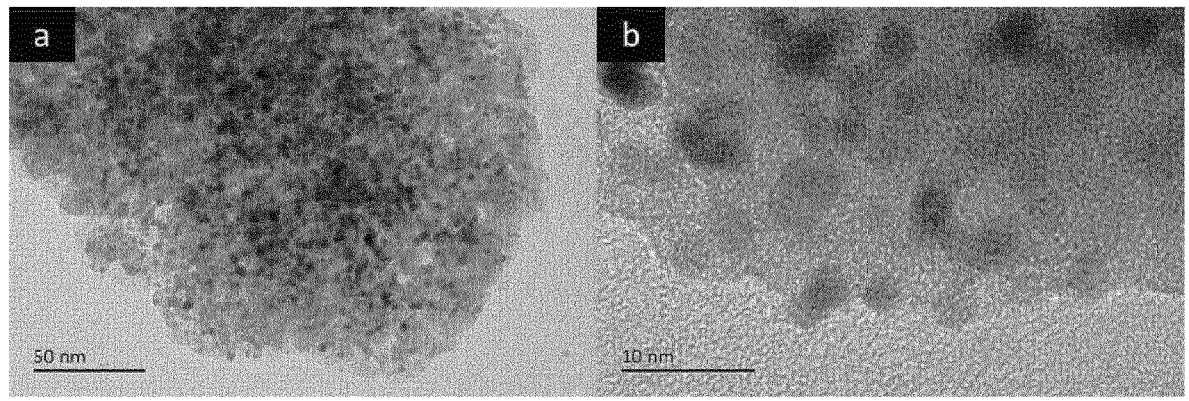
Figure 13:
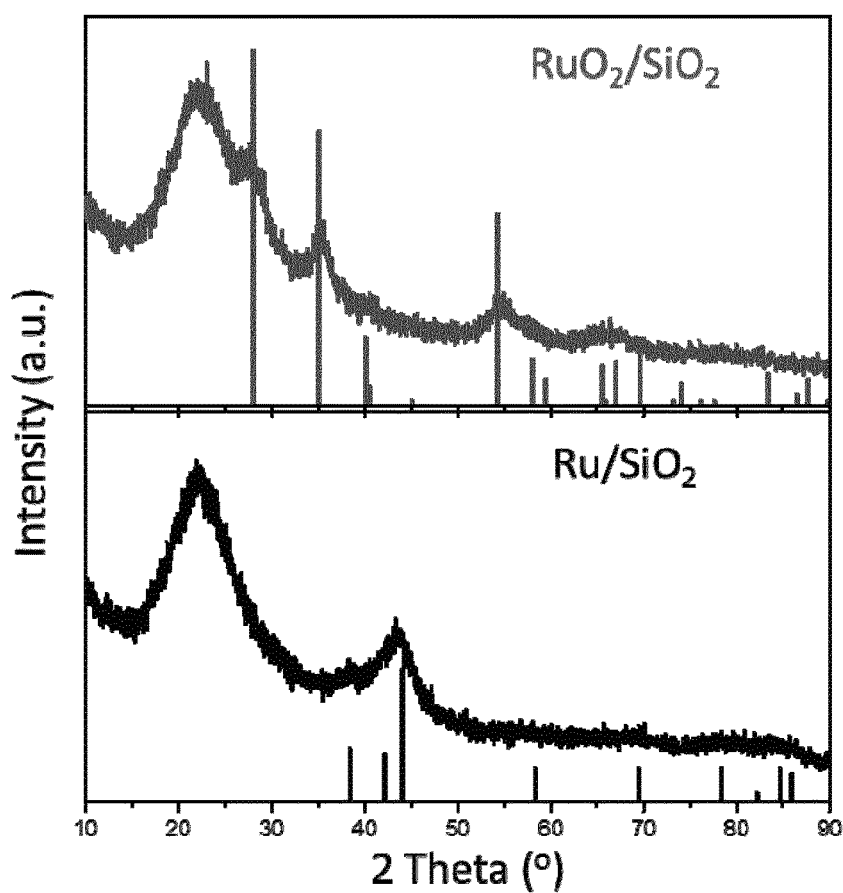
Figure 14:
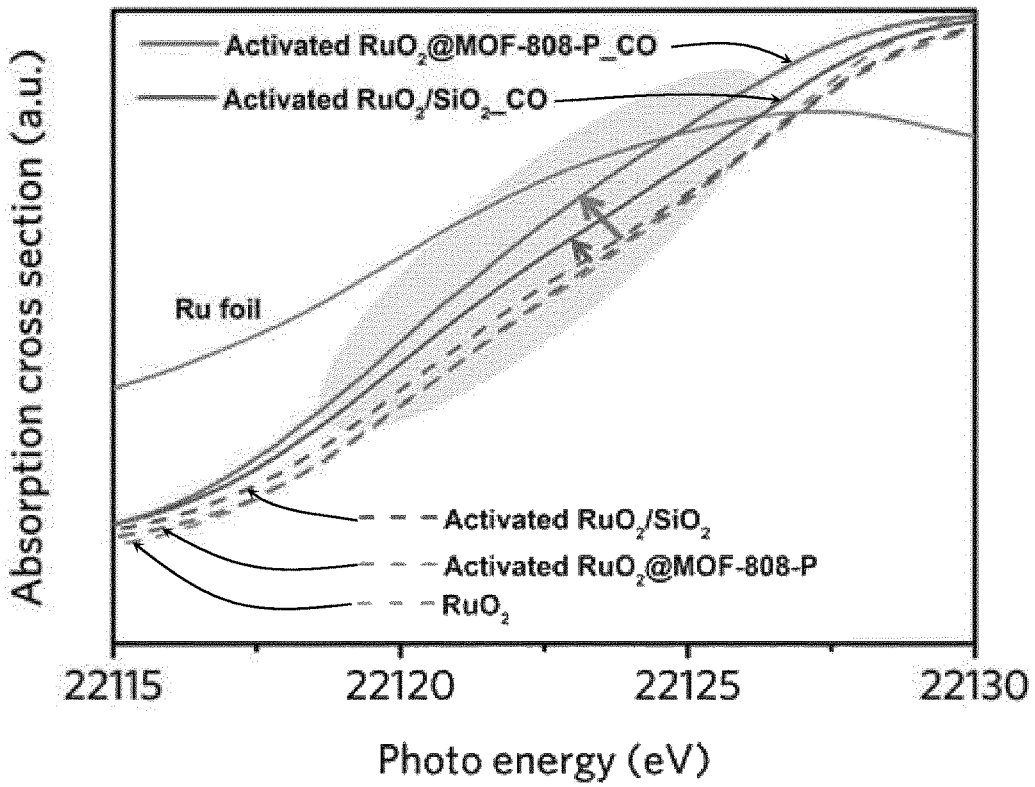
Figure 15:
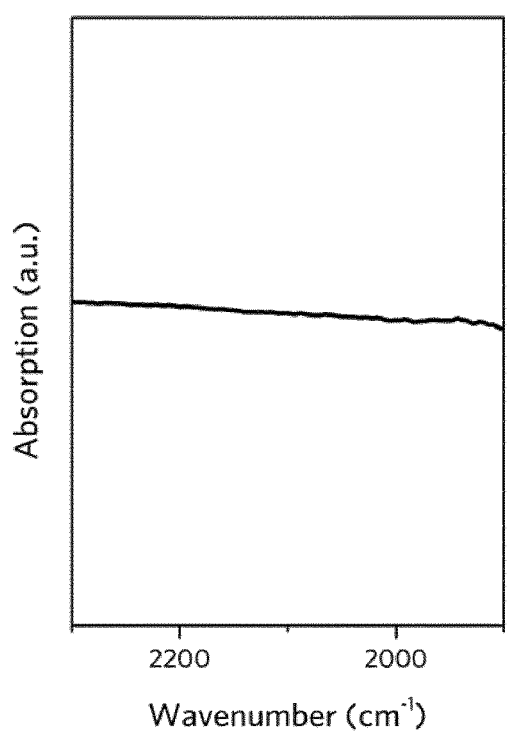
Figure 16:
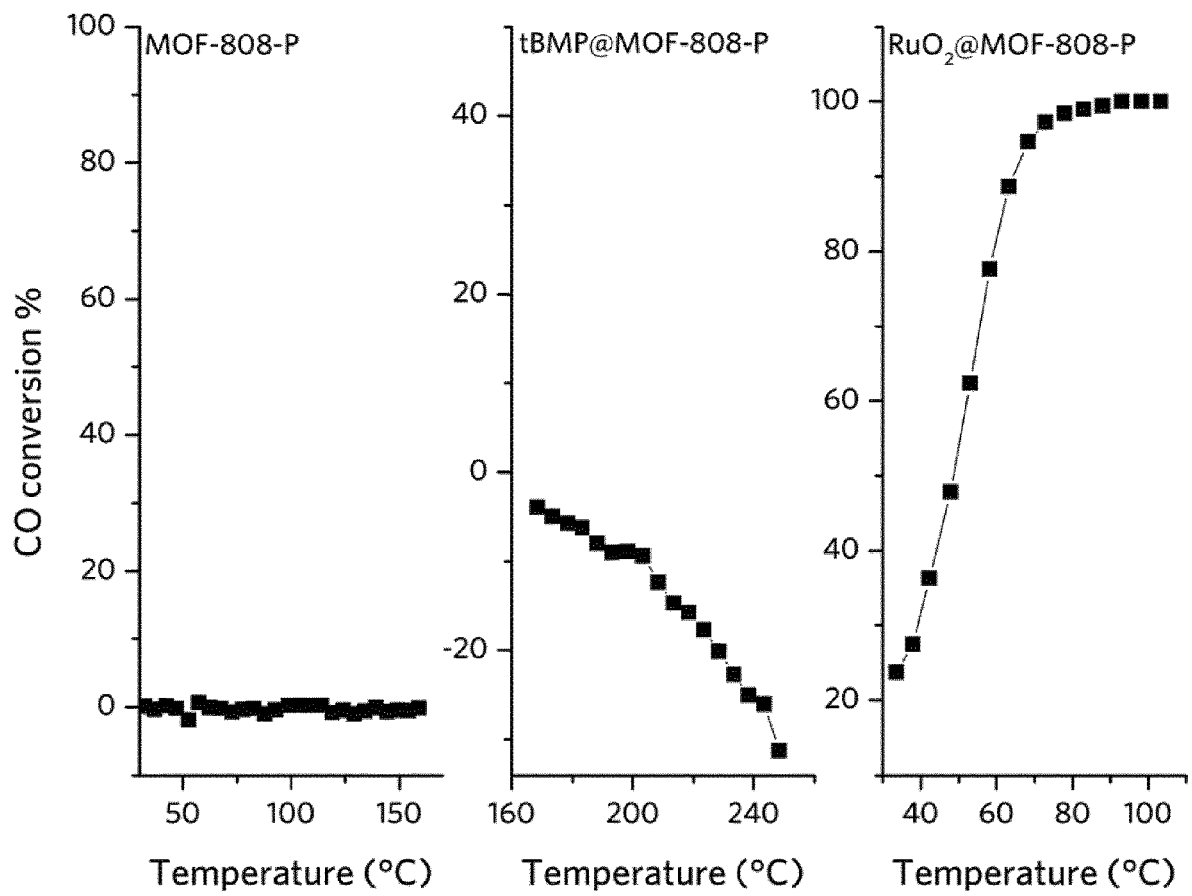
Figure 17:
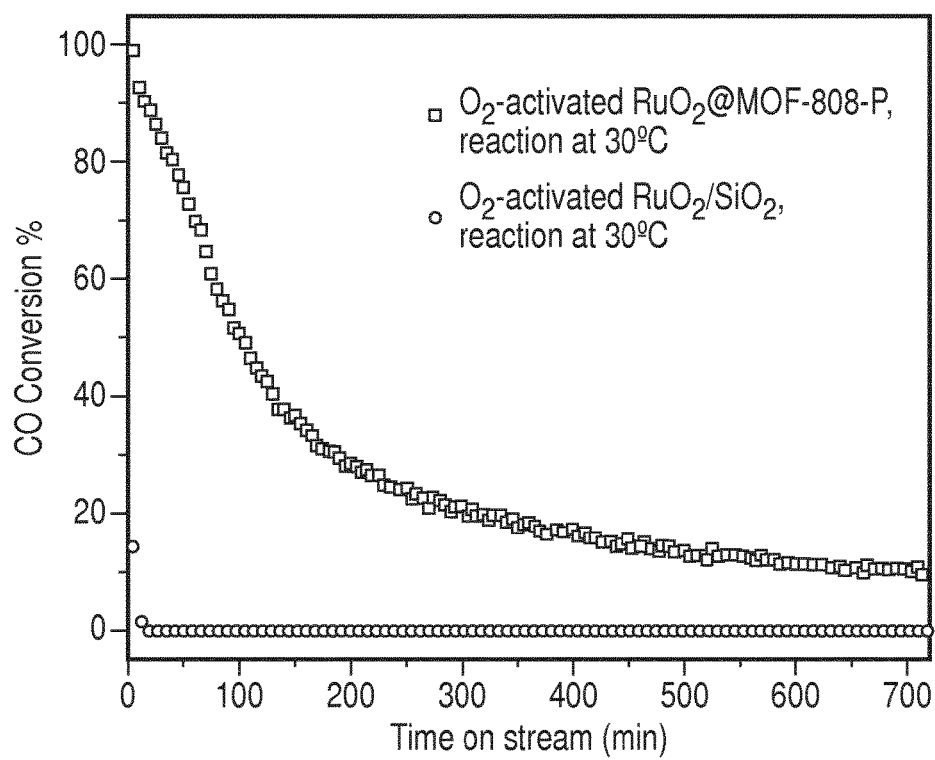
Figure 18:
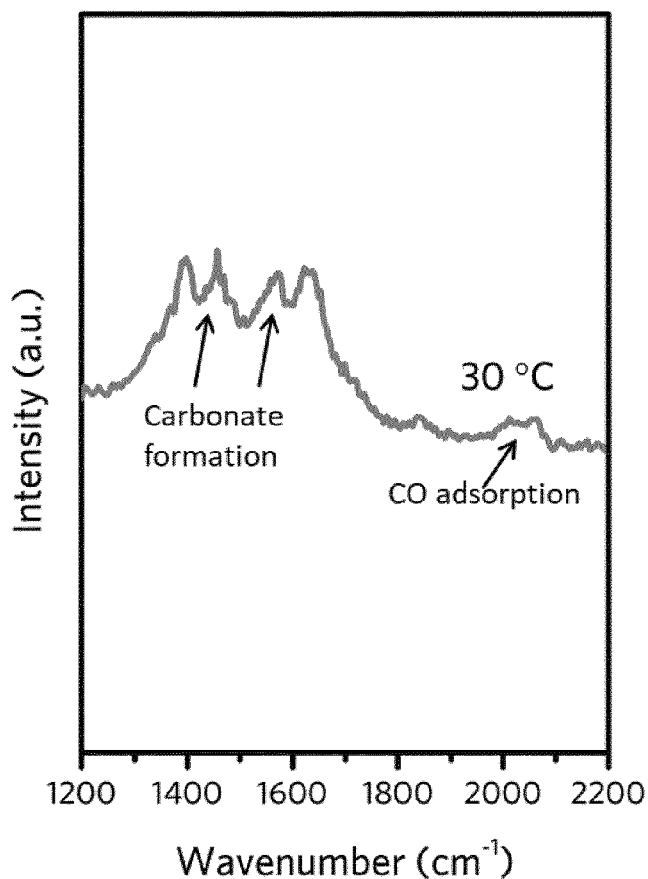
Figure 19:
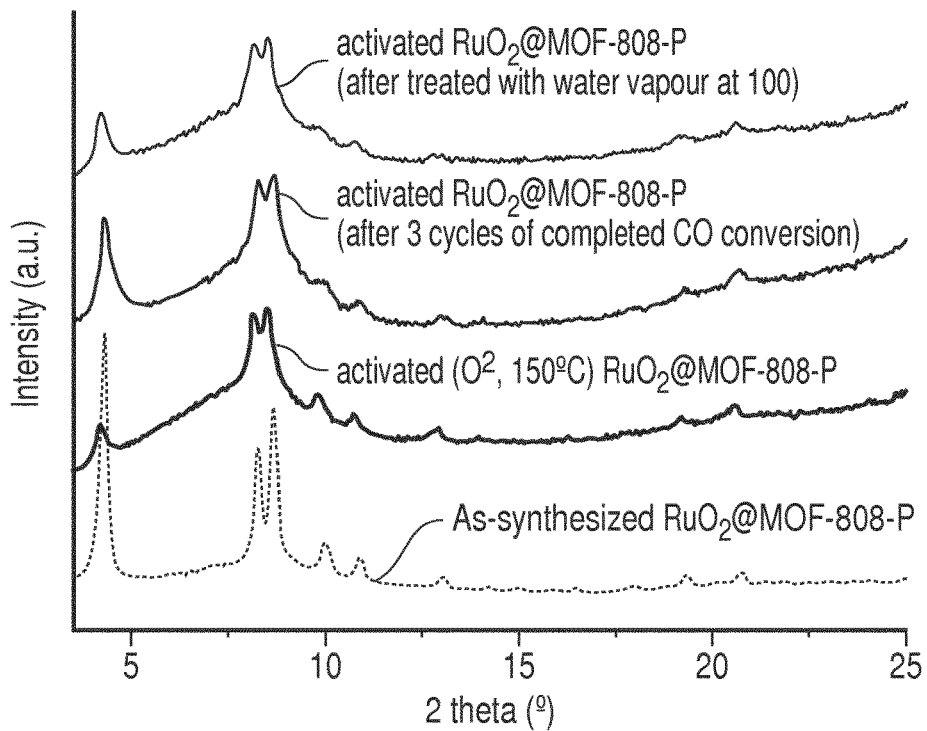
Figure 20:
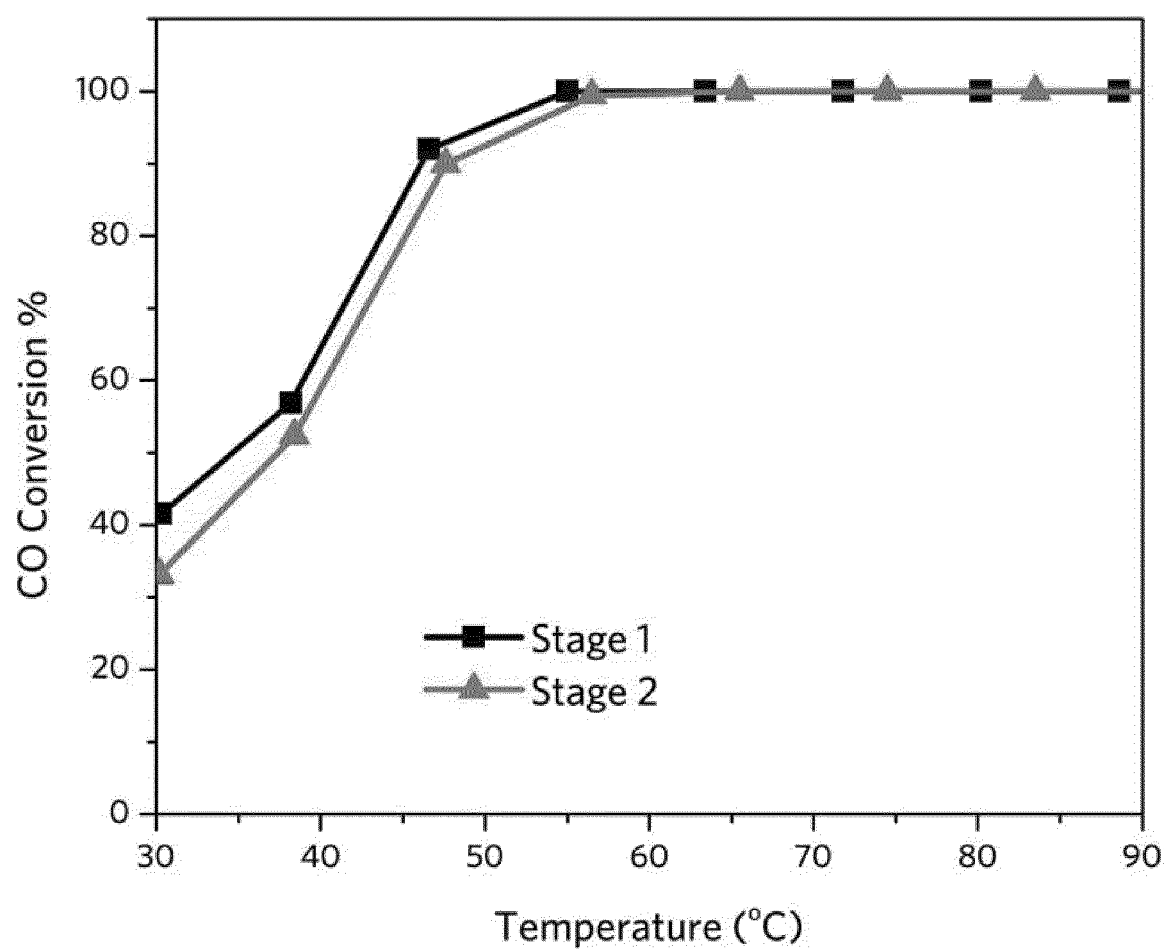
Figure 21:
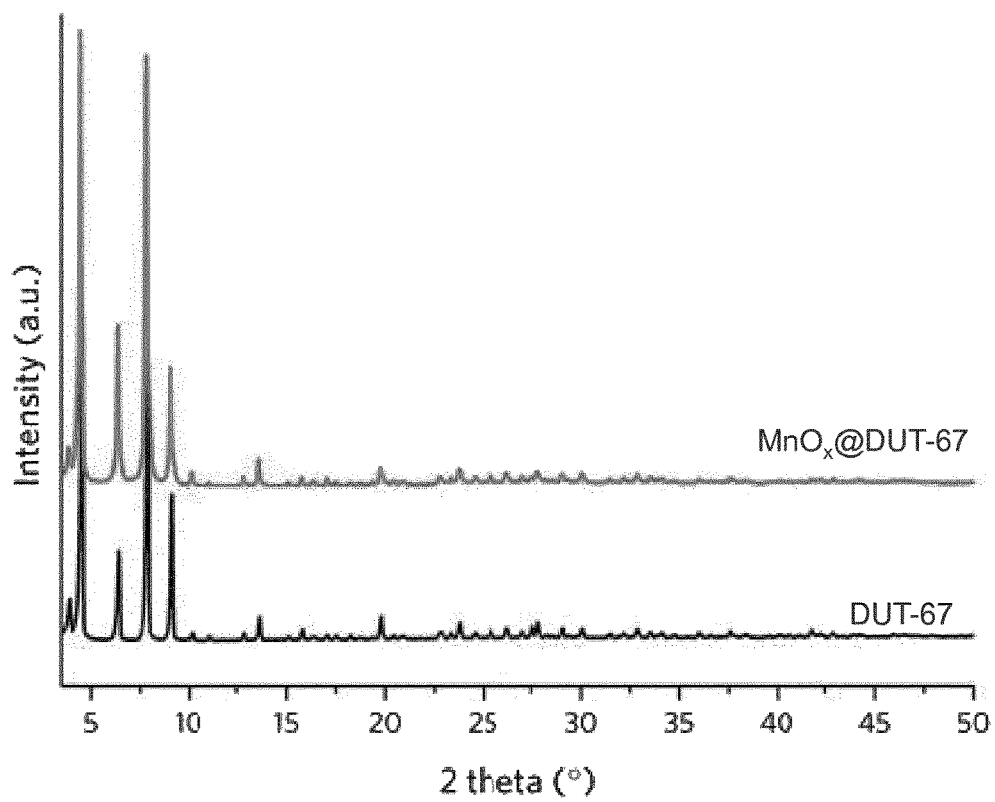
Figure 22:
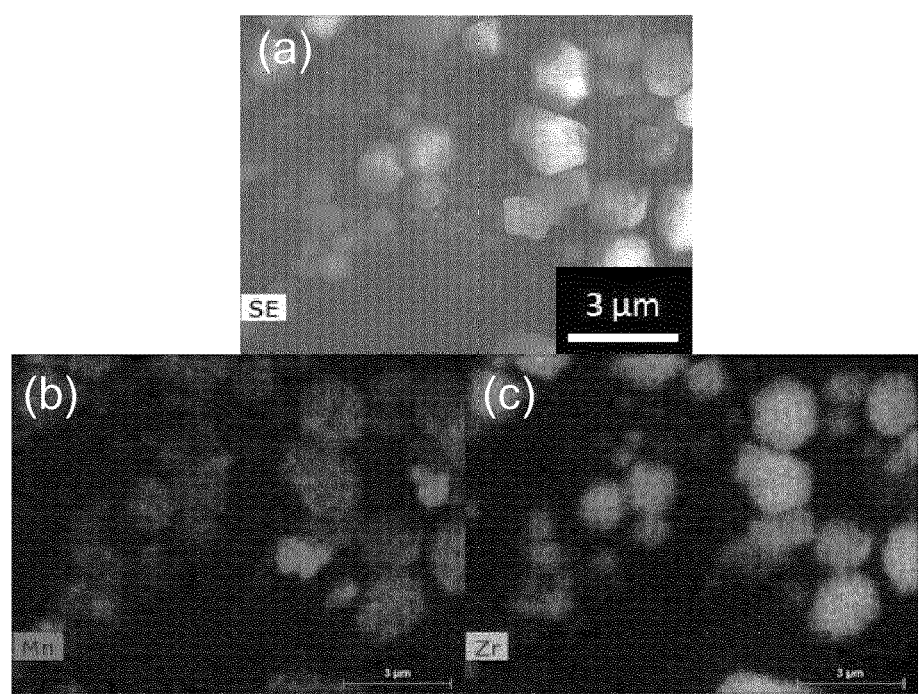
Figure 23:
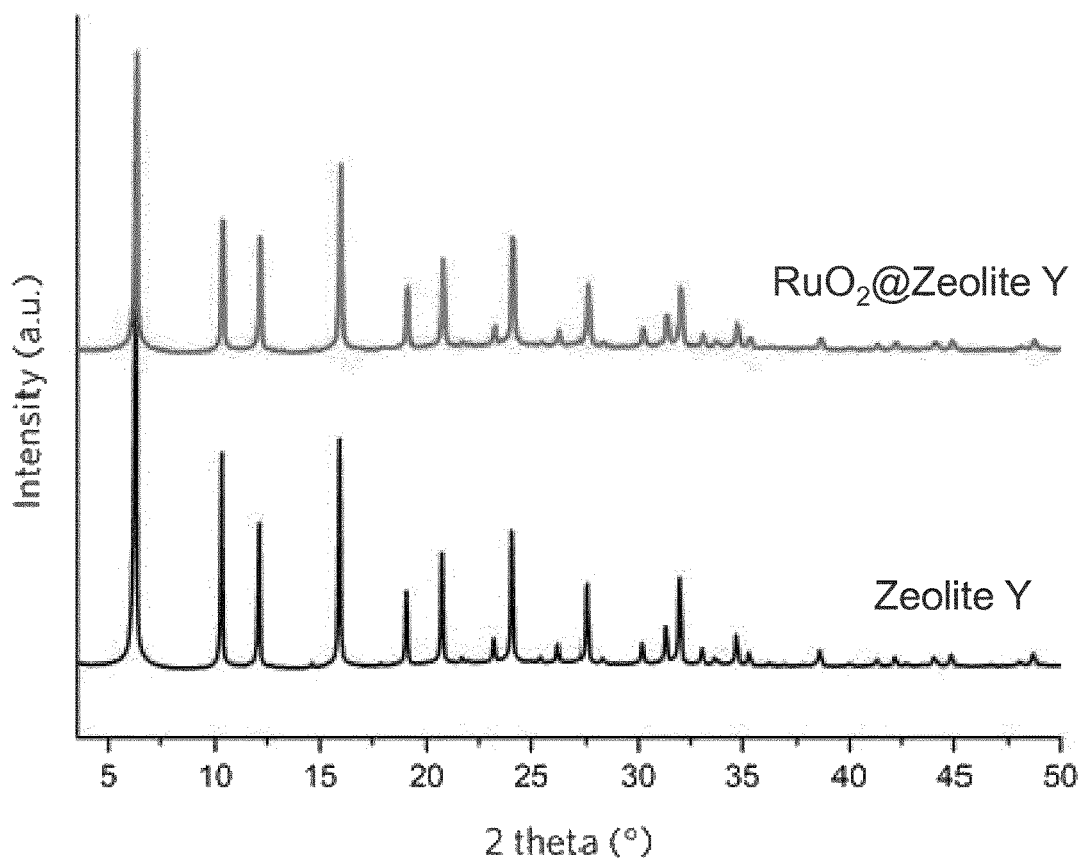
Figure 24:
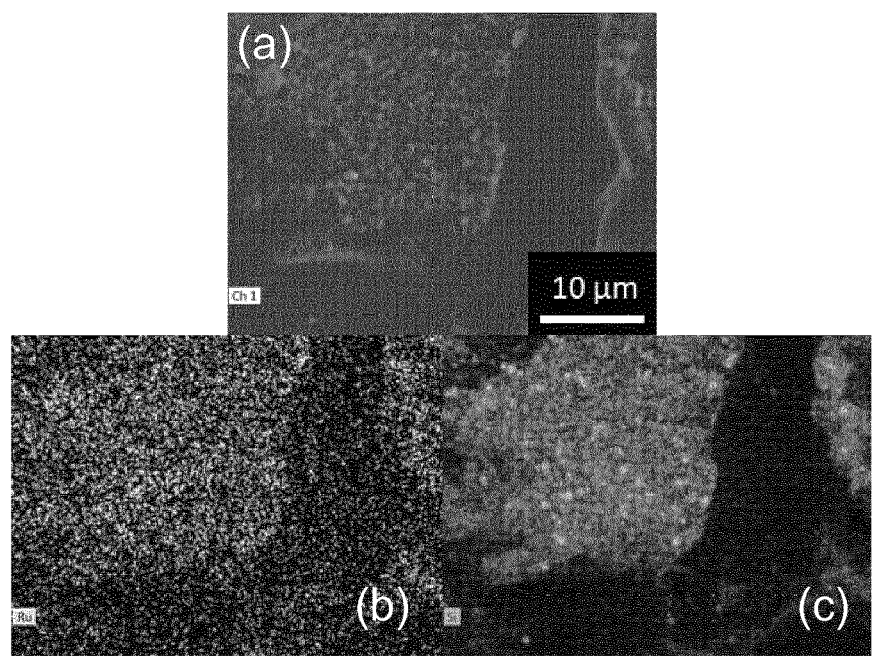
Figure 25:
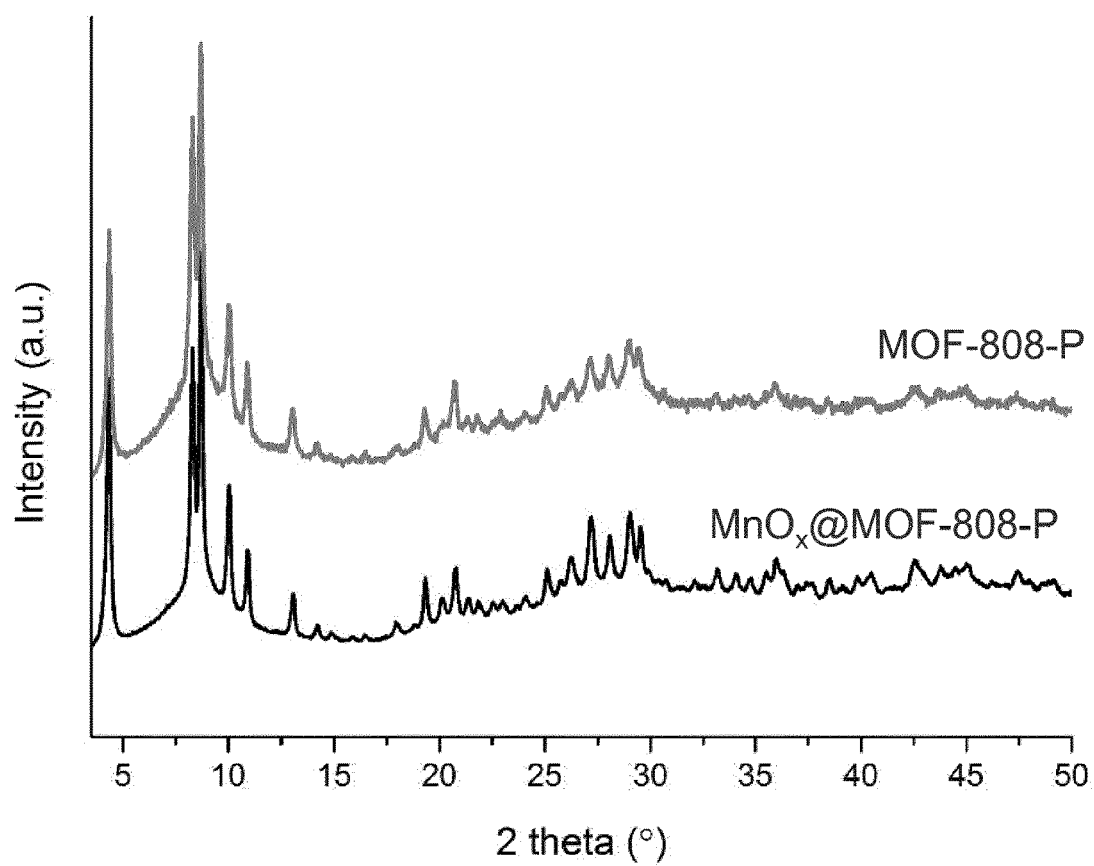
Figure 26:
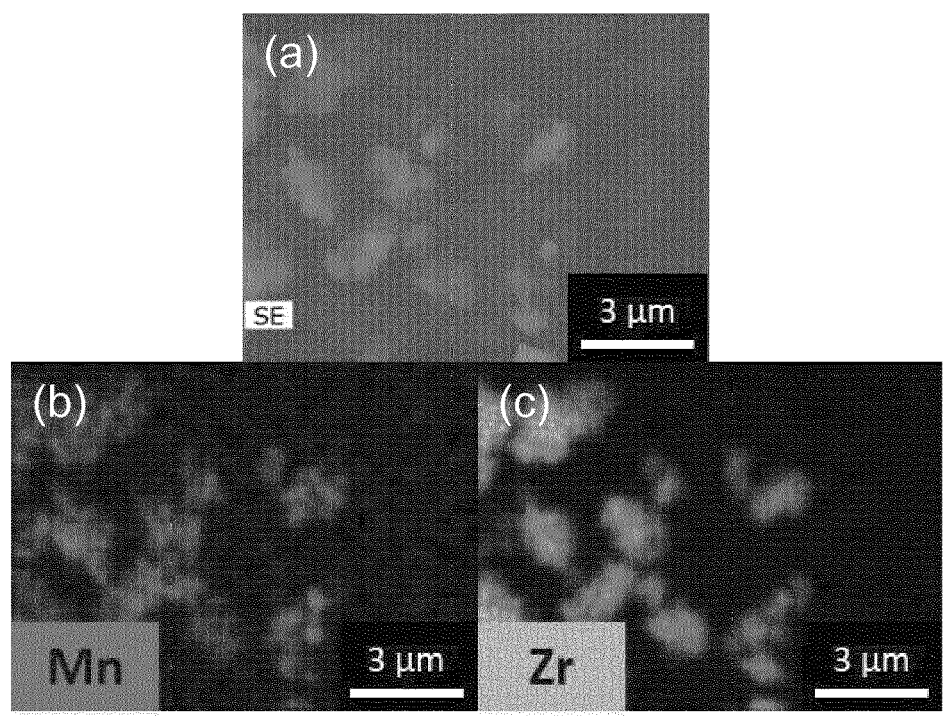
Figure 27:
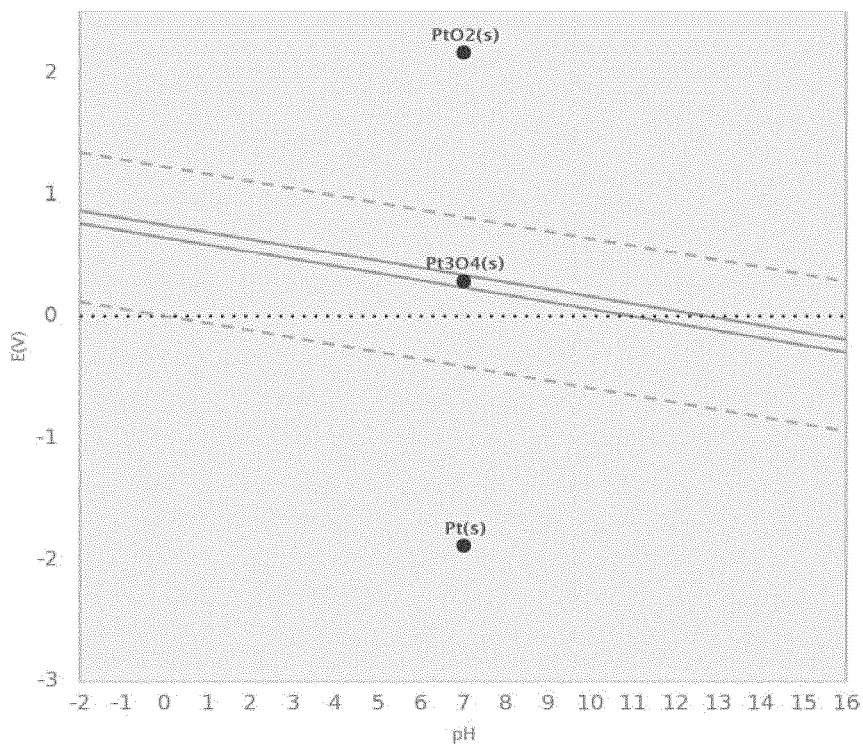
Figure 28:
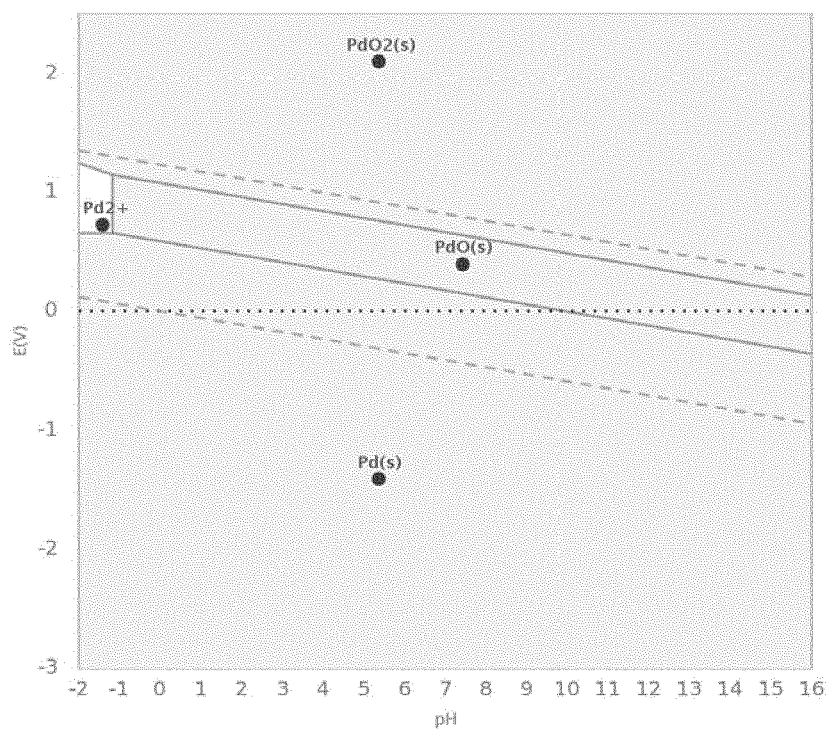
Figure 29:
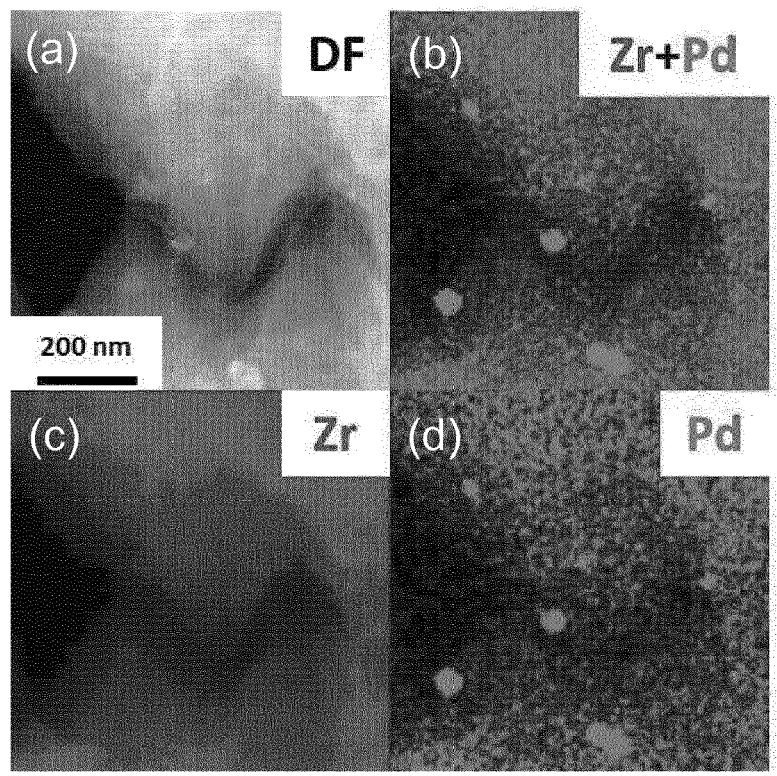
Figure 30:
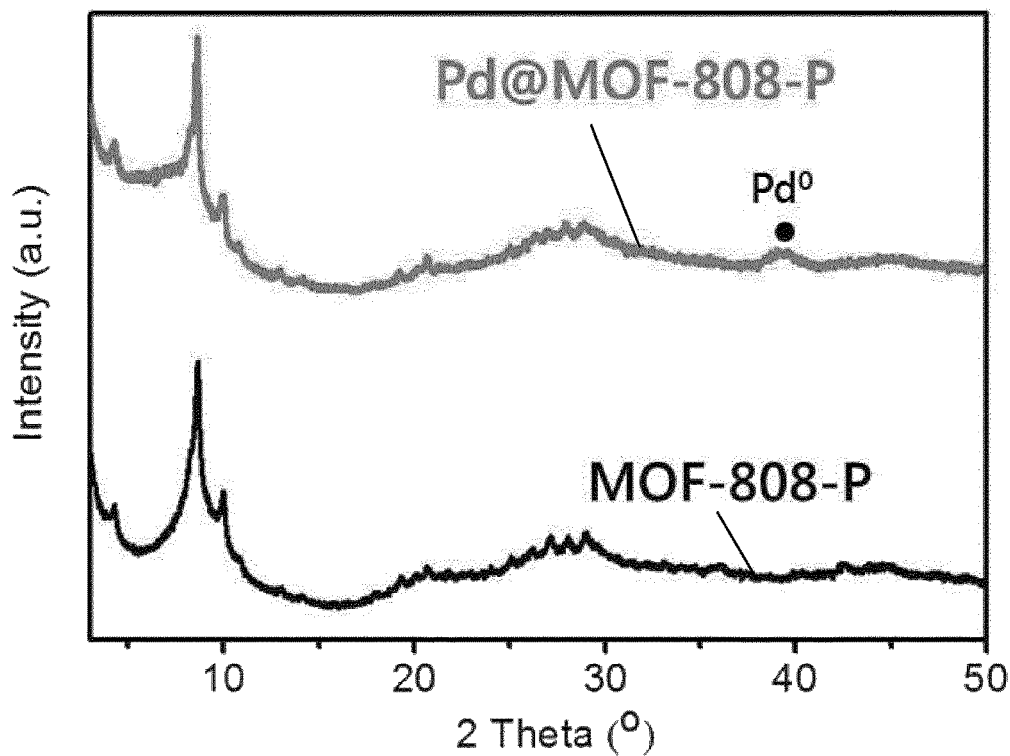
Figure 31:
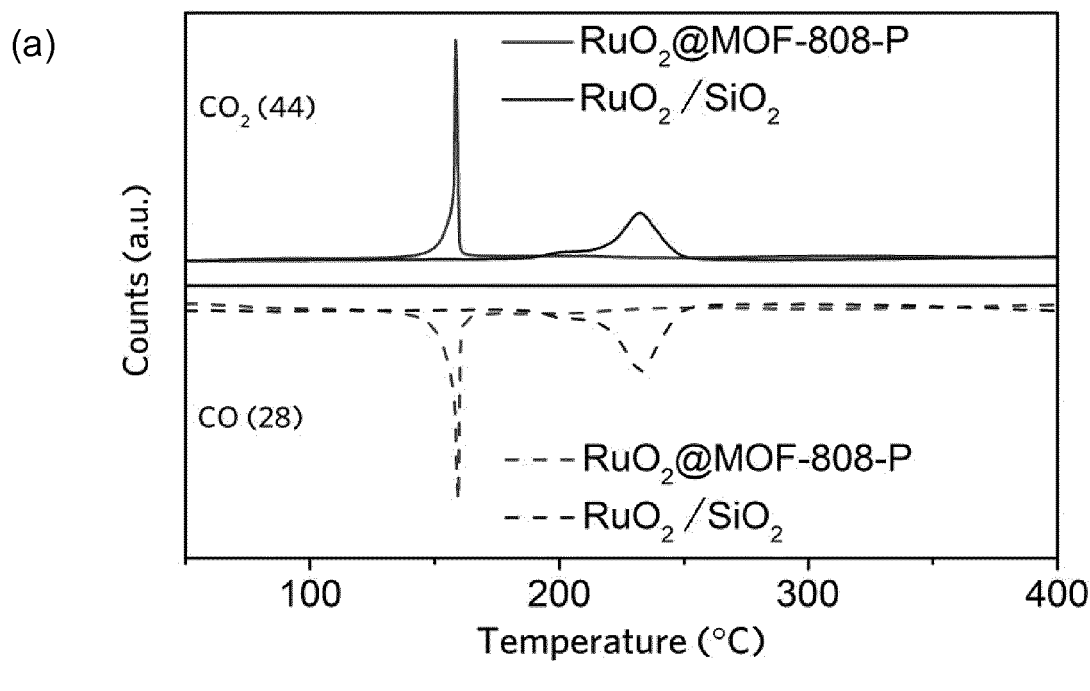
Figure 31:
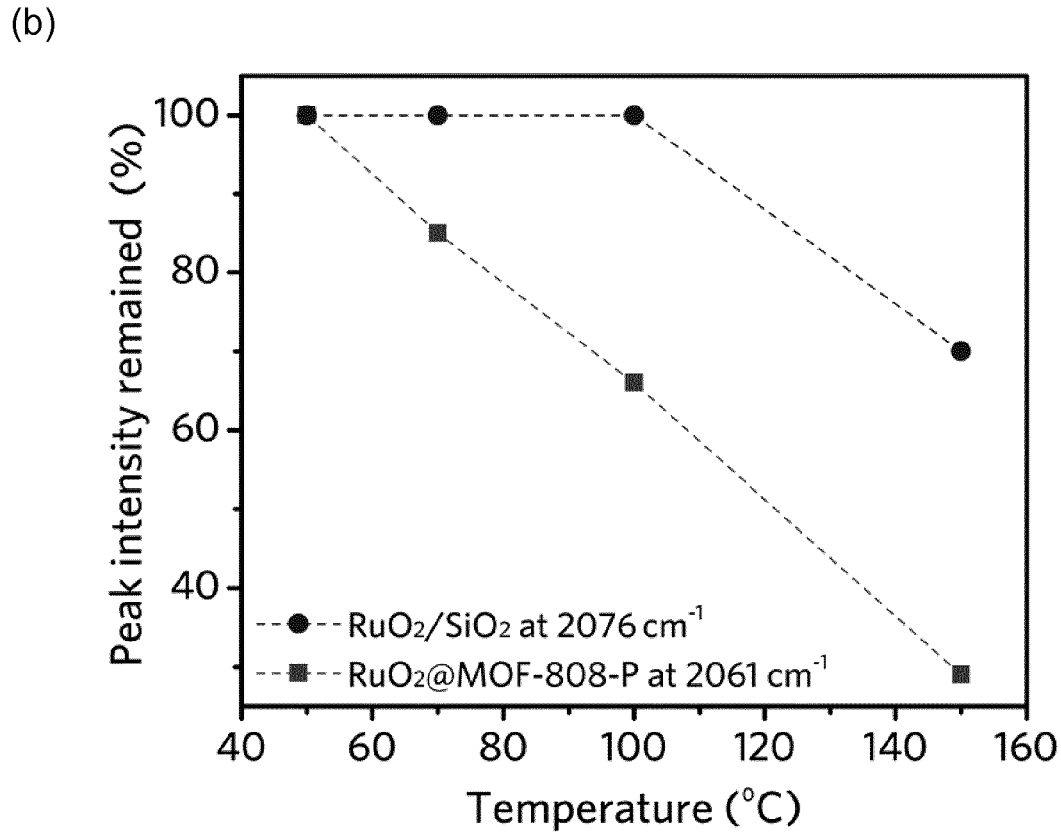
Figure 31:
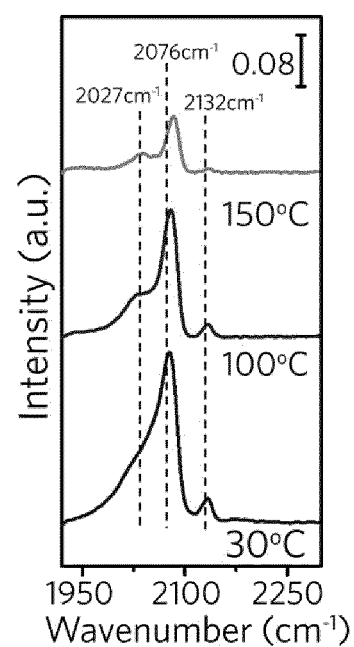
Figure 31:
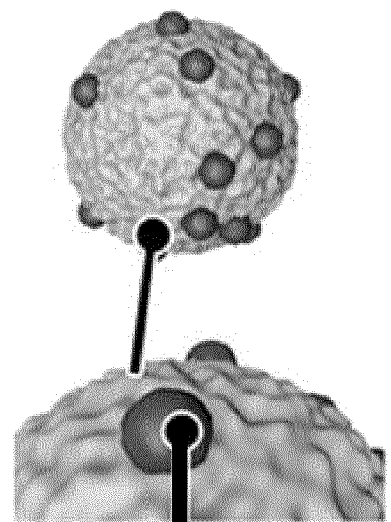
Figure 31:
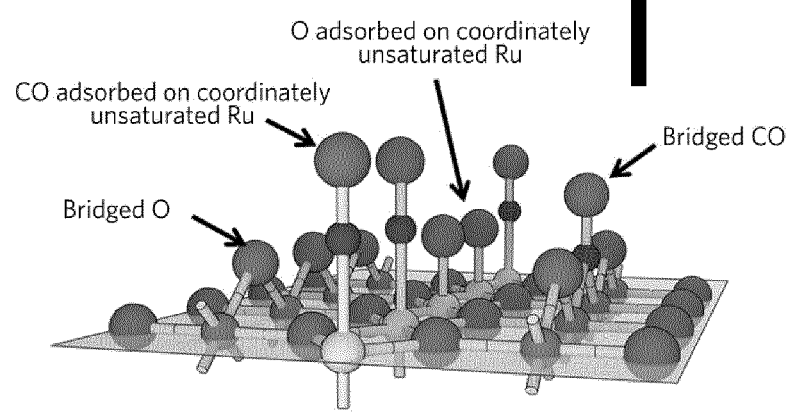
Figure 31:
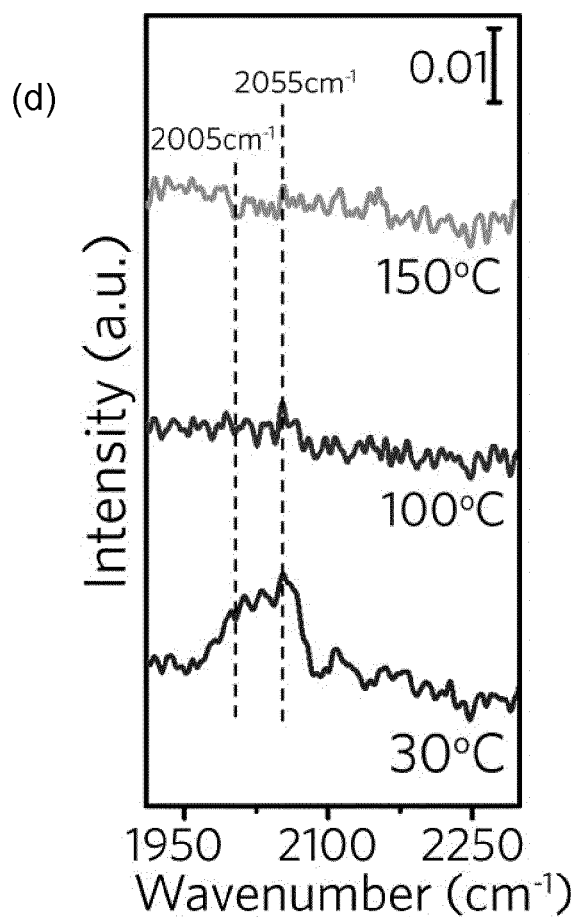
Figure 31:
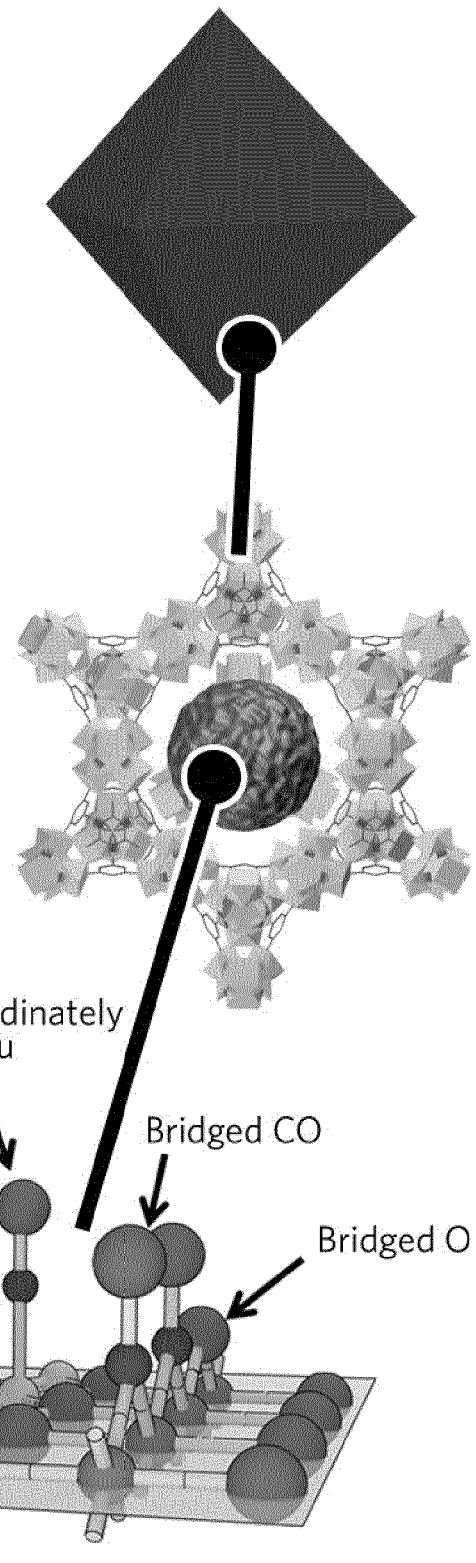
Figure 32:
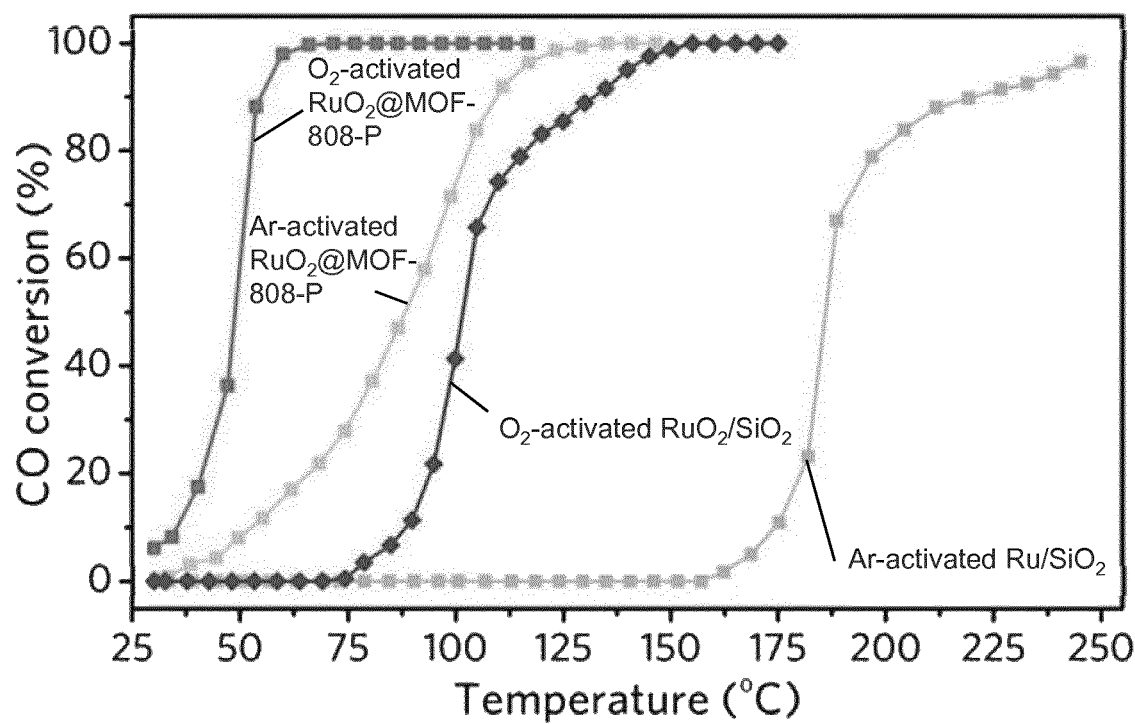
Figure 32:
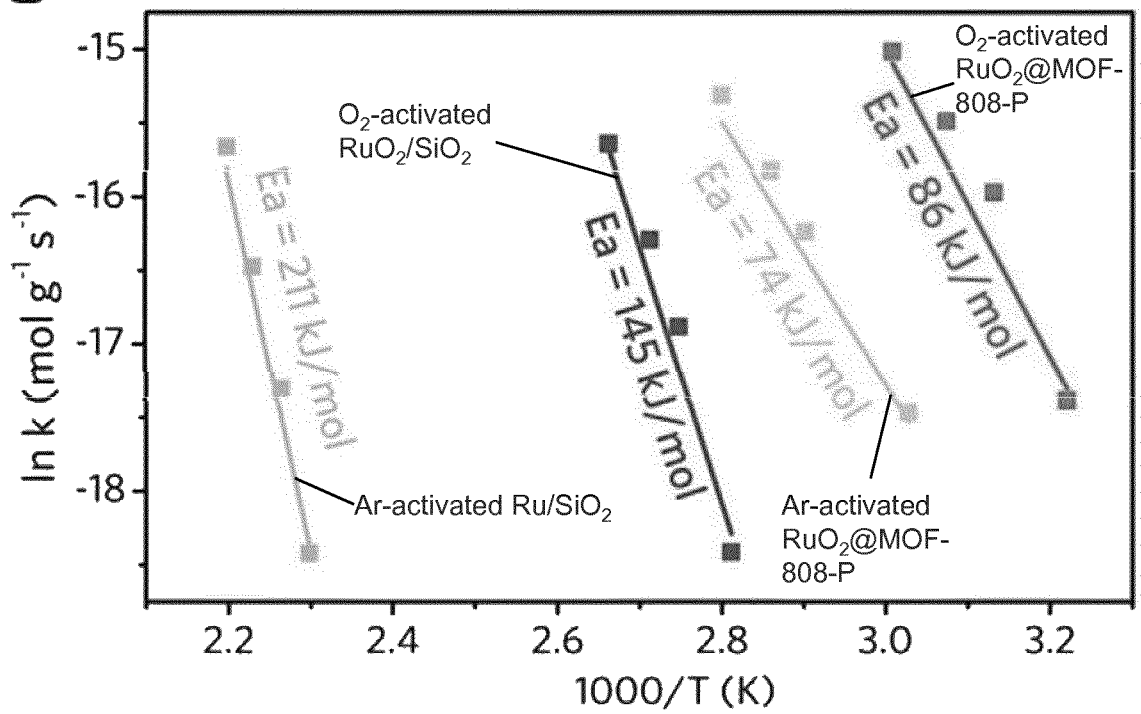
Figure 32:
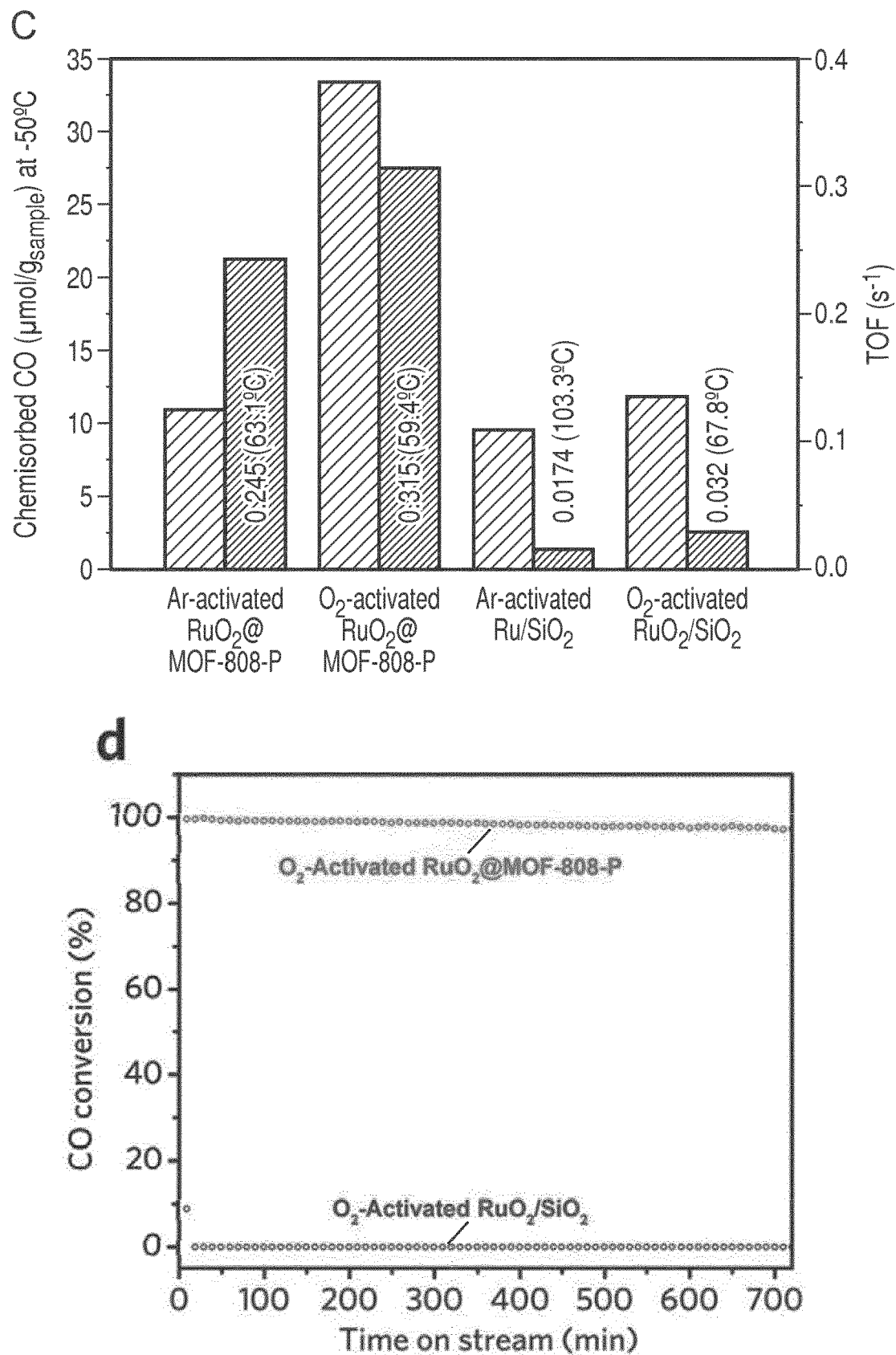
Figure 33:
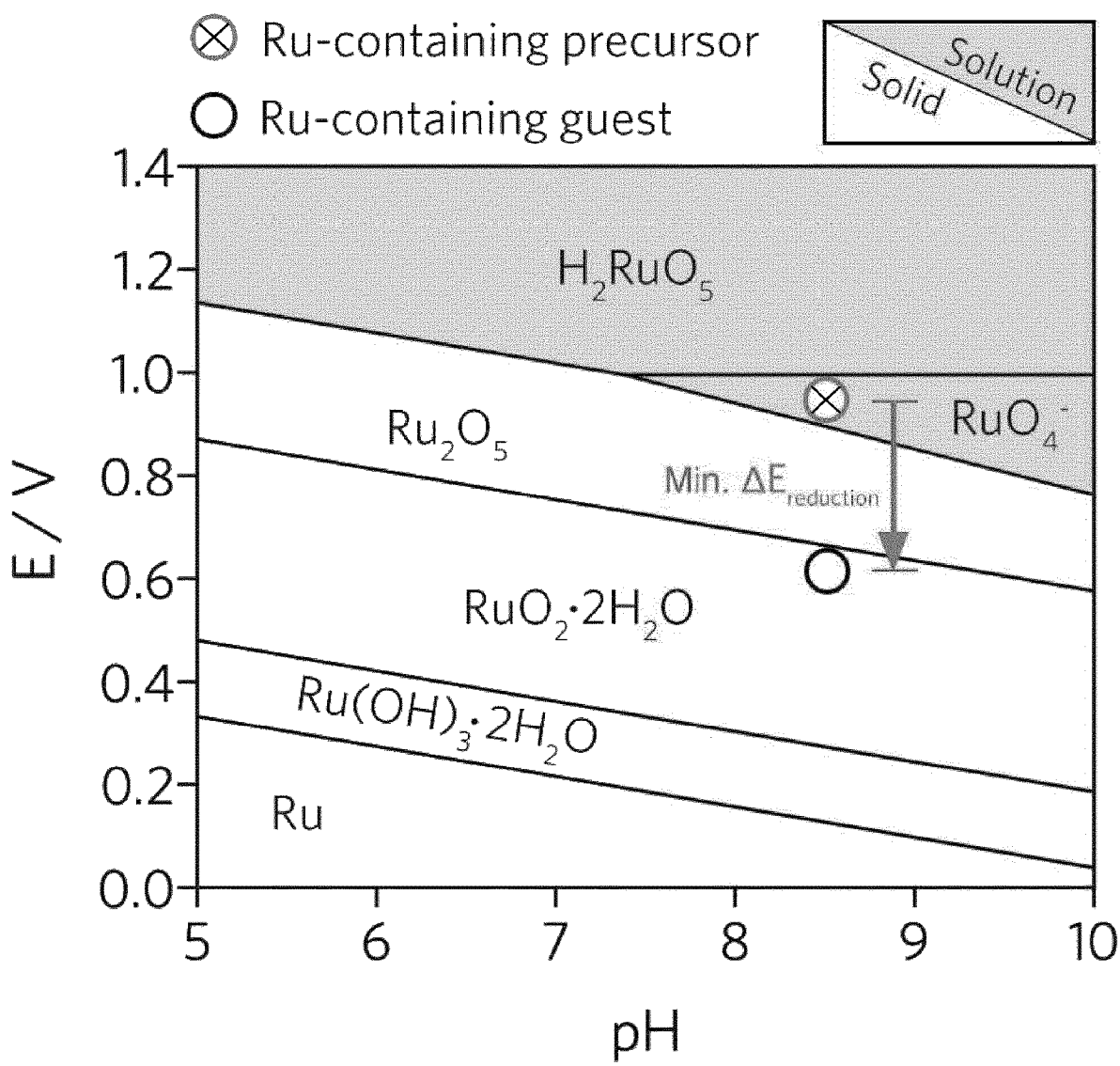

for dried MOF, DE@MOF, tBMP/DE@MOF (tBMP in excess) and tBMP/DE@MOF (tBMP in excess) after being treated at ca. 120° C.;

FIG. 3 shows HR-TGA results (derivative of weight loss versus temperature) for tBMP/DE@MOF-808-P with different tBMP:MOF-808-P mass ratios;

FIG. 4 shows (a) Ru-element weight fraction measured by ICP-OES demonstrating tunable guest loading; (b) $N_2$ adsorption measurements by Ru weight fraction in RuO2@MOF-808-P (wt %); (c) a computer-generated structural model of MOF-808-P showing primary and secondary pore structure; (d) cumulative pore volume by pore width for various samples;

FIG. 5 shows PXRD patterns for simulated MOF-808 based on reference [30], as-synthesized MOF-808-P, dried MOF-808-P and as-synthesized RuO2@MOF-808-P;

FIG. 6 shows scanning electron microscopy (SEM) image (a) and its associated energy-dispersive x-ray spectroscopy (SEM-EDS) overall spectrum (b) and mappings for Zr (c), Ru (e), C (d) and O (f) for as-synthesized RuO2@MOF-808-P;

FIG. 7 shows simulated structure and octahedron morphology of MOF-808 based on that described in reference [31];

FIG. 8 shows X-ray photoelectron spectroscopy (XPS) survey spectrum for as-synthesized RuO2@MOF-808-P;

FIG. 9 shows XPS Ru $3p_3/2$ spectrum for as-synthesized RuO2@MOF-808-P;

FIG. 10 shows Fourier transformed (FT) $k^2$-weighted X(k)-function of the x-ray absorption fine structure (XAFS) results for Ru K-edge (ca. 22.1 keV) for Ru foil, anhydrous $RuO_2$ and as-synthesized RuO2@MOF-808-P obtained by ex situ x-ray absorption spectroscopy (XAS);

FIG. 11 shows (a) High-resolution DF-STEM (HR-DF-STEM) image; (b) the same image highlighting the particles (ca. 1.5 nm in diameter) with diffraction fringes of 2-2.5 Å; (c) Simulated $RuO_2$ XRD pattern; and (d) Two potential diffraction planes in $RuO_2$ with d-spacing of 2-2.5 Å;

FIGS. 12(a) and(b) show HRTEM images of comparative Ru/$SiO_2$ materials at various magnifications;

FIG. 13 shows XRD patterns for Ru/$SiO_2$ (bottom, with simulated Ru peaks provided) and its oxidized form ($RuO_2$/$SiO_2$) (top, with simulated $RuO_2$ peaks provided);

FIG. 14 shows in situ x-ray absorption spectroscopy results for $RuO_2$/$SiO_2$ (in red) and RuO2@MOF-808-P (in blue) before and after the CO adsorption at 30° C. (Ru foil and $RuO_2$ as reference samples);

FIG. 15 shows an in situ DRIFTS spectrum for MOF-808-P treated in the reaction gas then in Ar at 30° C.;

FIG. 16 shows CO oxidation tests for MOF-808-P, tBMP@MOF-808-P and RuO2@MOF-808-P;

FIG. 17 shows a stability test using $O_2$-activated $RuO_2$/$SiO_2$ and RuO2@MOF-808-P (tests condition: 400 L/$g_{Ru}$/h, 15 mg catalysts) at 30° C.;

FIG. 18 shows extended DRIFTS results of FIG. 31(d);

FIG. 19 shows PXRD patterns for as-synthesized RuO2@MOF-808-P compared with RuO2@MOF-808-P after various treatments/tests (treatment with water vapor at 100° C.; after 3 cycles of completed CO conversion; after activation with 02, 150° C.);

FIG. 20 shows CO oxidation tests for RuO2@MOF-808-P which was tested after standard $O_2$-activation (stage 1) and tested again after being treated with 10 v/v % water vapor at 100° C. for 60 minutes (stage 2);

FIG. 21 shows preliminary XRD results for manganese oxide (MnOx) in a DUT-67 MOF;

FIG. 22 shows preliminary SEM-EDX results for manganese oxide (MnOx) in a DUT-67 MOF;

FIG. 23 shows preliminary XRD results for $RuO_2$ in a commercially available zeolite Y from Alfa Aesar:

FIG. 24 shows preliminary SEM-EDX results for $RuO_2$ in a commercially available zeolite Y from Alfa Aesar;

FIG. 25 shows preliminary XRD results for manganese oxide ($MnO_x$) in a MOF-808-P;

FIG. 26 shows preliminary SEM-EDX results for manganese ($MnO_x$) in a MOF-808-P;

FIG. 27 shows a Pourbaix diagram for Pt ([Pt]=$10^{-2}$ mol $kg^{-1}$ (total aqueous mixture));

FIG. 28 shows a Pourbaix diagram for Pd ([Pd]=$10^{-2}$ mol $kg^{-1}$ (total aqueous mixture));

FIG. 29 shows a DR-STEM image for Pd@MOF-808-P and its corresponding STEM-EDS mappings for Zr and Pd;

FIG. 30 shows PXRD patterns for MOF-808-P and Pd loaded MOF-808-P (i.e. Pd@MOF-808-P);

FIG. 31 shows a characterization and overview of CO and O interactions with the $RuO_2$ guest for both $O_2$-activated $RuO_2$/$SiO_2$ (in blue) and RuO2@MOF-808-P (in red);

FIG. 32 shows a CO oxidation catalysis performance summary using Ar activated Ru/$SiO_2$ or $O_2$ activated $RuO_2$/$SiO_2$ and RuO2@MOF-808-P: (a) CO conversion profiles at weight hourly space velocity (WHSV) of 2000 L/$g_{Ru}$/h with 15 mg catalysts, (b) Arrhenius plots and calculated apparent activation energies (Ea) and (c) quantitative analysis on chemisorbed CO at −50° C. (to prevent $CO_2$ formation during the measurements) and turn-over frequency (TOF, conversion per unit site per unit time). (d) Stability test using $O_2$-activated $RuO_2$/$SiO_2$ and RuO2@MOF-808-P (2000 L/$g_{Ru}$·h, 15 mg catalysts) at 100° C.;

FIG. 33 shows the Pourbaix diagram for the Ru—$H_2O$ system indicating the formation of hydrous $RuO_2$ from $RuO_4^-$ [26,27].

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

1. Overview and Summary

Summarising the following disclosure of preferred embodiments of the invention: the Pourbaix-assisted synthesis method disclosed here, combining the placement control of guest precursors as well as the theoretical predictions syntheses, is a versatile synthetic strategy to obtaining a variety of active catalyst guests, such as metals, metal alloys, oxides, hydroxides, sulfides, nitrides and phosphides, based on various Pourbaix-like diagrams (e.g. such as that shown in FIG. 33 for the Ru—$H_2O$ system indicating the formation of hydrous $RuO_2$ from $RuO_4^-$ [26,27]) which can be constructed from element-$H_2O$, element-$H_2S$, element-$H_2O$—$H_2S$ systems and even extended element-$NH_3$ and element-$PH_3$ systems. The functions of such guests are not necessarily limited to catalysts. Alternative functions include uses in optoelectronic materials, such as light-emitting diodes (LEDs), lasers, scintillators, and photo-sensors. The inventors suggest that this rational synthesis approach to general guest functionality in arbitrary MOF hosts would enable not only applications but become a platform for fundamental studies of the confinement-enabled functionality and host-guest interactions.

In particular, the proposed method provides in one preferred example for confinement of guest $RuO_2$-catalysts in MOF hosts, which results in unusual CO/O adsorption behaviour and remarkable CO oxidation properties on the $RuO_2$-surface at low temperatures. Specifically, in the case of $RuO_2$@MOF-808-P, it is observed that there are (i) significantly weakened binding interactions when CO and $O_2$ are adsorbed on $RuO_2$ guest surface; and (ii) inhibition of the formation of densely-packed CO domain particularly at temperatures ≤150° C. Such confinement-induced adsorption modulation consequently turns the $RuO_2$, which is usually easily deactivated at low temperatures due to surface passivation, to stay active (>97% conversion after 12 hours continuous reaction) for CO oxidation. In general terms, the technique demonstrated of controlled incorporation of guests into arbitrary nanoporous host may enable the investigation of multiple host-guest systems with surprising functionalities.

Other further results indicate that similar advantages are obtainable more generally from guest@nanoporous-host materials produced according to the method of the present invention, in particular due to the advantages provided by e.g. improved loading control.

FIG. 1 provides a summary of the microstructure and fabrication of materials according to embodiments of the invention, and materials for comparison. FIG. 1(a) shows a schematic of $RuO_2$ synthesis inside the cavity/pore of preformed MOF-808-P using hydrophobic reducing agent 2-tert-butyl-4-methylphenol (tBMP). The full method is discussed below, however in brief, a preformed MOF material (MOF-808-P) is provided and is impregnated with a selected redox reagent (here tBMP in diethyl ether, DE, solvent). Temperature-controlled selective desorption is optionally performed. The tBMP@MOF material is then infiltrated with perruthenate ($RuO_4^-$) ions in aqueous solution to form the target guest material, $RuO_2$ in-situ. FIG. 1a(ii) provides a key to the graphical representations used in FIG. 1a(i).

Figure 1A:
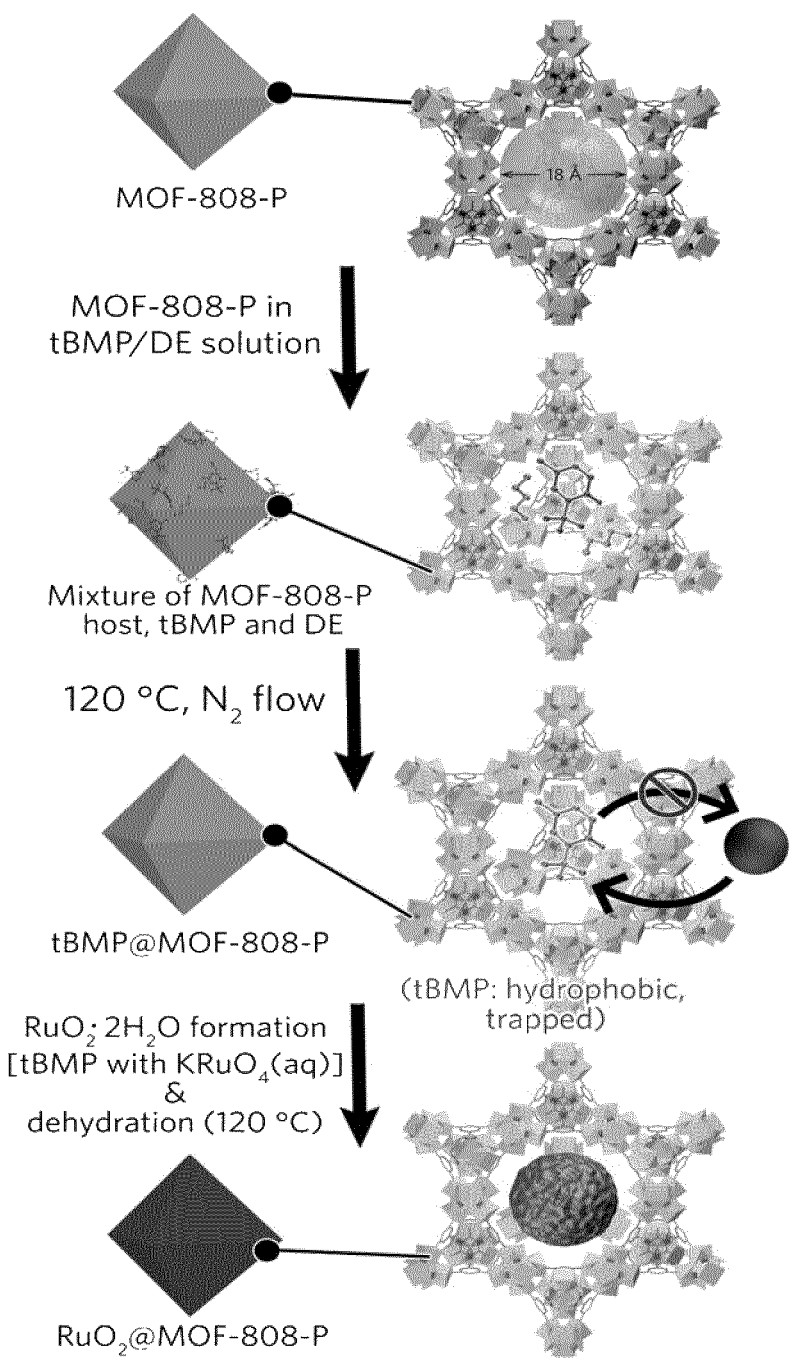
FIGS. 1a(i), a(ii), b and c together provide a summary of the microstructure and fabrication of materials according to embodiments of the invention, and materials for comparison.
Figure 1B:
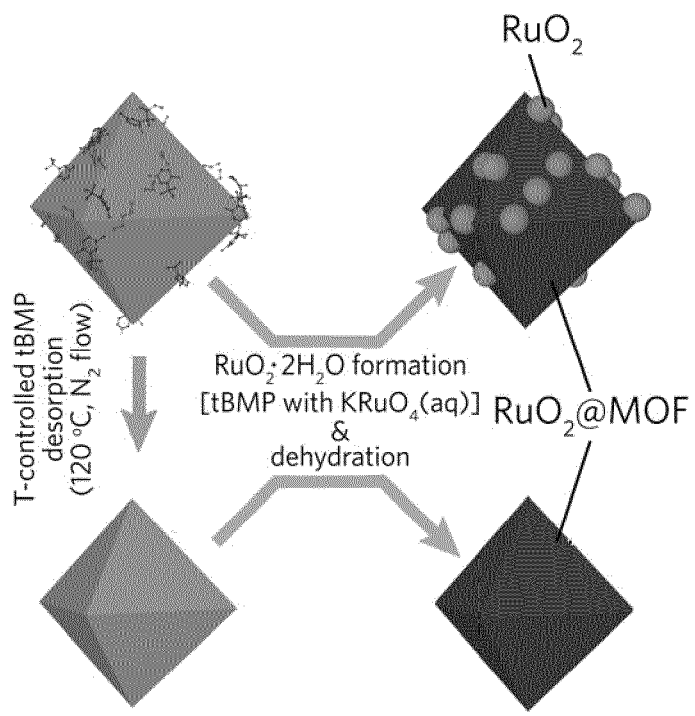
Figure 1B:
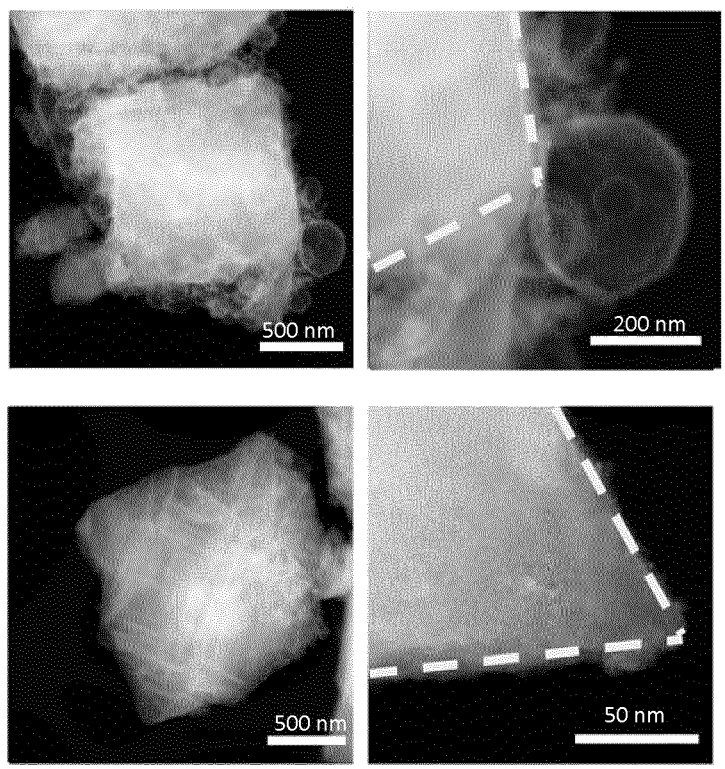

As shown in FIG. 1(b), it is possible to use temperature-controlled selective desorption of the tBMP molecules to control $RuO_2$ formation to reduce and/or eliminate formation of $RuO_2$ on the outer surface of the MOF. Dark-field scanning transmission electron microscopy (DF-STEM) images to the right show particles on the outside of the MOF crystals (top) vs. clean MOF crystal edges (bottom). Additionally, even where temperature-selective desorption is not used, the $RuO_2$ particles formed on outer surfaces here have a unique structure compared to those produced by other known methods—they form spherical 'shell' bodies. This occurs due to the hydrophobic interaction of tBMP with the aqueous $KRuO_4$ solution during the synthesis.

Figure 1C:
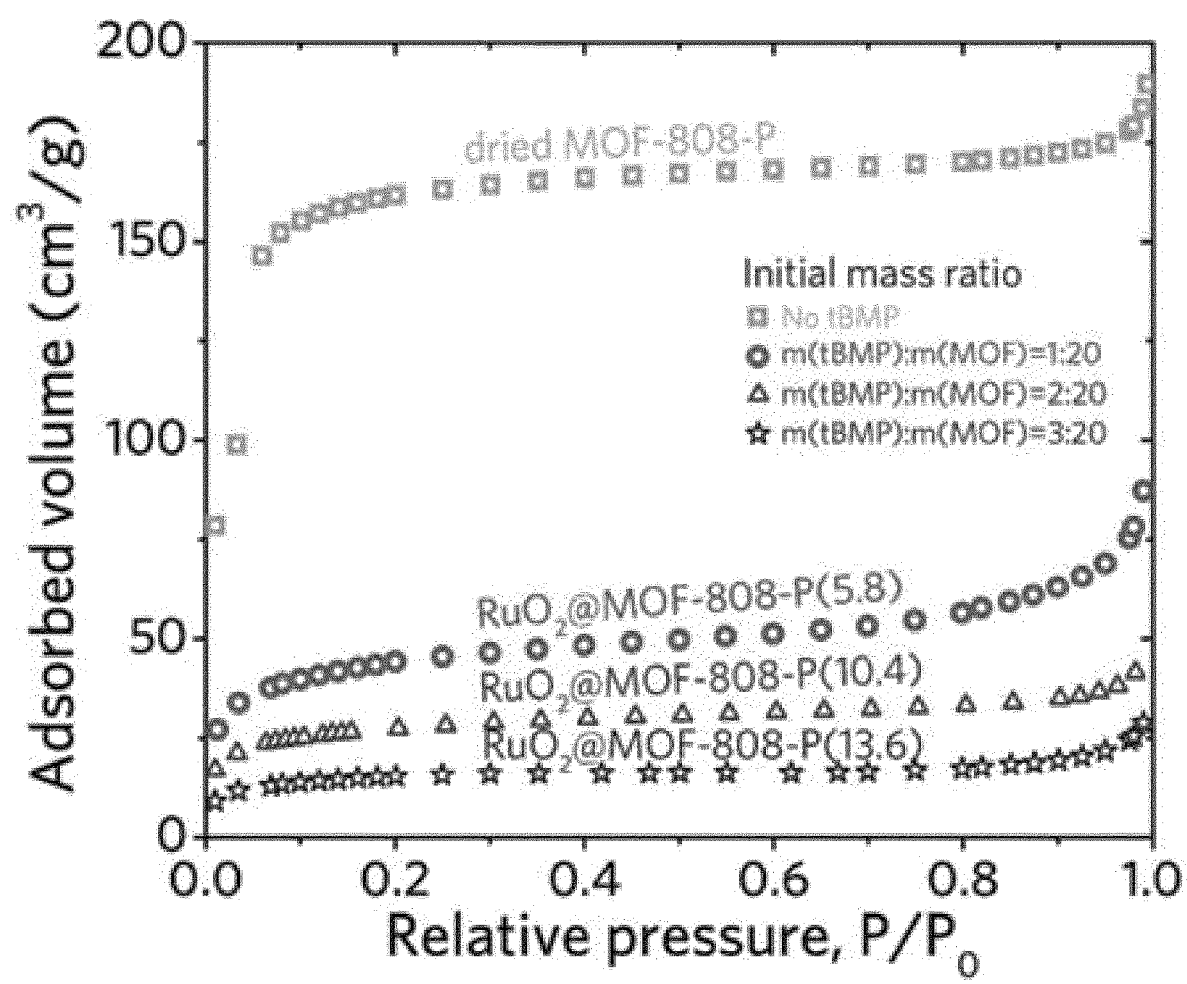

FIG. 1(c) shows $N_2$ adsorption isotherms by amount of guest (i.e. $RuO_2$) loaded in the MOF. They show that the amount of guest is related to the amount of tBMP loaded in the MOF, controlled by the relative amounts of tBMP and a volatile diethyl ether solvent used to carry the TBMP. The relative elemental Ru wt % relative to the synthesized $RuO_2$@MOF-808-P is given in parentheses, as calculated from inductively coupled plasma optical emission spectrometry (ICP-OES).

2 Experimental and Characterization for $RuO_2$@MOF-808-P

2.1 Rational Design of $RuO_2$@MOF-808-P

In a first example, $RuO_2$ was synthesized inside a MOF. This process is shown schematically in FIG. 1a(i)-(ii). According to the Ru-based Pourbaix diagram [27,32], a perruthenate salt, potassium perruthenate ($KRuO_4$), was selected as the precursor. This can form hydrous $RuO_2$ via reduction reaction, as shown by the Pourbaix diagram of FIG. 33. A water-stable MOF was selected, MOF-808-P [30], as the host, which allows us to use aqueous $KRuO_4$ solution for precursor impregnation. MOF-808-P [$Zr_6O_5(OH)_3$ $(BTC)_2(HCOO)_5(H_2O)_2$, BTC=1,3,5-benzenetricarboxylate], based on {$Zr_6O_8$} cluster with spn topology, provides a useful nanoporous host material due to its aqueous stability, 3D open porosity and relatively and large cavity and aperture diameters (ca. 18 Å and ca. 14 Å respectively). Since the minimum reduction potential required to form $RuO_2·2H_2O$ (the preform of $RuO_2$) from the $RuO_4^-$(aq) domain is only ca. 0.2 V (as shown in the Ru—$H_2O$ Pourbaix diagram in FIG. 33), the small lipid, tBMP, (chemically similar to the well-known antioxidant lipid, butylated hydroxytoluene (BHT) [33,34] requiring ca. 0.3 V to be partially oxidized) is selected, as it is sufficient to reduce $RuO_4^-$ to $RuO_2·2H_2O$ within a controlled pH range (i.e. from ca. pH 8.5 to ca. pH 5.5 before and after the reaction measured in our case). tBMP is hydrophobic (i.e. immiscible with water).

Unlike conventional 'ship-in-bottle' routes to achieve metal@MOF which typically introduce metal precursors first [8,9,13], we loaded a diethyl ether (DE) solution of tBMP first so that we can use a temperature-controlled selective desorption method discussed in greater detail below [35,36] to remove all of DE and tBMP on the outer surface of the MOF (see FIG. 2, discussed further below). Since tBMP is hydrophobic, the tBMP inside stays due to the hydrophobic-hydrophilic confinement created by subsequent $KRuO_4$ (aq) solution impregnation and react with $KRuO_4$. As a consequence, hydrous $RuO_2$ clusters/particles produced are entrapped inside the MOF. The product was washed with water and ethanol. It was then dehydrated at ca. 120° C. under nitrogen to achieve the as-synthesized $RuO_2$@MOF-808-P. Meanwhile, the relative loading amount of $RuO_2$ can be tuned by controlling the mass ratio of $KRuO_4$ to MOF-808-P and confirmed by nitrogen adsorption measurements and inductively coupled plasma optical emission spectrometry (ICP-OES) (see FIG. 4, discussed below). More details experimental procedures are provided below.

2.2 Materials 1,3,5-Benzenetricarboxylic acid ($H_3BTC$, ACROS Organics™, 98%), zirconyl chloride octahydrate ($ZrOCl_2·8H_2O$, ACROS Organics™, 98+%), N,N-dimethylformamide (DMF, Fisher Scientific, 99.7+%, HPLC), formic Acid (HCOOH, Fisher Scientific, 98+%), ethanol absolute ($C_2H_5OH$, Fisher Scientific, 99.5+%, HPLC), Milli-Q water, 2-tert-Butyl-4-methylphenol (tBMP, ACROS Organics™, 99%), diethyl ether (DE, ACROS Organics™, 99+%, ACS reagent, anhydrous), potassium perruthenate (VII) ($KRuO_4$, Alfa Aesar, 97%), and Whatman® polyamide membrane filters (0.2 µm), zeolite Y (Alfa Aesar, Si:Al=80:1).

2.3 MOF-808-P Preparation

MOF-808-P [$Zr_6O_5(OH)_3(BTC)_2(HCOO)_5(H_2O)_2$, BTC=1,3,5-benzenetricarboxylate] was synthesized based on the MOF reported by Furukawa et al. [31] The detailed protocol can be found in Jiang et al. (2014) [37]. Briefly, 0.467 g $H_3BTC$ and 2.16 g $ZrOCl_2·8H_2O$ were dissolved in a DMF/HCOOH solvent (100 ml DMF+100 ml HCOOH)

first. The solution was kept at 130° C. for 48 hours. The formed MOF particles were collected, washed with DMF for three times and kept in Milli-Q™ water for 3 days. The washed MOF particles were recollected (slurry-like) by filtration and dried gently at 50° C. to remove majority of water. It was further dried at 150° C. under dry nitrogen flow for ca. 3 hours. The MOF structure remains after drying as shown by powder x-ray diffraction (PXRD) (FIG. 5).

2.4 tBMP Impregnation and Temperature-Controlled Selective Desorption

To impregnate tBMP in MOF-808-P, the MOF was immersed in a tBMP solution (DE as the solvent). The amount of tBMP relative to MOF used is controlled to have a tunable guest loading (see FIGS. 3 and 4). As an example, to achieve the sample for CO oxidation catalysis, 50 mg tBMP (in 1000 μl DE) was mixed with 500 mg MOF-808-P. The as-prepared tBMP/DE@MOF-808-P is referred as tBMP/DE@MOF-808-P (2:20), where 2:20 is the tBMP: MOF-808-P mass ratio during tBMP impregnation. The as-prepared tBMP/DE@MOF-808-P was then heated under $N_2$ flow at 120±5° C. for ca. 1 hr to remove the DE and tBMP outside the MOF. This is the temperature-controlled selective desorption process developed based on the experience by forming polymers inside the MOF [35,36], the process is further explained by high-resolution thermogravimetric analysis (HR-TGA) as shown in FIG. 2.

Figure 2:
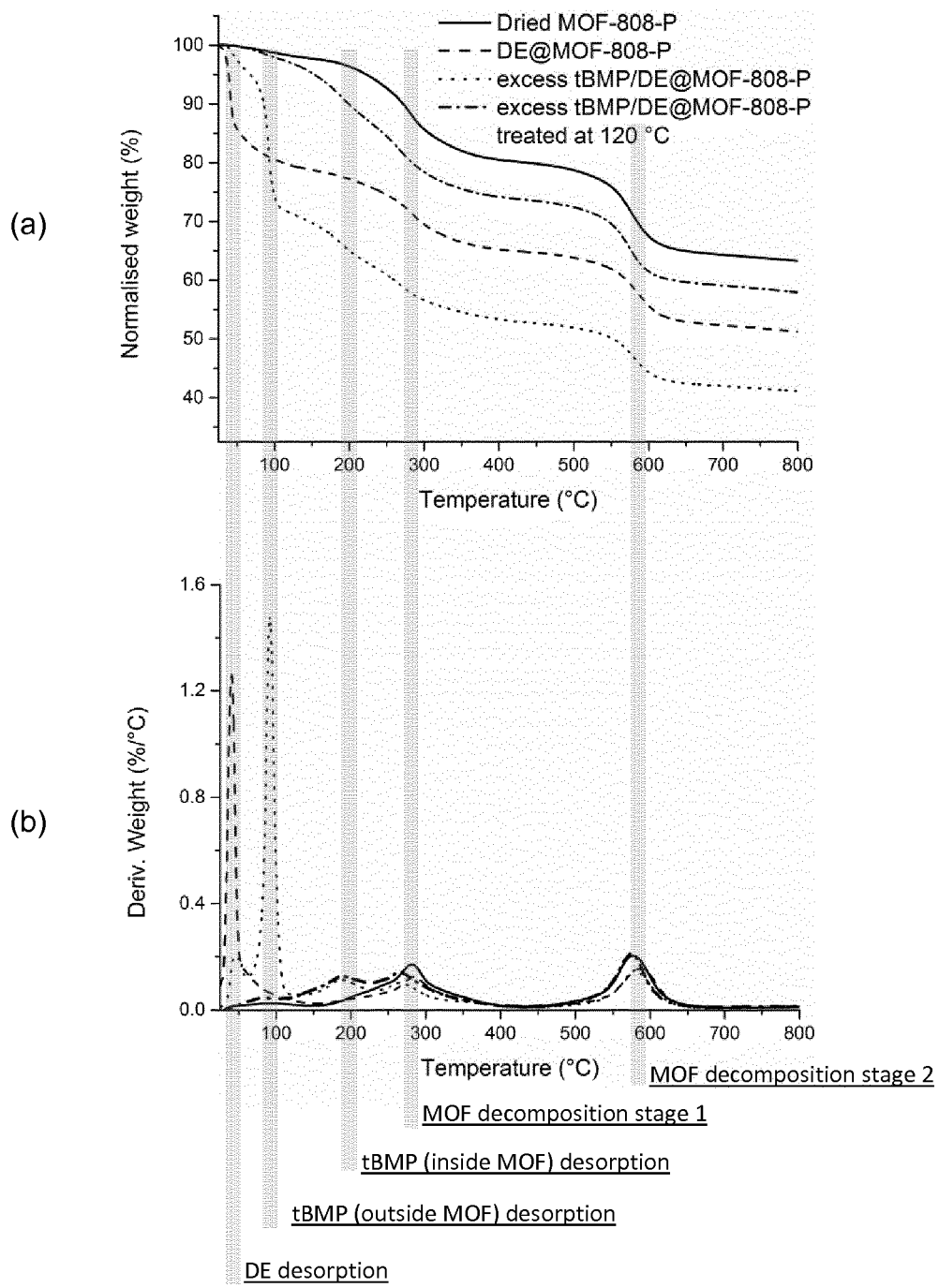
FIG. 2 shows HR-TGA normalized weight versus temperature (a) & derivative of weight loss (weight loss upon incremental increase in temperature) versus temperature (b)

FIG. 2 shows HR-TGA on dried MOF, DE@MOF, tBMP/DE@MOF (tBMP in excess) and tBMP/DE@MOF (tBMP in excess) after being treated at ca. 120° C.: normalized weight versus temperature (top) & derivative of weight loss (weight loss upon incremental increase in temperature) versus temperature (bottom). The stepwise drops in the top figure and the peaks in the bottom figure can be assigned to a number of desorption/decomposition events. tBMP outside the MOF has lower desorption temperature than tBMP inside the MOF due to the stronger interaction when the molecule is trapped inside the nanoporous host. This is consistent with similar system for preparing polymer@MOF previously observed. [35,36] Hence, DE (the volatile solvent for tBMP) and tBMP (outside the MOF) can be mostly removed when treated the as prepared tBMP/DE@MOF-808-P at ca. 120° C. In this way, only tBMP inside the MOF host can remain after treatment, i.e. tBMP@MOF-808-P.

After the treatment, the sample becomes tBMP@MOF-808-P. Samples with different guest loading amounts are prepared to demonstrate the loading tenability (see FIG. 4). Their corresponding HR-TGA results are given in FIG. 3.

FIG. 3 shows HR-TGA results (derivative of weight loss versus temperature) for tBMP/DE@MOF-808-P with different tBMP:MOF-808-P mass ratios. When the tBMP: MOF-808-P mass ratio reaches 4:20 [i.e. tBMP/DE@MOF-808-P(4:20)], the maximum tBMP loading amount inside the MOF has been reached. This is revealed by (i) a distinguishable peak at ca. 100° C. (desorption of tBMP outside the MOF) and (ii) similar peak to that of tBMP/DE@MOF-808-P(3:20) at ca. 200° C. (desorption of tBMP inside the MOF).

2.5 $RuO_2$ Formation Inside the MOF-808-P

The as-prepared tBMP@MOF-808-P was collected and reweighed. Based on the mass of tBMP@MOF-808-P, a $KRuO_4$ solution (aq, [$KRuO_4$]=20 mM) was prepared to keep n($KRuO_4$):n(tBMP) (i.e. molar ratio) to be at least 2:1. Here we overestimated the tBMP amount by assuming all the tBMP added initially is loaded in the MOF. Hydrous $RuO_2$ forms inside the MOF by mixing tBMP@MOF-808-P with the $KRuO_4$ solution. Since tBMP is immiscible with the aqueous solution, tBMP will be trapped in the MOF during the reaction. Meanwhile, the partially filled MOF host uptakes the $KRuO_4$ solution and accommodates the tBMP-$KRuO4$ redox reaction within in it.

During the reaction, $KRuO_4$ reduces to $RuO_2$ while tBMP is oxidized to its oxidizing derivatives similar to the oxidation of BHT [33,34]. The liquid chromatography-mass spectrometry (LC-MS) analysis confirms the presence of ketone derivatives. We kept the reaction for ca. 4 hours. After reaction, the production was collected by filtration (the filtrate remains yellow indicating some $KRuO_4$ left after the reaction) and washed with excess amount of ethanol followed by water. It was then dried at 120° C. to become as-synthesized $RuO_2$@MOF-808-P. After the synthesis, the white MOF-808-P turns to almost black $RuO_2$@MOF-808-P. Meanwhile, we verified that the MOF-808-P by itself is not reacting with $KRuO4$, as the MOF-808-P remains white in colour and there is no colour change in the $KRuO_4$ solution upon mixing.

We confirmed that the MOF-808-P is stable throughout the sample preparation based, as there is no significant change in PXRD patterns as described in relation to FIG. 5, below. The as-synthesized $RuO_2$@MOF-808-P is stable in air and can be stored under ambient conditions.

FIG. 4 shows the tunable guest loading amount being confirmed by ICP-OES and $N_2$ adsorption measurements: (a) By varying tBMP and $KRuO4$ added [n($KRuO4$):n (tBMP) kept approx. 2:1], we can achieve different guest loading as revealed from the Ru-element weight fraction measured by ICP-OES. (b) We observe a $N_2$-accessible surface area decrease for as-synthesized RuO2@MOF-808-P (from $N_2$ adsorption measurements) when more guest (i.e. $RuO_2$) is incorporated (from ICP-OES). When more pores within the MOF are significantly filled by the guest, less space is available for $N_2$ during the adsorption measurement. As a consequence, the measured surface area decreases and the measurement pore volume also decreases which is shown in (c) and (d). The parentheses in sample labels in (d) represents the Ru-element weight fraction measured by ICP-OES.

FIG. 5 shows PXRD patterns for simulated MOF-808 based on reference [37], as-synthesized MOF-808-P, dried MOF-808-P and as-synthesized $RuO_2$@MOF-808-P. The MOF's structure is preserved after $RuO_2$ incorporation. No peak for $RuO_2$ crystal were shown indicating that the $RuO_2$ particle(s) are very small (<3 nm) [22].

FIG. 6 shows scanning electron microscopy (SEM) image (a) and its associated energy-dispersive x-ray spectroscopy (SEM-EDS) overall spectrum (b) and mappings for Zr (c), Ru (e), C (d) and O (f) for as-synthesized $RuO_2$@MOF-808-P. The loading of Ru-based guest in a Zr-based MOF host is verified. A relatively strong C signal is observed in the background, as the sample powders are immobilized on carbon tape.

FIG. 7 shows simulated structure and octahedron morphology of MOF-808 based on that described in reference [31]. The simulated structure shown in FIG. 7(a) is generated using Mercury (https://www.ccdc.cam.ac.uk/solutions/csd-system/components/mercury/). FIG. 7(b) shows a dark-field scanning transmission electron microscopy (DF-STEM) image (b) and its associated energy-dispersive x-ray spectroscopy (STEM-EDS) mappings for Zr (c) and Ru (d) for as-synthesized $RuO_2$@MOF-808-P. The contrasts from the Zr-based host and Ru-based guest are similar, as Zr and Ru interact similarly with the electrons. Relative EDS signal intensity is provided to show the element 2D distribution. Areas of high intensity are indicated with a white arrow. The loading of Ru-based guest in a Zr-based MOF host is further verified. It can be see that the presence of Zr is greatest in central portions of the MOF crystal, whilst the presence of Ru is greatest in peripheral regions of the MOF crystal.

FIG. 8 shows X-ray photoelectron spectroscopy (XPS) survey spectrum for as-synthesized $RuO_2$@MOF-808-P. The presence of Ru (from the $RuO_2$ guest), Zr (from the MOF-808-P host), O (from both the guest and the host) and C (mostly from the host) is further verified.

FIG. 9 shows XPS Ru $3p_{3/2}$ spectrum (photoelectron spectroscopy spectrum that can be assigned to ruthenium's electron at $3p_{3/2}$ spin orbital) for as-synthesized $RuO_2$@MOF-808-P. The Ru in as-synthesized $RuO_2$@MOF-808-P is dominated by $Ru^{IV}$ (+4) at ca. 463.2 eV [38,39]. We also observe a shoulder at higher binding energy which is likely to be the formation of hydrous $RuO_2$ guest (in presence of —OH) [38-40] during sample storage or after air exposure.

FIG. 10 shows Fourier transformed (FT) $k^2$-weighted X(k)-function of the x-ray absorption fine structure (XAFS) results for Ru K-edge (ca. 22.1 keV) for Ru foil, anhydrous $RuO_2$ and as-synthesized $RuO_2$@MOF-808-P obtained by ex situ x-ray absorption spectroscopy (XAS). In the $RuO_2$@MOF-808-P material, the apparent Ru—O pair can be identified as a peak just below 2 R, but there is no peak corresponding to the Ru—Ru pair as seen in metallic Ru (this appears as a peak just below 3 R for the Ru foil sample). A marginal peak shift can be observed in $RuO_2$@MOF-808-P compared with reference $RuO_2$. This may be caused by the presence of C (from the organic ligand of the MOF) in proximity to Ru. [41]

FIG. 11 shows (a) High-resolution DF-STEM (HR-DF-STEM) image; (b) the same image highlighting the particles (ca. 1.5 nm in diameter) with diffraction fringes of 2-2.5 Å; (c) Simulated $RuO_2$ XRD pattern; and (d) Two potential diffraction planes in $RuO_2$ with d-spacing of 2-2.5 Å. The contrasts from the Zr-based host and Ru-based guest are similar, as Zr and Ru interact similarly with the electrons. The presence of small particles is consistent with PXRD patterns in FIG. 5, as very small particles cannot be revealed by PXRD [22]. Meanwhile, the inter-spacing of the diffraction fringes (2-2.5 Å) matches well with $d_{(011),(101)}$ or/and $d_{(200),(020)}$ planes in $RuO_2$.

2.6 Characterization Methods for RuO2@-MOF-808-P

HR-TGA: TGA was performed with a TA Instruments Q500 thermogravimetric analyzer. Samples were heated from room temperature up to 900° C. at a rate adjusted based on the mass loss per unit change in temperature (i.e. high-resolution mode) in Ar.

Nitrogen adsorption measurements: The samples were analysed by $N_2$ adsorption at 77 K using Autosorb and Nova Quantachrome equipment. The samples were degassed at 120° C. overnight under vacuum. The pore structure and the surface area were calculated by the software Novawin (Quantachrome) using different estimations of the surface (Brunauer Emmett Teller and density function theory). The pore size distribution (PSD) was calculated from the isotherm adsorption line using a quenched-solid model QSDFT assuming slit and cylindrical pores geometries. The quenched solid state functional theory (QSDFT) is described in Ravikovitch et al.[42]

PXRD: Powder XRD patterns were collected on a Bruker D8 ADVANCE with a Ni 0.012 filter between the X-ray source and the sample (2θ from 3.5° to 800 and a step size of 0.04°). Samples were uniformly distributed on a silicon disc supported by a round holder. The holder and the disc were rotated (30 rpm) during the measurement. The illumination area is fixed so that the exposure area forms a circle (16 mm in diameter) with the rotation.

Scanning electron microscopy (SEM) and its associated energy-dispersive x-ray spectroscopy (SEM-EDS): Secondary electron SEM (SE-SEM) images and mappings with energy-dispersive spectroscopy (SEM-EDS) were acquired using a FEI Nova NanoSEM™ with a secondary electron detector and EDS detector (electron acceleration voltage: 15 kV).

Dark-field scanning transmission electron microscopy (DF-STEM), its associated energy-dispersive x-ray spectroscopy (STEM-EDS): STEM images were acquired on an FEI Osiris operating at 200 keV fitted with bright field (BF) and annular dark field (ADF) detectors. Energy dispersive spectra were simultaneously recorded on four Bruker silicon drift detectors. Diffraction patterns were recorded on a Gatan UltraScan1000XP CCD camera. STEM samples were prepared by drop-casting 100 μl of sample suspension (ground sample powder dispersed in ethanol) on carbon grids.

X-ray photoelectron spectroscopy (XPS): The X-ray photoelectron spectroscopy was undertaken using a monochromatic Al Kα1 x-ray source (hv=1 486.6 eV) using a SPECS PHOIBOS 150 electron energy analyzer with a total energy resolution of 500 meV. The measurements were done using a monochromatic Al Kα x-ray source (1486.6 eV). To remove charging effects during the measurements, a low-energy electron flood gun with proper energy was applied. All spectra were aligned to the C 1s at 284.8 eV. For analysis of the Ru $2p_{3/2}$ spectrum, a linear background was subtracted.

Ex situ x-ray absorption spectroscopy (XAS): X-ray absorption spectra measurements were conducted at the BL14W1 beamline of the Shanghai Synchrotron Radiation Facility (SSRF). The spectra at Ru K-edge were recorded in transmission mode. The sample were coated on carbon tape or in a plastic sample bag for characterization.

ICP-OES: The metal loadings of Ru in all samples were measured by inductively coupled plasma optical emission spectroscopy (7300DV, Perkin Elmer). The catalysts (5-10 mg) were digested by microwave dissolution in aqua regia and HF solution.

LC-MS: Accurate mass measurements of the BMP oxidization products were performed by coupling an Accela liquid chromatography (LC) system with a Waters 50 mm BEH C18 column interfaced to a Q-Exactive Plus mass spectrometer. For each test, 100 μL of sample was analysed using a 20 min gradient of water (A) v.s. acetonitrile (B) both with 0.1% formic acid. The mobile phase flow rate was 400 μm/min. After 1 min isocratic conditions at 90% A, the gradient was operated from 90% to 5% A for 10 min, kept at 5% for another 2 min and then back to the initial conditions in 2 min, which was then kept for another 5 min for the column regeneration. Ionisation was performed in positive and negative polarities for both electrospray and atmospheric pressure ionisation. The nebulized gas flow was 70 L/h and drying gas flow was 450 L/h at a temperature of 350° C. Xcalibur v 2.0 software FROM Thermo Scientific was applied for data acquisition and analysis.

3 Experimental and Characterization for $RuO_2/SiO_2$ Comparative Reference Material

3.1 Experimental for $RuO_2/SiO_2$

Sample Preparation $RuO_2$ NPs supported on commercial silica particles (non-porous) (Qingdao Ocean Chemical Company) were prepared by a conventional impregnation method [42] using $RuCl_3$ (Tianjin Kemiou Chemical Reagent, China) as the precursor. The nominal loading of Ru in catalysts were maintained at 10 wt. %. The fresh catalysts ($RuCl_3$ attached on $SiO_2$ particles) were dried in an oven at 63° C. overnight, and then reduced by $H_2$ (70 ml/min) at 250° C. for 2 h (donated as $Ru/SiO_2$). Before catalytic activity test, the catalysts were oxidized by $O_2$ (30 ml/min) at 250° C. for 1 h (donated as $RuO_2/SiO_2$).

Materials Characterization Methods

TEM: The TEM images for $RuO_2/SiO_2$ were acquired on the JEM-2100 microscope operated at an accelerating voltage of 200 kV. TEM samples were prepared by drop-casting 100 μl of sample suspension (ground sample powder dispersed in ethanol) on copper grids.

PXRD: The PXRD patterns for $RuO_2/SiO_2$ were collected on an Empyrean diffractometer using a Cu Kα ($\lambda$=1.5406 Å) radiation source at 40 kV and 40 mA and scanning rate of 12°/min.

3.2 Supporting Characterization Results

FIGS. 12(a) and(b) show HRTEM images of the $Ru/SiO_2$ materials at various magnifications. The Ru nanoparticles are distributed uniformly on the surface of the $SiO_2$ supports with an average diameter between ca. 3 and ca. 5 nm.

FIG. 13 shows XRD patterns for $Ru/SiO_2$ (bottom, with simulated Ru peaks provided) and its oxidized form ($RuO_2/SiO_2$) (top, with simulated $RuO_2$ peaks provided). The results illustrate that the metallic Ru was oxidized to $RuO_2$ after $O_2$ oxidation at 250° C. The peak located at 23° was attributed to amorphous $SiO_2$.

4 Experimental and Supporting Results for Surface Adsorption and CO Oxidation Testing In heterogeneous catalysis both surface structure and molecule adsorption on the catalyst surfaces have a significant influence on the catalytic performance. One of the prototypical reactions to understand the significance of molecule interactions with metal-containing catalysts is CO oxidation, which is also one of the primary goals for respiratory protection and air purification. At low temperatures $RuO_2$ surface is generally regarded as a poor catalyst for CO oxidation because of surface passivation. At temperatures <150° C., the dominant mechanism for oxidation is the Langmuir-Hinshelwood process[43-46], in which the adsorbed CO combines with dissociated $O_2$ species (i.e. 0 atoms) to produce $CO_2$. Adsorption of CO and O species on $RuO_2$, however, usually results in strong binding and in the formation of densely packed CO and O domains, where the limited surface desorption and diffusion of both species causes the low catalytic activity.[46] However, materials produced according to the present invention which results in controlled encapsulation of $RuO_2$ in the cavities of MOF-808-P, exhibit unusual molecular adsorption behaviors and enhanced low temperature catalyst activity. As a reference, we prepared a silica-supported $RuO_2$ catalyst ($RuO_2/SiO_2$) which is synthesized by a conventional impregnation method[47] and discussed above in relation to FIG. 12 and FIG. 13. The CO and O adsorption features on both confined and un-confined $RuO_2$ nanocatalysts were characterized by diffuse reflectance infrared Fourier transform spectroscopy (DRIFTS) and temperature-programmed reduction (TPR). Both $RuO_2/SiO_2$ and $RuO_2$@MOF-808-P samples contained ca. 10 wt % Ru.

4.1 General Characterization Methods in this Section

In situ XAS: The in-situ XAS measurements were also carried out at the BL14W1 beamline of SSRF. The spectra were recorded in transmission mode. Self-supporting pellets were prepared from $RuO_2$@MOF-808-P and $Ru/SiO_2$ samples and treated directly in the in-situ cell which was made of quartz. A heating element was wrapped around the cell that allows heating the samples at different temperature. The temperature was controlled by a K-type thermocouple which was in contact with the cell. Prior to the XAS measurements the samples were active by 20 v/v % $O_2$+80 v/v % He at 150° C. for 10 min ($RuO_2$@MOF-808-P) or 250° C. for 1 h ($RuO_2/SiO_2$) and cooling down to 30° C. in Ar gas. The spectra were collected for the $O_2$-activated samples first. The comparison spectra were collected after the $O_2$-activated samples being treated with flow of 5 v/v % CO+95 v/v % He at 30° C. for 30 mins.

In situ diffuse reflectance infrared Fourier transform spectroscopy (in-situ DRIFTS): The in-situ DRIFTS spectroscopy was recorded on a BRUKER TENSOR 27 spectrometer equipped with a diffuse reflectance accessory (the Praying Mantis) and a reaction chamber (operation temperature from −150° C. to 600° C.). The powder sample was loaded into a sample cup. The sample temperature was controlled by a heater and measured by two thermocouples, one in the sample cup and one in the sampling stage. The flow rate passing through the reaction chamber was controlled by the mass flow controllers.

For FIG. 31b, 5 v/v % CO+95 v/v % He was used. the sample was exposed to 5% CO at room temperature first and then decreased to −50° C. by liquid nitrogen and kept for 2 h ($RuO_2$@MOF-808-P) or 1 h ($RuO_2/SiO_2$) until no change was observed in the IR spectra. Then the gas was switched to Ar gas at room temperature and increased the sample temperature to the targeted one. After each targeted temperature was reached for 10 min, the corresponding DRIFTS spectra were collected.

For FIGS. 31c and 31d, before the DRIFTS acquisition, the sample was pretreated in 20 v/v % $O_2$+80 v/v % Ar at 150° C. for 10 min ($RuO_2$@MOF-808-P) or 250° C. for 1 h ($RuO_2/SiO_2$) and cooling down in Ar to room temperature. For the reaction gas adsorption (1 v/v % CO+20 v/v % $O_2$+79 v/v % He), the $O_2$-activated samples were exposed to the reaction gas at room temperature for 30 min first. It was heated to the target temperatures (i.e. 30° C., 100° C., and 150° C.) in Ar and held for 10 min, and then the DRIFTS spectra were collected.

The DRIFT spectra were recorded using a spectral resolution of 4 $cm^{-1}$ and accumulating 32 scans.

Temperature-programmed reduction (TPR): The temperature-programmed reduction was carried out with a micromeritics chemisorption analyzer (Auto Chem 2910)

equipped with a mass spectrometer (MS, Omnistar). The sample (30 mg) was pretreated by 20 v/v % $O_2$+80 v/v % Ar at 150° C. for 10 min ($RuO_2$@MOF-808-P) or 250° C. for 1 h ($RuO_2$/$SiO_2$) and then changed to He gas. After cooling down to 45° C. in He, the treated sample was exposed to 5 v/v % CO+95 v/v % He and held for 30 min. Then the sample was heated from 45° C. to 800° C. with a ramping rate of 10° C. The products were analyzed by an on-line mass spectrometry.

CO Pulse Chemisorption: The CO pulse chemisorption was done using a micromeritics chemisorption analyzer (Auto Chem 2920). The sample (30 mg) was pretreated by 20 v/v % $O_2$+80 v/v % Ar at 150° C. for 10 min ($RuO_2$@MOF-808-P) or 250° C. for 1 h ($RuO_2$/$SiO_2$) and then changed to He gas. After cooling down to −50° C. in He, the treated sample were exposed to CO pulses consisting of 5 v/v % CO balanced with He. All gas follow rate was set to 30 ml/min. The CO concentration was measured using a thermal conductivity detector.

4.2 CO Oxidation Tests

The catalysts were loaded into a fixed-bed micro-reactor. Before catalytic activity, the $RuO_2$@MOF-808-P and Ru/$SiO_2$ catalysts were exposed to $O_2$ ($O_2$-activated) or Ar (Ar-activated) gas with a flow rate of 30 ml/min and treated at 150° C. for 10 min (to form activated $RuO_2$@MOF-808-P) and 250° C. for 1 h (to form activated $RuO_2$/$SiO_2$), respectively. After cooling down to room temperature in Ar gas (30 ml/min), the gas stream was switched to a reaction gas (1% CO, 20% $O_2$ and 1% $N_2$ balanced with He) with a specific weight hourly space velocity (WHSV). The WHSV in FIG. 3a is 2000 $Lg_{Ru}^{-1}h^{-1}$. The catalytic performance was investigated by temperature-programmed heating with rate of 1° C./min or keeping at a specific temperature for 12 h. The gas products were analyzed with an on-line micro-gas chromatograph (Agilent GC-490) equipped with a 5 Å molecular sieve column and a thermal conductivity detector (TCD). For the apparent activation energy measurements, CO oxidation reactions were performed under a kinetic-limiting region in which the CO conversion was below 25% using a much higher WHSV.

For the stability test (results shown in FIG. 31(d)) which the catalysts were treated by 100° C. water, 30 mg catalysts were loaded at a fixed-bad micro-reactor. Before the activity test, the $RuO_2$@MOF-808-P catalysts were treated by reaction gas (1% CO and 20% $O_2$ balanced with He) at 150° C. for 10 min. After cooling down to room temperature in Ar gas, the gas was switched to reaction gas with WHSV=400 $Lg_{Ru}^{-1}h^{-1}$ for activity test. Then the catalysts were treated by 10% water which was injected by a syringe pump (LEAD FLUID, TYD03) at 100° C. for 1 h. The lines from the pump to the reactor were heated at a high temperature. After the water treated, the catalysts were exposed to Ar gas at 120° C. for 60 min. The activity test was carried out from 30° C. to 100° C. with a heating rate of 0.5° C./min. The gas products were analyzed by an on-line gas chromatography (Agilent GC 6890) equipped with a packed column PQ200 and a TCD. Before the products analysis, the water was cooled by ice.

4.3 Supporting Results

FIG. 14 shows in situ x-ray absorption spectroscopy results for $RuO_2$/$SiO_2$ (in red) and $RuO_2$@MOF-808-P (in blue) before and after the CO adsorption at 30° C. (Ru foil and $RuO_2$ as reference samples). XANES shows that both $RuO_2$/$SiO_2$ and $RuO_2$@MOF-808-P are partially reduced upon CO adsorption, which is revealed by the change of slope in near-edge region (highlighted in grey). We speculate that the bridge 0 in $RuO_2$ is replaced by CO at 30° C. $RuO_2$@MOF-808-P, however, is reduced more than $RuO_2$/$SiO_2$ upon the surface reduction. The results implied that the Ru—O interaction is weakened by confining $RuO_2$ in MOF. Furthermore, it also supports our STEM/TEM results that $RuO_2$ encapsulated in the MOF (FIG. 11) is smaller than that supported by $SiO_2$ (FIG. 12), as the surface-to-volume ratio can be higher for $RuO_2$ in the MOF.

FIG. 15 shows an in situ DRIFTS spectrum for MOF-808-P treated in the reaction gas then in Ar at 30° C. The treatment condition is the same as those discussed in relation to FIG. 31. There is no peak in the IR spectrum, showing that the MOF-808-P does not adsorb CO molecules under this condition.

FIG. 16 shows CO oxidation tests for MOF-808-P, tBMP@MOF-808-P and $RuO_2$@MOF-808-P. Both MOF-808-P and tBMP@MOF-808-P are inactive for CO oxidation. The negative conversion observed for tBMP@MOF-808-P is likely due to tBMP desorption from the MOF. The catalysts were activated by Ar gas at 120° C. for 1h; catalysts mass:25.8 mg, WHSV=120.93 $Lg_{Ru}^{-1}h^{-1}$ FIG. 17 shows a stability test using $O_2$-activated $RuO_2$/$SiO_2$ and $RuO_2$@MOF-808-P (tests condition: 400 L/$g_{Ru}$/h, 15 mg catalysts) at 30° C. The results are consistent with those at 100° C. in FIG. 32(d), discussed below. The gradual deactivation of $RuO_2$@MOF-808-P at 30° C. is likely to be caused by formation of surface carbonates which can be seen from DRIFTS results discussed below. [43]

FIG. 18 shows extended DRIFTS results of FIG. 31(d), discussed below. At 30° C., peak features indicating the formation of carbonate can be noticed.

FIG. 19 shows PXRD patterns for as-synthesized $RuO_2$@MOF-808-P compared with $RuO_2$@MOF-808-P after various treatments/tests (treatment with water vapor at 100° C.; after 3 cycles of completed CO conversion; after activation with 02, 150° C.). The structure is mostly preserved after these treatments/tests as seen by the similarity in peak shape and distribution. The PXRD experimental setup is the same as those mentioned in section 2.6, above.

FIG. 20 shows CO oxidation tests for $RuO_2$@MOF-808-P which was tested after the standard $O_2$-activation mentioned in section 4.2, above (stage 1) and tested again after being treated with 10 v/v % water vapor at 100° C. for 60 minutes (stage 2). Catalysts mass:30 mg, WHSV=400 $Lg_{Ru}^{-1}h^{-1}$. There is no decrease in catalytic activity after water treated at high temperature. The results imply that the $RuO_2$@MOF-808-P catalysts have a high water tolerance.

TABLE 1

Performance comparison for CO oxidation reaction with other guest@MOF systems or Ru-based systems.

| catalysts | $CO/O_2$ ratio | catalysts mass (mg) | WHSV ($1 \times 10^4$ ml · $g_{cat}^{-1}$ · $h^{-1}$) | particle size (nm) | temperature of 100% CO conversion (° C.) | temperature of 50% CO conversion (° C.) | Ea (kJ · $mol^{-1}$) | TOF ($s^{-1}$) | reference |
|---|---|---|---|---|---|---|---|---|---|
| 10% $RuO_2$@MOF-808-P | 1/20 | 15 | 20 | 1-2 | 65 | — | 86 | 0.32 | This work |
| 10% $RuO_2/SiO_2$ | 1/20 | 15 | 20 | 3-5 | 155 | — | 145 | 0.03 | This work |
| 5% Au@ZIF-8 | 1/21 | 100 | 6 | 4.2 | 225 | 170 | — | | 22 |
| 15% $Co_3O_4$@ZIF-8 | 1/20 | 100 | 3 | 16.4 | 80 | 58 | — | | 24 |
| m-5$RuO_2$10CuO/$CeO_2$ | 1/21 | 100 | 3 | — | 95 | — | — | | 48 |
| 0.2% $RuO_2/Al_2O_3$-ALD | 1/21 | 2000 | 0.03 | 10 | 110 | — | — | 0.01 | 49 |
| 2% Pt/ZIF-8 (encapsulation) | 1/5 | 100 | 2 | 3.3 | 200 | — | — | | 50 |
| $RuO_2$ | 1/5 | 100 | 3 | 6 | 90 | — | — | | 51 |
| 3% Ru/$CeO_2$ | 1/5 | 100 | 3 | nanochain | 140 | 127 | — | | 52 |
| 5% $RuO_2/SnO_2$-11 | 1/1 | 25 | 7 | — | 150 | 125 | — | | 53 |
| $Ru_{0.5}Cu_{0.5}/\gamma$-$Al_2O_3$ | 1/1 | 150 | 2 | 9.2 | — | 122 | — | | 54 |
| fcc-1% Ru/$\gamma$-$Al_2O_3$ | 1/1 | 150 | 2 | 5.9 | — | 141 | — | | 55 |
| 2.92 Ru/$SiO_2$ | 2/1 | 15 | Plug-flow condition | 1.8 | 150 (CO conversion 90%) | — | — | 0.0132 ($CO_2$ formation rate) | 56 |

FIG. 31 shows characterization of CO and O interacting with the $RuO_2$ guest for $O_2$-activated $RuO_2/SiO_2$ (in blue) and $RuO_2$@MOF-808-P (in red). Experimental details for FIG. 31 are given above in section 4.1. FIG. 31(a) shows CO Temperature-programmed reduction (TPR) results, performed with pre-oxidized samples equilibrated in CO flow, gradually heated to find the minimum temperature where the surface lattice oxygen is active. They show the Ru—O binding interaction in $RuO_2$@MOF-808-P is significantly weakened—the reaction peak is much sharper and at much lower temperature (~160° C.) than for $RuO_2/SiO_2$ (~240° C.). The result is further confirmed by the in situ XANES spectra showing that $RuO_2$@MOF-808-P is reduced more significantly than $RuO_2/SiO_2$ by 5% CO at 30° C. (FIG. 14), i.e. O is much more easily replaced by CO.

FIG. 31(b-d) show DRIFTS peak intensity change for CO desorption (b), and DRIFTS results for (c) $RuO_2/SiO_2$ and (d) $RuO_2$@MOF-808-P treated by a reaction gas (1 v/v % CO, 20 v/v % $O_2$ and 79 v/v % $O_2$ He). $RuO_2$(110) surface is taken as an example to assist our interpretations about the DRIFTS results. These results show that Ru—Co interactions are weaker with the MOF-confined $RuO_2$ surface as compared to the $RuO_2/SiO_2$ surface. At 150° C. on $RuO_2$@MOF-808-P, singly-coordinated CO molecules desorb (the peak at 2055 $cm^{-1}$ disappears, FIG. 31(d)) to negligible, whereas for $RuO_2/SiO_2$ 70% of the corresponding peak intensity remains (at 2076 $cm^{-1}$, FIG. 31(c)). Due to their weaker interactions both O and CO are more readily removed from $RuO_2$ surfaces confined within the MOF.

DRIFTS features also reveal the packing of the adsorbed species, with densely packed CO adsorption domains observed in $RuO_2/SiO_2$ but not in $RuO_2$@MOF-808-P (FIG. 31(c),(d)) which enables activity via the Langmuir-Hinshelwood mechanism. DRIFTS spectra were obtained as set out in section 4.1, above. For $RuO_2/SiO_2$ (FIG. 31c), we find three bands in DRIFTS spectra at 30° C. (at 2132, 2076 and 2027 $cm^{-1}$). The bands at 2132 $cm^{-1}$ and 2076 $cm^{-1}$ can be assigned to singly-coordinated CO molecules, where the band at 2132 $cm^{-1}$ is attributed to loosely coordinated CO, whereas the dominant band at 2076 $cm^{-1}$ is attributed to densely packed CO domains which resist CO oxidation at low temperatures.[45] The weak shoulder located at 2027 $cm^{-1}$ is attributed to even more strongly bound bridging CO molecules adsorbed to two neighboring oxygen vacancies in $RuO_2$.[45,46] For $RuO_2$@MOF-808-P (FIG. 31(d)), we do not observe densely packed CO. The broadening peak at 2055 $cm^{-1}$ is attributed to loosely adsorbed CO, whereas the peak at ca. 2005 $cm^{-1}$ is attributed to bridging CO, similar to the shoulder peak at 2027 $cm^{-1}$ for $RuO_2/SiO_2$ sample, but likely with even fewer adsorbed O neighbors nearby. The control experiment with pure MOF shows no CO adsorption (no similar peak features in MOF-808-P spectra, FIG. 15).

TABLE 2

DRIFTS absorption bands for $RuO_2/SiO_2$ and $RuO_2$@MOF-808-P and their indications.

| Sample | DRIFTS band ($cm^{-1}$) | CO ads. type | Indication |
|---|---|---|---|
| $RuO_2/SiO_2$ | 2132 | on-top | |
| | 2076 | on-top | presence of densely packed CO domains resisting CO oxidation at low temperatures |
| | 2027 | bridging | |
| $RuO_2$@MOF-808-P | 2055 | on-top | loosely packed state of CO |
| | 2005 | bridging | with even fewer adsorbed O neighbors nearby |

By confining the $RuO_2$ inside the MOF's cavity, (i) the interactions between O/CO and the catalyst surface are weakened; and (ii) the formation of densely packed CO domains is inhibited. As a consequence, the adsorbed CO is more easily oxidized. This is further reflected by the temperature-dependent DRIFTS results (FIG. 31c, d) in the reaction gas: CO molecules can be almost eliminated by presence of $O_2$ at low temperature (ca. 100° C.) on the $RuO_2$@MOF-808-P catalysts whereas they are still adsorbed on $RuO_2/SiO_2$ even at ca. >150° C. The capability to modulate the surface adsorption of CO and O species on $RuO_2$ contained in MOF's cavity motivates us to compare rates of CO oxidation catalyzed by $RuO_2$@MOF-808-P and $RuO_2/SiO_2$, respectively.

FIG. 32 shows a CO oxidation catalysis performance summary using Ar or $O_2$ activated $RuO_2/SiO_2$ and $RuO_2$@MOF-808-P: (a) CO conversion profiles at weight hourly space velocity (WHSV) of 2000 $L/g_{Ru}/h$ with 15 mg catalysts (from left to right: $O_2$-activated $RuO_2$@MOF-808-P, Ar-activated $RuO_2$@MOF-808-P, $O_2$-activated $RuO_2/SiO_2$, Ar-activated $Ru/SiO_2$), (b) Arrhenius plots and calculated apparent activation energies (Ea) (from right to left: $O_2$-activated $RuO_2$@MOF-808-P, Ar-activated $RuO_2$@MOF-808-P, $O_2$-activated $RuO_2/SiO_2$, Ar-activated $Ru/SiO_2$) and (c) quantitative analysis on chemisorbed CO at −50° C. (to prevent $CO_2$ formation during the measurements) and turn-over frequency (TOF, conversion per unit site per unit time). (d) Stability test using $O_2$-activated $RuO_2/SiO_2$ and $RuO_2$@MOF-808-P (2000 $L/g_{Ru}\cdot h$, 15 mg catalysts) at 100° C. Experimental details for FIG. 32 are given above in section 4.2.

Under all reaction conditions shown in FIG. 32, the $RuO_2$@MOF-808-P catalyst made according to the present invention demonstrates superior performance compared with the $RuO_2/SiO_2$ catalyst. (ca. 5% vs. no conversion at 30° C. and 100% at ca. 65° C. vs. 100% only at ca. 150° C.). From these results we calculate the apparent activation energies for the two samples, $E_a$=86 kJ/mol and $E_a$=145 kJ/mol respectively, with the confined catalyst activation energy at the low end of measured $RuO_2$ activation energies.[43] The remarkable higher turnover frequency (TOF) for $RuO_2$@MOF-808-P (FIG. 32(c)) is theorised to be the result of the presence of only loosely packed CO molecules (Table 1)[57]. It is also noted that the catalyst achieve better CO→$CO_2$ conversion after $O_2$ activation as compared to after Ar activation (FIG. 32(a)). This suggests that $RuO_2$ is the active surface structure (FIG. 13) and an oxygen-rich surface is more favorable for CO chemisorption (FIG. 32(c))[58]. The higher CO chemisorption obtained in $RuO_2$@MOF-808-P is consistent with the formation of smaller $RuO_2$ nano-entities (i.e. higher surface-to-volume ratio) formed inside the MOF which is supported by the TEM results shown in FIG. 11 & FIG. 12). As controls, we verified that MOF-808-P and tBMP@MOF-808-P are inactive for CO oxidation, shown in FIG. 16, discussed above.

The above results show that $RuO_2$@MOF-808-P is a unique low-temperature CO-oxidation catalyst. At only 100° C. and 2000 $L/g_{Ru}\cdot h$ CO flow, after 12 hrs it still has >95% conversion capability whereas under the same conditions $RuO_2/SiO_2$ deactivates completely within 20 min (FIG. 32(d)). This is consistent with our CO-TPR and DRIFTS results. We suggest that, for the $RuO_2/SiO_2$ catalysts, upon being exposed to the continuously fed reaction gas at low temperatures, the densely-packed surface CO and O domains form and prevent the CO—O combination (FIG. 31(c)) leading rapid deactivation at 100° C. (FIG. 32(d)). By confining $RuO_2$ into the MOF's cavities (i.e. $RuO_2$@MOF-808-P), we allow adsorbed CO to react with adsorbed O and easily desorb at low temperature (FIG. 31(d)) due to weakened CO and O interactions. Additionally, close to room temperature (30° C.), we also observe drastically different CO→$CO_2$ conversion performances (FIG. 17 and FIG. 18) where the $RuO_2/SiO_2$ catalyst is completely deactivated after 12 min, whereas the confined one still has >40% conversion after 2 hrs, and further can be re-generated easily. This is promising for room-temperature based CO removal, where potentially interactions with water may be important. By treating the activated $RuO_2$@MOF-808-P with water vapor even at 100° C. we prove that (i) the MOF structure is mostly preserved (FIG. 19) and (ii) the $RuO_2$@MOF-808-P retains its high activity (FIG. 20), which is a challenge for recent MOF-based catalyst development[11].

5. Some Preliminary Results for Other Guest@Nanoporous-Host Materials Achieved Using Our Strategy FIGS. 21 and 22 show some preliminary XRD and SEM-EDX results for manganese oxide ($MnO_x$) in another Zr-based MOF, DUT-67 [59],(i.e. resulting in $MnO_x$@DUT-67). The method used for the manufacture of this material is as set out above in relation to manufacture of $RuO_2$@MOF-808-P, except the $RuO_4^-$ is replaced by $MnO_4^-$; and MOF-808-P is replaced by DUT-67. The precursor solution is 20 mM aqueous $KMnO_4$.

In addition to production of MnOx@DUT-67 using tBMP as a redox reagent, the inventors have also achieved MnOx@DUT-67 using EDOT (3,4-Ethylenedioxythiophene) as the reducing agent. In both cases, DE was used to dissolve tBMP or EDOT (50 mg EDOT or tBMP in 1000 μl DE). The temperature for the temperature-controlled selective desorption step was 120° C.

FIGS. 23 and 24 show some preliminary XRD and SEM-EDX results for $RuO_2$ in a commercially available zeolite Y from Alfa Aesar. The method used for the manufacture of this material is as set out above in relation to manufacture of $RuO_2$@MOF-808-P, except the MOF-808-P is replaced by zeolite Y.

FIGS. 25 and 26 show some preliminary XRD and SEM-EDX results for manganese oxide ($MnO_x$) in another Zr-based MOF, MOF-808-P, i.e. $MnO_x$@MOF-808-P. The method used for the manufacture of this material is as set out above in relation to $RuO_2$@MOF-808-P, except that the $RuO_4^-$ is replaced by $MnO_4$ (the precursor solution is 20 mM aqueous $KMnO_4$).

All of the above materials are prepared using the methodology mentioned in this work to demonstrate the general applicability of the guest incorporation concept for a range of nanoporous materials. The relevant characterization methods can be referred back section 2.6, above.

As a further demonstration, Pourbaix diagrams were constructed using the Materials Project software[60-62] (https://materialsproject.org/) and used to predict the potential conditions required for producing a guest@nanoporous-host material for Pt and Pd inside a MOF (Pt/Pd@MOF). FIG. 27 shows a Pourbaix diagram for Pt ([Pt]=$10^{-2}$ mol $kg^{-1}$ (total aqueous mixture)), and FIG. 28 shows a Pourbaix diagram for Pd ([Pd]=$10^{-2}$ mol $kg^{-1}$ (total aqueous mixture)). Both of these Pourbaix diagrams were constructed using the Materials Project software[60-62] Briefly, as no stable $Pt^{2+}$ is seen on the Pourbaix diagram for Pt in FIG. 27, it would be difficult to use $Pt^{2+}$ for host (e.g. MOF) impregnation. The inventors theorise that extra stabilization with ligands would be required in the Pt precursor. For example it may be necessary to use Pt precursors such as $[Pt(NH_3)_4]Cl_2$ rather than $PtCl_2$ for preparing Pt@MOF via solution-based synthesis, where extra $NH_3$ is involved to stabilize the Pt(II) salt.[9] In contrast, according to the Pourbaix diagram for Pd shown in FIG. 28, $Pd^{2+}$ is more ready to be used as a mobile precursor to impregnate MOF, in particular under low pH conditions (a stable $Pd^{2+}$ phase is shown at low pH even at fairly high $Pd^{2+}$ concentration, $10^{-2}$ mol·$kg^{-1}$ 10 mM). As an experimental verification, 0.106 g $Pd(NO_3)_2 \cdot H_2O$ was stabilised in 20 ml $HNO_3$ (aq, 0.1 M). Although $Pd^{2+}$ can be easily reduced to $Pd^0$ if the pH is unaltered, $\Delta E_{reduction}$ can be more than 0.5 V if the pH becomes significantly higher. Since the pH after the reaction is very likely to be higher than the acidic $Pd^{2+}$ solution (i.e. precursor solution), $NaBH_4$ was used as a reducing agent (with a standard reduction potential of −1.24 V versus SHE) which can sufficiently reduce the $Pd^{2+}$ to $Pd^0$ regardless of the pH change. To prepare the $NaBH_4$ (aq) solution, 0.15 g $NaBH_4$ (excess amount) was dissolved by 280 ml Milli-Q water which has a pH value of ca. 8. Since the redox reaction would take place in aqueous conditions with a pH value slightly less than 8 (due to excess $NaBH_4$), MOF-808-P was chosen as the host.

To load Pd in MOF-808-P (i.e. to form Pd@MOF-808-P), $Pd(NO_3)_2$ solution was impregnated in the dried MOF-808-P. The $Pd(NO_3)_2$(aq)@MOF-808-P was then reacted with the prepared $NaBH_4$ solution at room temperature for 10 min. Black suspension was observed upon the reaction indicating the formation of metallic $Pd^0$. The product was collected by centrifugation and washed with water and ethanol. It was then dried in a vacuum oven at room temperature for 24 h.

FIG. 29 shows a DF-STEM image for Pd@MOF-808-P and its corresponding STEM EDS mappings for Zr and Pd. Since a loading control step was not performed, metallic $Pd^0$ forms both inside the MOF and on its outer surface, as revealed in FIG. 29. Some Pd particles can agglomerate on the outer surface of the MOF (without MOF pore confinement). FIG. 30 shows PXRD patterns for MOF-808-P and Pd loaded MOF-808-P (i.e. Pd@MOF-808-P). The PXRD results were collected on a Rigaku D/Max 2500 diffractometer using a Cu Kα (Å=1.5406 Å) radiation source and scanning rate of 1° min$^{-1}$. The presence of large Pd particles are also confirmed by a peak at ca. 400 (for $Pd^0$) in the PXRD pattern, shown in FIG. 30, for Pd@MOF-808-P. Meanwhile, the PXRD patterns also verify the preserve of the MOF's structure throughout the synthesis. Hence, Pd@MOF-808-P can also be produced by a method according to the present invention.

6. Construction of Pourbaix Diagram for the Ru—H$_2$O System

A Pourbaix diagram for the Ru—H$_2$O system is shown in FIG. 33. For simplicity, FIG. 33 shows only the portion of the Ru—H$_2$O Pourbaix diagram for pH between 5 and 10. In this pH range, apart from metallic Ru, several other forms of Ru-containing compounds are thermodynamically favorable to be formed, namely: $H_2RuO_5$ (solution), $RuO_4^-$ (solution), $Ru_2O_5$ (insoluble solid), $RuO_2 \cdot 2H_2O$ (insoluble solid) and $Ru(OH)_3 \cdot H_2O$ (insoluble solid). Here, we assume the aqueous concentration of insoluble Ru-containing compound is 0 M.

Based on the results detailed by Povar & Spinut[32] we can construct the Pourbaix diagram for Ru—H$_2$O system (pH=5-10, $C_{Ru}^0$=20 mM). There are 6 different half-cell reduction reactions (with their standard electrode potentials, $E^0$) that can be involved in our pH range:

$Ru(OH)_3 \cdot H_2O + 3H^+ + 3e^- = Ru + 4H_2O, E_1^0 = 0.631V$     Equation (S1)

$RuO_2 \cdot 2H_2O + H^+ + e^- = Ru(OH)_3 \cdot H_2O, E_2^0 = 0.777V$     Equation (S2)

$Ru_2O_5 + 3H_2O + 2H^+ + 2e^- = 2RuO_2 \cdot 2H_2O, E_3^0 = 1.168V$     Equation (S3)

$2RuO_4^- + 6H^+ + 4e^- = Ru_2O_5 + 3H_2O, E_4^0 = 1.701V$     Equation (S4)

$2H_2RuO_5 + 6H^+ + 6e^- = Ru_2O_5 + 5H_2O, E_5^0 = 1.466V$     Equation (S5)

$H_2RuO_5 + e^- = RuO_4^- + H_2O, E_6^0 = 0.996V$     Equation (S6)

According to Nernst Equation for an electrochemical half-cell reduction reaction, the electrical potentials, E, can be effectively written as:

$$E = E^0 - \frac{RT}{zF}\ln\left(\frac{\text{concentration of ions on the right multiplied together}}{\text{concentration of ions on the left multiplied together}}\right) \quad \text{Equation (S7)}$$

where, R is the gas constant (ca. 8.314 J·K$^{-1}$·mol$^{-1}$), T is the temperature in K, z is the number of electrons transferred in the half-cell reaction and F is the Faraday constant (ca. 96485 C·mol$^{-1}$).

Furthermore, $\ln[H^+] \approx 2.303 \log[H^+] = -2.303 pH$     Equation (S8)

Therefore, the relationship between E and pH can be established for the Equation S1-S6 for the given $C_{Ru}^0$ ($C_{Ru}^0$=20 mM in our case) can be established.

$$E_1 = E_1^0 + \frac{RT}{F}\ln[H^+] = E_1^0 - 2.303\frac{RT}{F}\text{pH} \quad \text{Equation (S9)}$$

$$E_2 = E_2^0 + \frac{RT}{F}\ln[H^+] = E_2^0 - 2.303\frac{RT}{F}\text{pH} \quad \text{Equation (S10)}$$

$$E_3 = E_3^0 + \frac{RT}{F}\ln[H^+] = E_3^0 - 2.303\frac{RT}{F}\text{pH} \quad \text{Equation (S11)}$$

$$E_4 = E_4^0 + \frac{3RT}{2F}\ln[H^+] + \frac{RT}{2F}\ln(C_{Ru}^0) = E_3^0 - 3.4545\frac{RT}{F}\text{pH} + \frac{RT}{2F}\ln(C_{Ru}^0) \quad \text{Equation (S12)}$$

$$E_5 = E_5^0 + \frac{RT}{F}\ln[H^+] + \frac{RT}{3F}\ln(C_{Ru}^0) = E_5^0 - 2.303\frac{RT}{F}\text{pH} + \frac{RT}{3F}\ln(C_{Ru}^0) \quad \text{Equation (S13)}$$

$$E_6 = E_6^0 \quad \text{Equation (S14)}$$

A simplified Pourbaix diagram for Ru—H$_2$O system (pH=5-10, $C_{Ru}^{0=20}$ mM), is then constructed with above-mentioned E vs pH equations. Meanwhile, there is a triple junction in the diagram for a disproportionation reaction:

$6RuO_4^- + H_2O + 6H^+ = Ru_2O_5 + 4H_2RuO_5$     Equation (S15)

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

1. Furukawa, H., Cordova, K. E., O'Keeffe, M. & Yaghi, O. M. The Chemistry and Applications of Metal-Organic Frameworks. *Science.* 341, 1230444 (2013).
2. Moghadam, P. Z. et al. Development of a Cambridge Structural Database Subset: A Collection of Metal-Organic Frameworks for Past, Present, and Future. *Chem. Mater.* 29, 2618-2625 (2017).
3. Howarth, A. J. et al. Chemical, thermal and mechanical stabilities of metal-organic frameworks. *Nat. Rev. Mater.* 1, 1-15 (2016).
4. Laer, F., Schüth, F., Simon, U. & Wark, M. Host-Guest Systems Based on Nanoporous Crystals. (WILEY-VCH Verlag GmbH & Co. KGaA, 2005). doi:10.1002/3527602674
5. Moller, K. & Bein, T. Inclusion Chemistry in Periodic Mesoporous Hosts. *Chem. Mater.* 10, 2950-2963 (1998).
6. Fujita, M. et al. Self-assembly of ten molecules into nanometre-sized organic host frameworks. *Nature* 378, 469-471 (1995).
7. Yang, Y. et al. Photophysical Properties of a Post-Self-Assembly Host/Guest Coordination Cage: Visible Light Driven Core-to-Cage Charge Transfer. *J. Phys. Chem. Lett.* 6, 1942-1947 (2015).
8. Meilikhov, M. et al. Metals@MOFs—Loading MOFs with Metal Nanoparticles for Hybrid Functions. *Eur. J. Inorg. Chem.* 2010, 3701-3714 (2010).
9. Juan-Alcaniz, J., Gascon, J. & Kapteijn, F. Metal-organic frameworks as scaffolds for the encapsulation of active species: state of the art and future perspectives. *J. Mater. Chem.* 22, 10102 (2012).
10. Dhakshinamoorthy, A. & Garcia, H. Catalysis by metal nanoparticles embedded on metal-organic frameworks. *Chem. Soc. Rev.* 41, 5262-5284 (2012).
11. Gascon, J., Corma, A., Kapteijn, F. & Llabres I Xamena, F. X. Metal organic framework catalysis: Quo vadis? *ACS Catal.* 4, 361-378 (2014).
12. Allendorf, M. D. et al. Guest-Induced Emergent Properties in Metal-Organic Frameworks. *J. Phys. Chem. Lett.* 6, 1182-1195 (2015).
13. Chen, L., Luque, R. & Li, Y. Controllable design of tunable nanostructures inside metal-organic frameworks. *Chem. Soc. Rev.* 46, 4614-4630 (2017).
14. Huang, Y.-B., Liang, J., Wang, X.-S. & Cao, R. Multifunctional metal-organic framework catalysts: synergistic catalysis and tandem reactions. *Chem. Soc. Rev.* 46, 126-157 (2017).
15. Landmesser, H. & Miessner, H. Interaction of Co with Ruthenium Supported on Dealuminated Y-Zeolite—Evidence for the Formation of a Ruthenium Tricarbonyl. *J. Phys. Chem.* 95, 10544-10546 (1991).
16. Li, J. et al. Sub-nm ruthenium cluster as an efficient and robust catalyst for decomposition and synthesis of ammonia: Break the "size shackles". *Nano Res.* 1-12 (2018). doi:10.1007/s12274-018-2062-4
17. Bleloch, A. et al. Modified mesoporous silicate MCM-41 materials: immobilised perruthenate-a new highly active heterogeneous oxidation catalyst for clean organic synthesis using molecular oxygen. *Chem. Commun.* 18, 1907-1908 (1999).
18. Zhan, B. Z. et al. Zeolite-confined nano-$RuO_2$: A green, selective, and efficient catalyst for aerobic alcohol oxidation. *J. Am. Chem. Soc.* 125, 2195-2199 (2003).
19. Schröder, F., Esken, D., Cokoja, M. & van den Berg, M. Ruthenium Nanoparticles inside Porous $[Zn_4O(bdc)_3]$ by Hydrogenolysis of Adsorbed [Ru(cod)(cot)]: A Solid-State Reference System for Surfactant-Stabilized Ruthenium Colloids *J. Am. Chem. Soc.* 130, 6119-6130 (2008).
20. Maza, W. A., Padilla, R. & Morris, A. J. Concentration Dependent Dimensionality of Resonance Energy Transfer in a Postsynthetically Doped Morphologically Homologous Analogue of UiO-67 MOF with a Ruthenium(II) Polypyridyl Complex. *J. Am. Chem. Soc.* 137, 8161-8168 (2015).
21. Maza, W. A. et al. Ruthenium(II)-polypyridyl zirconium (IV) metal-organic frameworks as a new class of sensitized solar cells. *Chem. Sci.* 7, 719-727 (2016).
22. Jiang, H. et al. Au@ZIF-8: CO Oxidation over Gold Nanoparticles Deposited to Metal—Organic Framework. *J. Am. Chem. Soc.* 2, 11302-11303 (2009).
23. Zhuang, G. et al. The Effect of N-Containing Supports on Catalytic CO Oxidation Activity over Highly Dispersed Pt/UiO-67. *Eur. J. Inorg. Chem.* 2017, 172-178 (2017).
24. Wang, W. et al. Metal-organic framework as a host for synthesis of nanoscale $Co_3O_4$ as an active catalyst for CO oxidation. *Catal. Commun.* 12, 875-879 (2011).
25. Lin, A., Ibrahim, A. A., Arab, P., El-Kaderi, H. M. & El-Shall, M. S. Palladium Nanoparticles Supported on Ce-Metal-Organic Framework for Efficient CO Oxidation and Low-Temperature $CO_2$ Capture. *ACS Appl. Mater. Interfaces* 9, 17961-17968 (2017).
26. Pourbaix, M. Atlas of electrochemical equilibria in aqueous solutions.(*Pergamon Press,* 1966).
27. Campbell, J. A. & Whiteker, R. A. A periodic table based on potential-pH diagrams. *J. Chem. Educ.* 46, 90 (1969).
28. Hwang, Y. K. et al. Amine grafting on coordinatively unsaturated metal centers of MOFs: Consequences for catalysis and metal encapsulation. *Angew. Chemie—Int. Ed.* 47, 4144-4148 (2008).

29. Wei, Y., Han, S., Walker, D. A., Fuller, P. E. & Grzybowski, B. A. Nanoparticle core/shell architectures within mof crystals synthesized by reaction diffusion. *Angew. Chemie—Int. Ed.* 51, 7435-7439 (2012).
30. Jiang, J. et al. Superacidity in Sulfated Metal-Organic Framework-808. *J. Am. Chem. Soc.* 136, 12844 (2014).
31. Furukawa, H. et al. Water Adsorption in Porous Metal-Organic Frameworks and Related Materials. *J. Am. Chem. Soc.* 136, 4369-4381 (2014).
32. Povar, I. & Spinu, O. Ruthenium redox equilibria: 3. Pourbaix diagrams for the systems $Ru-H_2O$ and $Ru-Cl-H_2O$. *J. Electrochem. Sci. Eng.* 6, 145 (2016).
33. Yohe, G. R. et al. The Oxidation of 2,6-Di-tert-butyl-4-methylphenol. *J. Org. Chem.* 21, 1289-1292 (1956).
34. Richards, J. A. & Evans, D. H. Electrochemical oxidation of 2,6-di-tert-butyl-4-isopropylphenol. *J. Electroanal. Chem.* 81, 171-187 (1977).
35. Wang, T. et al. Functional conductive nanomaterials via polymerisation in nano-channels: PEDOT in a MOF. *Mater. Horiz.* 4, 64-71 (2017).
36. Le Ouay, B. et al. Nanostructuration of PEDOT in Porous Coordination Polymers for Tunable Porosity and Conductivity. *J. Am. Chem. Soc.* 138, 10088-10091 (2016).
37. Jiang, J. et al. Superacidity in sulfated metal-organic framework-808. *J. Am. Chem. Soc.* 136, 12844-12847 (2014).
38. Velázquez-Palenzuela, A. et al. Structural Properties of Unsupported Pt—Ru Nanoparticles as Anodic Catalyst for Proton Exchange Membrane Fuel Cells. *J. Phys. Chem.* C 114, 4399-4407 (2010).
39. Zhang, X. & Chan, K. Y. Water-in-oil microemulsion synthesis of platinum-ruthenium nanoparticles, their characterization and electrocatalytic properties. *Chem. Mater.* 15, 451-459 (2003).
40. Rolison, D. R., Hagans, P. L., Swider, K. E. & Long, J. W. Role of Hydrous Ruthenium Oxide in Pt—Ru Direct Methanol Fuel Cell Anode Electrocatalysts: The Importance of Mixed Electron/Proton Conductivity. *Langmuir* 15, 774-779 (1999).
41. Wang, X. et al. Uncoordinated Amine Groups of Metal-Organic Frameworks to Anchor Single Ru Sites as Chemoselective Catalysts toward the Hydrogenation of Quinoline. *J. Am. Chem. Soc.* 139, 9419-9422 (2017).
42. Ravikovitch, P. I. & Neimark, A. V. Density functional theory model of adsorption on amorphous and microporous silica materials. *Langmuir* 22, 11171-11179 (2006).
43. Over, H. Surface Chemistry of Ruthenium Dioxide in Heterogeneous Catalysis and Electrocatalysis: From Fundamental to Applied Research. *Chem. Rev.* 112, 3356-3426 (2012).
44. Over, H. et al. Atomic-Scale Structure and Catalytic Reactivity of the $RuO_2$ (110) Surface. *Science.* 287, 1474-1476 (2000).
45. Aβmann, J., Löffler, E., Birkner, A. & Muhler, M. Ruthenium as oxidation catalyst: bridging the pressure and material gaps between ideal and real systems in heterogeneous catalysis by applying DRIFT spectroscopy and the TAP reactor. *Catal. Today* 85, 235-249 (2003).
46. Farkas, A., Mellau, G. C. & Over, H. Novel Insight in the CO Oxidation on $RuO_2$ (110) by in Situ Reflection-Absorption Infrared Spectroscopy. *J. Phys. Chem.* C 113, 14341-14355 (2009).
47. Spinacé, E. V. & Vaz, J. M. Liquid-phase hydrogenation of benzene to cyclohexene catalyzed by $Ru/SiO_2$ in the presence of water-organic mixtures. *Catal. Commun.* 4, 91-96 (2003).
48. Cui, X., Wang, Y., Chen, L. & Shi, J. Synergetic Catalytic Effects in Tri-Component Mesostructured Ru—Cu—Ce Oxide Nanocomposite in CO Oxidation. *ChemCatChem* 6, 2860-2871 (2014).
49. Kim, I. H. et al. CO oxidation catalyzed by $RuO_2$ nanoparticles supported on mesoporous $Al_2O_3$ prepared via atomic layer deposition. *Curr. Appl. Phys.* 16, 1407-1412 (2016).
50. Lu, G. et al. Imparting functionality to a metal-organic framework material by controlled nanoparticle encapsulation. *Nat. Chem.* 4, 310-316 (2012).
51. Shen, W. et al. Synthesis and CO Oxidation Catalytic Character of High Surface Area Ruthenium Dioxide Replicated by Cubic Mesoporous Silica. *Chem. Lett.* 34, 390-391 (2005).
52. Sreedhala, S. & Vinod, C. P. Surfactant assisted formation of ruthenium nanochains under mild conditions and their catalytic CO oxidation activity. *Chem. Commun.* 51, 10178-10181 (2015).
53. Yu, J., Zhao, D., Xu, X., Wang, X. & Zhang, N. Study on $RuO_2/SnO_2$: Novel and Active Catalysts for CO and $CH_4$ Oxidation. *ChemCatChem* 4, 1122-1132 (2012).
54. Huang, B. et al. Solid-Solution Alloying of Immiscible Ru and Cu with Enhanced CO Oxidation Activity. *J. Am. Chem. Soc.* 139, 4643-4646 (2017).
55. Kusada, K. et al. Discovery of Face-Centered-Cubic Ruthenium Nanoparticles: Facile Size-Controlled Synthesis Using the Chemical Reduction Method. *J. Am. Chem. Soc.* 135, 5493-5496 (2013).
56. Liang, C., Narkhede, V., Aβmann, J. & Muhler, M. Controlled synthesis of supported ruthenium catalysts for CO oxidation by organometallic chemical vapor deposition. *Stud. Surf. Sci. Catal.* 162, 473-480 (2006).
57. Joo, S. H. et al. Size Effect of Ruthenium Nanoparticles in Catalytic Carbon Monoxide Oxidation. *Nano Lett.* 10, 2709-2713 (2010).
58. Park, J.-N. et al. Room-temperature CO oxidation over a highly ordered mesoporous $RuO_2$ catalyst. *React. Kinet. Mech. Catal.* 103, 87-99 (2011).
59. Bon, V., Senkovska, I., Baburin, I. a & Kaskel, S. Zr and Hf based Metal-Organic Frameworks: Tracking down the polymorphism. *Cryst. Growth Des.* 13, 1231-1237 (2013).
60. Singh, A. K. et al. Electrochemical stability of metastable materials. *Chem. Mater.* 29, 10159-10167 (2017).
61. Jain, A. et al. Commentary: The materials project: A materials genome approach to accelerating materials innovation. *APL Mater.* 1, 011002 (2013).
62. Persson, K. A., Waldwick, B., Lazic, P. & Ceder, G. Prediction of solid-aqueous equilibria: Scheme to combine first-principles calculations of solids with experimental aqueous states. *Phys. Rev.* B 85, 235438 (2012).
63. Pascanu, V. et al. Sustainable catalysis: Rational Pd loading on MIL-101Cr-$NH_2$ for more efficient and recyclable Suzuki-Miyaura reactions. *Chem. Eur. J.* 19, 17483-17493 (2013).

The invention claimed is:

1. A method for producing a guest@nanoporous-host material comprising the steps of:
   providing a nanoporous host material comprising a plurality of pores interconnected via pore windows;
   selecting a target guest species;
   identifying a target guest precursor species;
   selecting one or more reagents;
   infiltrating the nanoporous host material with the one or more reagents form a reagent@nanoporous-host material; and infiltrating the reagent@nanoporous-host material with the target guest precursor species in a reaction environment such that a reaction occurs to form the target guest species within the pores of the nanoporous host material;

wherein the target guest species is selected on an electrochemical potential versus pH diagram defined by a reaction environment and the target guest precursor species is identified by identifying a phase on the electrochemical potential versus pH diagram;

wherein the one or more reagents comprise a redox reagent selected to adjust an electrochemical potential of the reaction environment by $\Delta E$, where $\Delta E$ is determined as a difference in electrochemical potential operable to change the electrochemical potential of the reaction environment from a stable region of the target guest precursor species on the electrochemical potential versus pH diagram to a stable region of the target guest species on the electrochemical potential versus pH diagram.

2. The method according to claim 1 wherein the method includes performing a temperature-controlled desorption step to cause at least partial desorption of reagent molecules from an outer surface of the reagent@nanoporous-host material.

3. The method according to claim 2 wherein the temperature-controlled desorption step comprises heating the reagent@nanoporous-host material at a temperature from 20° C. to 300° C.

4. The method according to claim 2 wherein the temperature-controlled desorption step comprises heating the reagent@nanoporous-host material for a time between 1 second and 48 hours.

5. The method according to claim 2 wherein the temperature-controlled desorption step is carried out at a pressure lower than atmospheric pressure.

6. The method according to claim 1 wherein the nanoporous host material is a mesoporous or microporous material.

7. The method according to claim 6, wherein the nanoporous host material is selected from: a metal organic framework material, a covalent organic framework material, zeolite, porous silica, organosilica, activated carbon, carbon nanotubes, and a microporous polymeric material.

8. The method according to claim 6 wherein the nanoporous host material is infiltrated with the one or more reagents to form the reagent@nanoporous-host material, and wherein the step of infiltrating the reagent@nanoporous-host material with the target guest precursor species is performed in aqueous solution.

9. The method according to claim 1 wherein the one or more reagents comprises both a redox reagent and a pH modulator, wherein the pH modulator is selected to adjust a pH of the reaction environment by $\Delta pH$, where $\Delta pH$ is determined as a difference in pH operable to move the pH of the reaction environment from a stable region of the target guest precursor species on said electrochemical potential versus pH diagram to a stable region of the target guest species on said electrochemical potential versus pH diagram.

10. The method according to claim 9 wherein the target guest species and the target guest precursor species are based on a target element selected from a transition metal, a rare earth element, an alkaline earth metal, a post-transition metal, a metalloid and a non-metal element.

11. The method according to claim 10 wherein the target guest species and the target guest precursor species are based on a target element selected from a transition metal and a rare earth element.

12. The method according to claim 1 wherein one or more of the one or more reagents are hydrophobic.

13. The method according to claim 1 wherein the target guest species and the target guest precursor species are based on a target element selected from Be, B, Mg, Al, Si, P, S, Ca, Ga, Ge, As, Se, Sr, In, Sn, Sb, Te, Ba, Tl, Pb, Bi, Sc, Ti, V, Cr, Mn, Fe, Co, Ni, Cu, Zn, Y, Zr, Nb, Mo, Tc, Ru, Rh, Pd, Ag, Cd, La, Hf, W, Re, Os, Ir, Pt, Au, Hg, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lr, Ac, Ra, Rf, db, Sg, Bh, Hs, Mt, Ds, Rg, Cn, Fl, and Lv.

* * * * *